US008831996B2

(12) United States Patent
Nakamura et al.

(10) Patent No.: US 8,831,996 B2
(45) Date of Patent: Sep. 9, 2014

(54) COMPUTER SYSTEM AND PROGRAM

(75) Inventors: Taira Nakamura, Tokyo (JP); Osamu Sarudate, Tokyo (JP); Daisuke Masui, Tokyo (JP); Tsukasa Oikawa, Tokyo (JP)

(73) Assignees: Bandai Co., Ltd., Tokyo (JP); Namco Bandai Games Inc., Tokyo (JP)

( * ) Notice: Subject to any disclaimer, the term of this patent is extended or adjusted under 35 U.S.C. 154(b) by 311 days.

(21) Appl. No.: 13/048,943

(22) Filed: Mar. 16, 2011

(65) Prior Publication Data
US 2011/0263306 A1 Oct. 27, 2011

(30) Foreign Application Priority Data

Apr. 27, 2010 (JP) ................................. 2010-101706

(51) Int. Cl.
*G06F 21/00* (2013.01)
*G06Q 30/02* (2012.01)
(52) U.S. Cl.
CPC ................................. *G06Q 30/0258* (2013.01)
USPC .......................................................... 705/51
(58) Field of Classification Search
CPC ................................................. G06Q 30/0258
USPC .......................................................... 705/51
See application file for complete search history.

(56) References Cited

U.S. PATENT DOCUMENTS

| 5,748,731 | A | 5/1998 | Shepherd |
| 6,406,371 | B1 * | 6/2002 | Baba et al. ...................... 463/42 |
| 6,612,501 | B1 | 9/2003 | Woll et al. |
| 2002/0155893 | A1 * | 10/2002 | Swanberg et al. .............. 463/43 |
| 2003/0107173 | A1 | 6/2003 | Satloff et al. |
| 2006/0205512 | A1 * | 9/2006 | Watanabe et al. ............... 463/42 |
| 2007/0232399 | A1 | 10/2007 | Kathman et al. |
| 2009/0051114 | A1 | 2/2009 | Robbers et al. |
| 2009/0054124 | A1 | 2/2009 | Robbers et al. |
| 2009/0062009 | A1 | 3/2009 | Inubushi et al. |
| 2011/0165946 | A1 * | 7/2011 | Pavlich et al. .................. 463/42 |

FOREIGN PATENT DOCUMENTS

JP  2001-204871 A  7/2001
JP  2006-320636 A  11/2006

OTHER PUBLICATIONS

Bandai, "Professional Baseball Owners' League" beta version started on Mar. 9, 2010, Selling of cards started on Mar. 20, 2010, [Online], <URL: http://ownersleague.jp/>.
Sega Corporation "Let's make a professional baseball team Online 2" started on May 27, 2008, <URL: http://www.yakyutsuku-online.com/>.
Japanese Office Action for related Japanese Patent Application No. 2010-101706 mailed on Aug. 10, 2011, pp. 1-13.
Professional baseball Spirits 6, Dengeki Playstation vol. 453, Aug. 28, 2009, front page and pp. 40-41, vol. 453, ASCII Media Works, Japan.
EPO, Search Report and Written Opinion for EP application No. 11160070.6, Jul. 1, 2011.

* cited by examiner

*Primary Examiner* — Charles C Agwumezie

(57) ABSTRACT

In computer and video games in which a character is managed by registering an ID assigned to an object, objects corresponding to the same player can be duplicately registered, and a bonus that increases the ability of the player corresponding to the duplicately registered object is granted.

10 Claims, 35 Drawing Sheets

FIG. 11

518
CARD REGISTRATION DATA

| CARD NUMBER 518a | PLAYER ID 518b | SERIES ID 518c | IN-USE FLAG 518d | ... |
|---|---|---|---|---|
| 1-102323-C1 | KATAYAMAN | 1ST, 2010 | 1 (IN USE) | ... |
| 1-102324-C1 | MIMURASU | 2ND, 2010 | 0 | ... |
| 1-102325-C1 | EYEBROW RABBIT | 1ST, 2010 | 1 | ... |
| ⋮ | ⋮ | ⋮ | ⋮ | ⋮ |

FIG. 15

550 — LEAGUE SETTING DATA

550a — | LEAGUE ID | SMALL SHORT-TERM LEAGUE |

550b — | PARTICIPATION PASSWORD | POi87 |

550c — REGULATION SETTING DATA

| ITEM | SETTING |
|---|---|
| NUMBER OF TEAMS | 6 |
| NUMBER OF GAMES | 20 |
| GAME INTERVAL | ONE DAY |
| DUPLICATE REGISTRATION | YES |
| ⋮ | ⋮ |
| WALK | NO |
| STOLEN BASE | YES |
| NUMBER OF OUTS | 2 |
| ⋮ | ⋮ |

FIG. 16

552 — LEAGUE PARTICIPATING TEAM LIST

552a — CORRESPONDING LEAGUE ID

| PARTICIPATING TEAM ID | TEAM PERFORMANCE |
|---|---|
| SAPPORO WHITE BEARST | WIN 4, LOSE 1, TIE 0 |
| SHINAGAWA GAMERS | WIN 4, LOSE 0, TIE 1 |
| MEGURO SKIPPERS | WIN 0, LOSE 5, TIE 1 |
| ⋮ | ... |

552b — PARTICIPATING TEAM ID
552c — TEAM PERFORMANCE

FIG. 19

| 560 — SACRIFICE-BUNT-SUITABLE CONDITION TABLE | 560b |
|---|---|
| ON-BASE STATUSES (560a) | SUITABLE CONDITION |
| NO RUNNER | "CONTACT ABILITY" OF HITTER > M1 ∩ "RUNNING SPEED" OF HITTER > M2 |
| FIRST BASE | "CONTACT ABILITY" OF HITTER > M1 |
| SECOND BASE | "CONTACT ABILITY" OF HITTER > M3 (M1 < M3) |
| THIRD BASE | "CONTACT ABILITY" OF HITTER > M1 ∩ "RUNNING SPEED" OF HITTER > M2 |
| FIRST BASE TO SECOND BASE | "CONTACT ABILITY" OF HITTER > M4 (M3 < M4) |
| ⋮ | ⋮ |

(CONST. = M1, M2, ⋯)

FIG. 20

561 SACRIFICE BUNT SELECTION PROBABILITY TABLE

| VALUE OF "BUNT" OF FINAL OFFENSIVE TACTIC TENDENCY PARAMETER (561a) | SCORE DIFFERENCE (561b) | | | | |
|---|---|---|---|---|---|
| | ≤ −5 | −4 TO −1 | 0 | 1 TO 4 | 5 ≤ |
| −5 TO −4 | 0% | 5% | 10% | 20% | 20% |
| −3 TO −2 | 5% | 10% | 20% | 25% | 10% |
| −1 | 10% | 15% | 25% | 25% | 20% |
| 0 | 25% | 25% | 30% | 35% | 25% |
| 1 | 25% | 30% | 40% | 40% | 45% |
| ⋮ | ⋮ | ⋮ | ⋮ | ⋮ | ⋮ |

FIG. 21

566 NORMAL OFFENSIVE TACTIC SELECTION PROBABILITY TABLE

566a / 566b

| VALUE OF "LONG BALL HITTING" OF FINAL DEFENSIVE TACTIC TENDENCY | VALUE OF "EARLY-COUNT HITTING" OF FINAL DEFENSIVE TACTIC TENDENCY PARAMETER | | | | | | |
|---|---|---|---|---|---|---|---|
| | −5 TO −4 | −3 TO −2 | −1 | 0 | 1 | ⋯ |
| −5 TO −4 | EARLY COUNT/LONG BALL 0%<br>LATE COUNT/LONG BALL 0%<br>EARLY COUNT/ONE BASE 0%<br>LATE COUNT/ONE BASE 100% | EARLY COUNT/LONG BALL 0%<br>LATE COUNT/LONG BALL 0%<br>EARLY COUNT/ONE BASE 10%<br>LATE COUNT/ONE BASE 90% | EARLY COUNT/LONG BALL 0%<br>LATE COUNT/LONG BALL 0%<br>EARLY COUNT/ONE BASE 15%<br>LATE COUNT/ONE BASE 85% | EARLY COUNT/LONG BALL 0%<br>LATE COUNT/LONG BALL 0%<br>EARLY COUNT/ONE BASE 30%<br>LATE COUNT/ONE BASE 70% | EARLY COUNT/LONG BALL 0%<br>LATE COUNT/LONG BALL 0%<br>EARLY COUNT/ONE BASE 35%<br>LATE COUNT/ONE BASE 65% | ⋯ |
| −3 TO −2 | EARLY COUNT/LONG BALL 0%<br>LATE COUNT/LONG BALL 10%<br>EARLY COUNT/ONE BASE 0%<br>LATE COUNT/ONE BASE 90% | EARLY COUNT/LONG BALL 0%<br>LATE COUNT/LONG BALL 10%<br>EARLY COUNT/ONE BASE 5%<br>LATE COUNT/ONE BASE 85% | EARLY COUNT/LONG BALL 5%<br>LATE COUNT/LONG BALL 10%<br>EARLY COUNT/ONE BASE 15%<br>LATE COUNT/ONE BASE 70% | EARLY COUNT/LONG BALL 10%<br>LATE COUNT/LONG BALL 10%<br>EARLY COUNT/ONE BASE 35%<br>LATE COUNT/ONE BASE 50% | EARLY COUNT/LONG BALL 10%<br>LATE COUNT/LONG BALL 10%<br>EARLY COUNT/ONE BASE 40%<br>LATE COUNT/ONE BASE 40% | ⋯ |
| −1 | EARLY COUNT/LONG BALL 0%<br>LATE COUNT/LONG BALL 15%<br>EARLY COUNT/ONE BASE 0%<br>LATE COUNT/ONE BASE 85% | EARLY COUNT/LONG BALL 0%<br>LATE COUNT/LONG BALL 15%<br>EARLY COUNT/ONE BASE 10%<br>LATE COUNT/ONE BASE 75% | EARLY COUNT/LONG BALL 5%<br>LATE COUNT/LONG BALL 10%<br>EARLY COUNT/ONE BASE 15%<br>LATE COUNT/ONE BASE 70% | EARLY COUNT/LONG BALL 10%<br>LATE COUNT/LONG BALL 15%<br>EARLY COUNT/ONE BASE 25%<br>LATE COUNT/ONE BASE 50% | EARLY COUNT/LONG BALL 15%<br>LATE COUNT/LONG BALL 15%<br>EARLY COUNT/ONE BASE 30%<br>LATE COUNT/ONE BASE 40% | ⋯ |
| 0 | EARLY COUNT/LONG BALL 0%<br>LATE COUNT/LONG BALL 25%<br>EARLY COUNT/ONE BASE 0%<br>LATE COUNT/ONE BASE 75% | EARLY COUNT/LONG BALL 10%<br>LATE COUNT/LONG BALL 15%<br>EARLY COUNT/ONE BASE 10%<br>LATE COUNT/ONE BASE 60% | EARLY COUNT/LONG BALL 20%<br>LATE COUNT/LONG BALL 15%<br>EARLY COUNT/ONE BASE 20%<br>LATE COUNT/ONE BASE 45% | EARLY COUNT/LONG BALL 20%<br>LATE COUNT/LONG BALL 25%<br>EARLY COUNT/ONE BASE 20%<br>LATE COUNT/ONE BASE 35% | EARLY COUNT/LONG BALL 25%<br>LATE COUNT/LONG BALL 25%<br>EARLY COUNT/ONE BASE 25%<br>LATE COUNT/ONE BASE 25% | ⋯ |
| 1 | EARLY COUNT/LONG BALL 0%<br>LATE COUNT/LONG BALL 35%<br>EARLY COUNT/ONE BASE 0%<br>LATE COUNT/ONE BASE 65% | EARLY COUNT/LONG BALL 20%<br>LATE COUNT/LONG BALL 20%<br>EARLY COUNT/ONE BASE 10%<br>LATE COUNT/ONE BASE 50% | EARLY COUNT/LONG BALL 25%<br>LATE COUNT/LONG BALL 20%<br>EARLY COUNT/ONE BASE 15%<br>LATE COUNT/ONE BASE 45% | EARLY COUNT/LONG BALL 25%<br>LATE COUNT/LONG BALL 25%<br>EARLY COUNT/ONE BASE 25%<br>LATE COUNT/ONE BASE 25% | EARLY COUNT/LONG BALL 30%<br>LATE COUNT/LONG BALL 25%<br>EARLY COUNT/ONE BASE 15%<br>LATE COUNT/ONE BASE 30% | ⋯ |
| ⋯ | ⋯ | ⋯ | ⋯ | ⋯ | ⋯ | ⋯ |

FIG. 22

570 INTENTIONAL WALK SELECTION CONDITION TABLE

| 570a VALUE OF "INTENTIONAL WALK" OF FINAL DEFENSIVE TACTIC TENDENCY PARAMETER | 570b "CONTACT ABILITY" + "SLUGGING ABILITY" OF BATTER | | | | |
|---|---|---|---|---|---|
| | ≤ M4 | M5 TO M6 | M7 | M8 TO M9 | M10 ≤ |
| −5 TO −4 | 0% | 0% | 0% | 15% | 20% |
| −3 TO −2 | 0% | 0% | 5% | 20% | 30% |
| −1 | 0% | 0% | 5% | 25% | 40% |
| 0 | 0% | 0% | 10% | 45% | 50% |
| 1 | 0% | 5% | 20% | 50% | 60% |
| ⋮ | ⋮ | ⋮ | ⋮ | ⋮ | ⋮ |

(CONST.=M4, M5, ···)

FIG. 23

572 SURPRISE-ATTACK PREVENTION CONDITION TABLE

| 572a CONDITIONS OF ON-BASE STATUSES | 572b SUITABLE CONDITION |
|---|---|
| NO RUNNER | "CONTACT ABILITY" OF HITTER > M10 ∩ "RUNNING SPEED" OF HITTER > M11 |
| FIRST BASE | "CONTACT ABILITY" OF HITTER > M12 |
| SECOND BASE | "CONTACT ABILITY" OF HITTER > M13 (M10 < M13) |
| THIRD BASE | "CONTACT ABILITY" OF HITTER > M10 ∩ "RUNNING SPEED" OF HITTER > M14 |
| FIRST BASE TO SECOND BASE | "CONTACT ABILITY" OF HITTER > M15 (M3 < M15) |
| ⋮ | ⋮ |

(CONST.=M10, M11, ···)

FIG. 24

| 574 | | | | | |
|---|---|---|---|---|---|
| SURPRISE-ATTACK PREVENTION SELECTION PROBABILITY TABLE | | | | | |
| VALUE OF "SURPRISE-ATTACK PREVENTION" OF FINAL DEFENSIVE TACTIC TENDENCY PARAMETER (574a) | SCORE DIFFERENCE (574b) | | | | |
| | ≤ -5 | -4 TO -1 | 0 | 1 TO 4 | 5 ≤ |
| -5 TO -4 | 0% | 5% | 10% | 20% | 20% |
| -3 TO -2 | 5% | 10% | 20% | 25% | 10% |
| -1 | 10% | 15% | 25% | 25% | 20% |
| 0 | 20% | 25% | 30% | 35% | 25% |
| 1 | 25% | 30% | 35% | 35% | 35% |
| ⋮ | ⋮ | ⋮ | ⋮ | ⋮ | ⋮ |

FIG. 25

NORMAL DEFENSIVE TACTIC SELECTION PROBABILITY TABLE (576)

576a: VALUE OF "HITTING PREVENTION" OF FINAL DEFENSIVE TACTIC TENDENCY PARAMETER

576b: VALUE OF "STRIKEOUT COUNT" OF FINAL DEFENSIVE TACTIC TENDENCY PARAMETER

| | -5 TO -4 | -3 TO -2 | -1 | 0 | 1 | ... |
|---|---|---|---|---|---|---|
| -5 TO -4 | EARLY COUNT/LONG BALL 0%<br>LATE COUNT/LONG BALL 0%<br>EARLY COUNT/ONE BASE 0%<br>LATE COUNT/ONE BASE 100% | EARLY COUNT/LONG BALL 0%<br>LATE COUNT/LONG BALL 0%<br>EARLY COUNT/ONE BASE 5%<br>LATE COUNT/ONE BASE 95% | EARLY COUNT/LONG BALL 0%<br>LATE COUNT/LONG BALL 0%<br>EARLY COUNT/ONE BASE 10%<br>LATE COUNT/ONE BASE 90% | EARLY COUNT/LONG BALL 0%<br>LATE COUNT/LONG BALL 0%<br>EARLY COUNT/ONE BASE 30%<br>LATE COUNT/ONE BASE 70% | EARLY COUNT/LONG BALL 0%<br>LATE COUNT/LONG BALL 0%<br>EARLY COUNT/ONE BASE 40%<br>LATE COUNT/ONE BASE 60% | ... |
| -3 TO -2 | EARLY COUNT/LONG BALL 0%<br>LATE COUNT/LONG BALL 10%<br>EARLY COUNT/ONE BASE 0%<br>LATE COUNT/ONE BASE 90% | EARLY COUNT/LONG BALL 0%<br>LATE COUNT/LONG BALL 10%<br>EARLY COUNT/ONE BASE 5%<br>LATE COUNT/ONE BASE 85% | EARLY COUNT/LONG BALL 5%<br>LATE COUNT/LONG BALL 10%<br>EARLY COUNT/ONE BASE 15%<br>LATE COUNT/ONE BASE 70% | EARLY COUNT/LONG BALL 10%<br>LATE COUNT/LONG BALL 10%<br>EARLY COUNT/ONE BASE 30%<br>LATE COUNT/ONE BASE 50% | EARLY COUNT/LONG BALL 10%<br>LATE COUNT/LONG BALL 10%<br>EARLY COUNT/ONE BASE 40%<br>LATE COUNT/ONE BASE 60% | ... |
| -1 | EARLY COUNT/LONG BALL 0%<br>LATE COUNT/LONG BALL 15%<br>EARLY COUNT/ONE BASE 5%<br>LATE COUNT/ONE BASE 80% | EARLY COUNT/LONG BALL 0%<br>LATE COUNT/LONG BALL 15%<br>EARLY COUNT/ONE BASE 10%<br>LATE COUNT/ONE BASE 75% | EARLY COUNT/LONG BALL 5%<br>LATE COUNT/LONG BALL 15%<br>EARLY COUNT/ONE BASE 10%<br>LATE COUNT/ONE BASE 70% | EARLY COUNT/LONG BALL 10%<br>LATE COUNT/LONG BALL 15%<br>EARLY COUNT/ONE BASE 25%<br>LATE COUNT/ONE BASE 50% | EARLY COUNT/LONG BALL 15%<br>LATE COUNT/LONG BALL 20%<br>EARLY COUNT/ONE BASE 15%<br>LATE COUNT/ONE BASE 50% | ... |
| 0 | EARLY COUNT/LONG BALL 0%<br>LATE COUNT/LONG BALL 15%<br>EARLY COUNT/ONE BASE 10%<br>LATE COUNT/ONE BASE 75% | EARLY COUNT/LONG BALL 5%<br>LATE COUNT/LONG BALL 15%<br>EARLY COUNT/ONE BASE 10%<br>LATE COUNT/ONE BASE 70% | EARLY COUNT/LONG BALL 15%<br>LATE COUNT/LONG BALL 15%<br>EARLY COUNT/ONE BASE 20%<br>LATE COUNT/ONE BASE 50% | EARLY COUNT/LONG BALL 20%<br>LATE COUNT/LONG BALL 20%<br>EARLY COUNT/ONE BASE 25%<br>LATE COUNT/ONE BASE 35% | EARLY COUNT/LONG BALL 30%<br>LATE COUNT/LONG BALL 30%<br>EARLY COUNT/ONE BASE 15%<br>LATE COUNT/ONE BASE 25% | ... |
| 1 | EARLY COUNT/LONG BALL 0%<br>LATE COUNT/LONG BALL 15%<br>EARLY COUNT/ONE BASE 15%<br>LATE COUNT/ONE BASE 70% | EARLY COUNT/LONG BALL 10%<br>LATE COUNT/LONG BALL 20%<br>EARLY COUNT/ONE BASE 10%<br>LATE COUNT/ONE BASE 60% | EARLY COUNT/LONG BALL 15%<br>LATE COUNT/LONG BALL 20%<br>EARLY COUNT/ONE BASE 15%<br>LATE COUNT/ONE BASE 50% | EARLY COUNT/LONG BALL 25%<br>LATE COUNT/LONG BALL 25%<br>EARLY COUNT/ONE BASE 25%<br>LATE COUNT/ONE BASE 25% | EARLY COUNT/LONG BALL 30%<br>LATE COUNT/LONG BALL 25%<br>EARLY COUNT/ONE BASE 15%<br>LATE COUNT/ONE BASE 30% | ... |
| ... | ... | ... | ... | ... | ... | ... |

FIG. 27

STARTING LINEUP LIST (612)

| POSITIONS (612a) | PLAYER ID (612b) | BATTING ORDER (612c) | ... |
|---|---|---|---|
| FIRST BASEMAN | NOMURAN | 4 | ... |
| SECOND BASEMAN | GEN-SAN | 5 | ... |
| THIRD BASEMAN | SUE-SAN | 1 | ... |
| SHORTSTOP | KOICHI | 8 | ... |
| RIGHT FIELDER | EYEBROW RABBIT | 2 | ... |
| CENTER FIELDER | KATAYAMAN | 3 | ... |
| LEFT FIELDER | LEFT FIELDER | 7 | ... |
| CATCHER | HANAYAMA | 6 | ... |
| PITCHER | PAPPA | 9 | ... |

FIG. 28

- 660 — PLAY DATA
- 652 — OPPOSING TEAM INFORMATION
- 654 — INNING INFORMATION
- 656 — PLAYER PARAMETER DATA
- 658 — SUBSTITUTED PLAYER LIST
- 660 — BASIC OFFENSIVE TENDENCY PARAMETER
- 662 — BASIC DEFENSIVE TENDENCY PARAMETER
- 664 — MIDTERM OFFENSIVE TENDENCY PARAMETER
- 666 — MIDTERM DEFENSIVE TENDENCY PARAMETER
- 668 — FINAL OFFENSIVE TACTIC TENDENCY PARAMETER
- 670 — FINAL DEFENSIVE TENDENCY PARAMETER

COMPUTER SYSTEM AND PROGRAM

CROSS-REFERENCES TO RELATED APPLICATION

This application claims priority from Japanese Patent Application Serial No. 2010-101706 filed Apr. 27, 2010, the contents of which are incorporated herein by reference in its entirety.

BACKGROUND OF THE INVENTION

1. Field of the Invention

The present invention relates to a computer system and a program used for managing players on each of game players' teams in order to play a team based game.

2. Description of the Related Art

Among various team based games, a simulation type game in which, from the view point of an owner of a baseball team, a game payer scouts baseball players and creates his own team that automatically plays against another game player's team has been developed. For example, such a baseball game is described in Online game SEGA Corporation "Let's make a professional baseball team ONLINE 2" started on May 27, 2008, <URL: http://www.yakyutsuku-online.com/>.

In a game of such a genre, a game player selects a starting lineup of nine players from the listed players of the team. Thereafter, the game player enjoys playing a game against another game player to win the game. During the game, each player plays automatically, substitution of players is performed automatically, and the tactics are determined automatically. Thus, winning or losing is determined by how well the game player estimates the game progress and selects team members before the game starts. This is the chance of the game player to show his/her ability.

In addition, in some games of such a genre, scouting players means collecting trading cards. There is one-to-one correspondence between a trading card and a player on a team playable in a game. By registering the use right of a trading card in a predetermined Web site, the game player can register the team members playable in a game. Such a game is described in, for example, the BANDAI online game "Professional Baseball Owners' League" beta version started on Mar. 9, 2010, Selling of cards started on Mar. 20, 2010, [Online], <URL: http://ownersleague.jp/>.

The trading cards are sold in the form of a package so that a game player cannot view the trading cards beforehand. Therefore, if the game player buys and collect a plurality of trading cards, some of the types of the trading cards may be duplicated.

In addition to the game described in the BANDAI online game "Professional Baseball Owners' League", in some games in which the characters playable in the game are registered by registering the user right of objects, the same characters are not used. For example, as shown in the BANDAI online game "Professional Baseball Owners' League", when a game simulates real sport games, a trading card corresponds to a real player. Thus, if the same player plays in a plurality of teams, the game becomes unrealistic. However, the game player feels that it is unfair since only one of the same trading cards among the plurality of collected trading cards can be used. As used herein, the term "object" refers to not only a real trading card and a toy, such as an action figure, but also a virtual thing (e.g., data representing a trading card or a toy).

SUMMARY OF THE INVENTION

Accordingly, it is an object of the present invention to allow an ID representing a duplicate character to be used in a game in which a character is managed by registering the use right of an ID assigned to the character and, thus, reduce the unpleasantness that a game player experiences when he/she has the same objects in his/her collections.

According to an embodiment of the present invention, a computer system for managing players on each of game player's teams in order to play a team based game is provided. The computer system includes storage means for storing object IDs representing IDs uniquely assigned to objects corresponding to a plurality of players (e.g., a server storage unit 502 shown in FIG. 9 and card registration data 518 shown in FIG. 11), receiving means for receiving a request for registering a use right of an object ID in response to an input operation performed on a game player terminal (a communication unit 372, a server processing unit 202, and a game management sub-unit 220 shown in FIG. 9 and steps S10 to S12 shown in FIG. 30), registration managing means for managing the presence/absence of registration for use of the object IDs so that the registration is not allowed if the object ID received from the receiving means has already been registered and the registration is allowed if the object ID received from the receiving means has not yet been registered (e.g., the server processing unit 202, the game management sub-unit 220, and a card registration processing sub-sub-unit 222 shown in FIG. 9, the card registration data 518 shown in FIG. 11, and steps S14 to S16 shown in FIG. 30), team player managing means for managing the players of each of the game player's teams by assigning a player corresponding to the object ID registered by the registration managing means to one of the game player's teams (e.g., the server processing unit 202, the game management sub-unit 220, and the card registration processing sub-sub-unit 222 shown in FIG. 9, a player registration list 610 shown in FIG. 26, and step S22 shown in FIG. 30), and parameter updating means for performing a parameter updating process for each of the game player's teams in which a parameter for each of the players on the game player's team and/or a parameter of the entire team is updated on the basis of the number of duplicate registrations of the object ID of each of the players (e.g., the server processing unit 202, the game management sub-unit 220, the card registration processing sub-sub-unit 222, and a team creation processing sub-sub-unit 224 shown in FIG. 9, the player registration list 610 shown in FIG. 26, steps S32 to S34 shown in FIG. 30, and step S210 shown in FIG. 32).

According to another embodiment of the present invention, a program for causing a computer to manage players on each of game player's teams in order to play a team based game is provided. The program includes program code for causing the computer to function as storage means for storing object IDs representing IDs uniquely assigned to objects corresponding to a plurality of players, receiving means for receiving a request for registering a use right of an object ID in response to an input operation performed on a game player terminal, registration managing means for managing the presence/absence of registration for use of the object IDs so that the registration is not allowed if the object ID received from the receiving means has already been registered and the registration is allowed if the object ID received from the receiving means has not yet been registered, team player managing means for managing the players of each of the game player's teams by assigning a player corresponding to the object ID registered by the registration managing means to one of the game player's teams, and parameter updating means for performing a parameter updating process for each of the game player's teams in which a parameter for each of the players on the game player's team and/or a parameter of the entire team is updated on the basis of the number of duplicate registrations of the object ID of the player.

According to the embodiment, the use right of the object is managed by using an object ID. In addition, duplicate registrations of objects corresponding to the same player are managed. Thus, the player corresponding to the duplicately registered objects can be used for team creation. For example, the parameter for the duplicately registered player and the parameter for the created team are updated.

Therefore, a restriction that requires a game player to use only one object when a game player has a plurality of objects for the same player is removed, and the game player can use the other objects for the game. Accordingly, even when a plurality of objects corresponding to the same player appear in his/her collection, the game player does not feel ripped off, but the game player can advantageously gain a bonus by duplicately registering the other object.

The parameter updating means can include first means for updating the parameter of a player on the game player's team if the number of duplicate registrations of the object ID for the player meets a condition regarding the number of duplicate registrations predetermined for the player (e.g., a server processing unit 202, a game management sub-unit 220, and a card registration processing sub-sub-unit 222 shown in FIG. 9, the player registration list 610 shown in FIG. 26, and step S28 shown in FIG. 30).

This configuration provides an advantage that is the same as the above-described advantage. In addition, since a bonus is granted if the number of duplicate registrations of the object ID for the player meets the predetermined condition, the game becomes more enjoyable if the game player has a plurality of objects for the same player.

The computer system can further include position setting means for assigning a position to each of the players on the game player's team in accordance with an input operation performed on the game player terminal (e.g., a communication unit 372, the server processing unit 202, the game management sub-unit 220, and the team creation processing sub-sub-unit 224 shown in FIG. 9, the player registration list 610 shown in FIG. 26, and steps S124 to S154 shown in FIG. 31). The parameter updating means can include second means for updating the parameter for the player on a game player's team and/or a parameter for the entire game player's team on the basis of the number of duplicate registrations of the object ID for the player assigned to the position (e.g., the server processing unit 202, the game management sub-unit 220, the team creation processing sub-sub-unit 224 shown in FIG. 9, the player registration list 610 shown in FIG. 26, and steps S162 and steps S166 to S170 shown in FIG. 33), where the player meets a predetermined position condition used for determination in parameter updating.

This configuration provides an advantage that is the same as the above-described advantages. In addition, if the position for the duplicately registered player meets some specific condition, the bonus can be granted. Accordingly, the game becomes more enjoyable if the game player has a plurality of objects for the same player.

The game can be a baseball game, and the position condition can represent a battery. The second means can update the parameter for the player on the player team and/or the parameter for the entire team on the basis of the number of duplicate registrations of the objects ID for the players assigned to a pitcher and a catcher.

This configuration provides an advantage that is the same as the above-described advantages. In addition, if a limited condition in which the duplicately registered players are a pitcher and a catcher, a bonus can be granted. Accordingly, the game becomes more enjoyable if the game player has a plurality of objects for the same player.

A reference parameter value can be defined for each of a plurality of parameter items for a player, and the parameter updating means can perform the parameter updating process so that a feature of the player is made more prominent by increasing the parameter value of the parameter item having a relatively high parameter value.

This configuration provides an advantage that is the same as one of the above-described advantages. In addition, a bonus can be granted so that the feature of a duplicately registered player is made more prominent. Accordingly, the game player can further enjoy the bonus granted for duplicate registration.

An object provided during a series can differ from the object provided during another series even for the same player, and the storage means can associate the object IDs for the same player in different series with one another and stores the object IDs. In addition, the parameter updating means can include third means for performing the parameter updating process on the basis of the series of the duplicately registered object ID for each of the players.

This configuration provides an advantage that is the same as one of the above-described advantages. In addition, by allowing the same player to be duplicately registered, the objects of the same type that the game player owns can be used in a variety of ways. Thus, the game becomes more enjoyable for the game player.

The computer system can further include team manager managing means (e.g., the server processing unit 202, the game management sub-unit 220, and a card registration processing sub-sub-unit 222 shown in FIG. 9, manager setting data 540 shown in FIG. 14, a manager registration list 608 shown in FIG. 26, and steps S50 to S52 shown in FIG. 29) and entire team parameter updating means (e.g., the server processing unit 202, the game management sub-unit 220, and the team creation processing sub-sub-unit 224 shown in FIG. 9 and steps S260 to S262 shown in FIG. 34), where the objects can include a manager object. If the object ID registered by the registration managing means is the object ID of the manager object, the team manager managing means assigns the manager to a manager of the game player's team, and the entire team parameter updating means updates the parameter of each of the game player's teams on the basis of the number of duplicate registrations of the objects ID for the manager of the game player's team.

This configuration provides an advantage that is the same as one of the above-described advantages. In addition, since a bonus can be granted even when a manager object is duplicately registered, the game player can positively have a plurality of objects of the same type. Thus, the game becomes more enjoyable for the game player.

The computer system can further include parameter updating rule setting means for setting whether updating of a parameter by the parameter updating means is allowed as an execution rule of the game (e.g., the game management sub-unit 220 and the league creation processing sub-sub-unit 234 shown in FIG. 9, the league setting data 550 shown in FIG. 15, and a league creation process shown in FIG. 35).

This configuration provides an advantage that is the same as one of the above-described advantages. In addition, by using duplicate registrations of objects, a variety of execution rules can be provided for a game. Thus, the game becomes more enjoyable for the game player.

The computer system can further include pre-assigned player managing means (e.g., the server processing unit 202, the game management sub-unit 220, and the team creation processing sub-sub-unit 224 shown in FIG. 9). In addition to the players corresponding to the registered object IDs, the team player managing means can manage a pre-assigned player automatically provided to the game player's team without registration of an object ID of the pre-assigned player in advance, and if the pre-assigned player is the same as a player corresponding to a registered object ID, the pre-assigned player managing means can unregister the pre-assigned player from the players in the game player's team.

This configuration allows a game form in which a pre-assigned player is automatically provided to the game player's team if the number of players on the game player's team is insufficient for creating a team. If the pre-assigned player is the same as a player corresponding to a registered object ID, the pre-assigned player is unregistered from the players in the game player's team.

BRIEF DESCRIPTION OF THE DRAWINGS

FIG. 11 illustrates an exemplary data structure of card registration data;

FIG. 15 illustrates an exemplary data structure of league setting data;

FIG. 16 illustrates an exemplary data structure of a league participating team list;

FIG. 19 illustrates an exemplary data structure of a sacrifice-bunt-suitable condition table;

FIG. 20 illustrates an exemplary data structure of a sacrifice bunt selection probability table;

FIG. 21 illustrates an exemplary data structure of a normal offensive tactic selection probability table;

FIG. 22 illustrates an exemplary data structure of an intentional walk selection condition table;

FIG. 23 illustrates an exemplary data structure of a surprise-attack prevention condition table;

FIG. 24 illustrates an exemplary data structure of a surprise-attack prevention selection probability table;

FIG. 25 illustrates an exemplary data structure of a normal defensive tactic selection probability table;

FIG. 27 illustrates an exemplary data structure of a starting lineup list;

FIG. 28 illustrates an exemplary data structure of play data;

DESCRIPTION OF THE PREFERRED EMBODIMENTS

First Embodiment

A first embodiment of the present invention is described next with reference to a simulation type baseball game in which baseball players are registered in a roster using trading cards serving as objects.

Configuration of Game System

Figure 1:
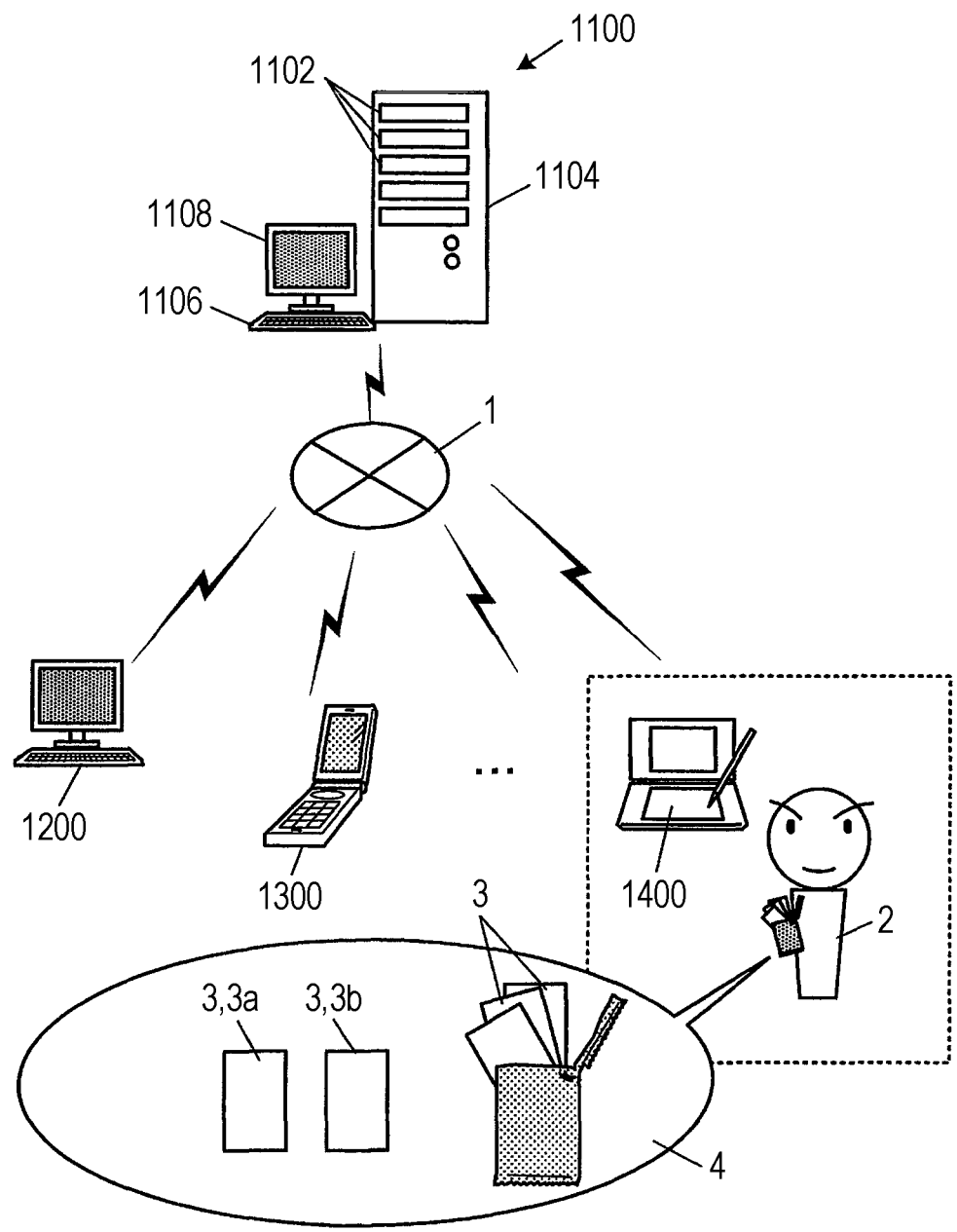
FIG. 1 illustrates an exemplary configuration of a game system according to a first embodiment of the present invention.

FIG. 1 illustrates an exemplary configuration of a game system according to an embodiment of the present invention. According to the present embodiment, the game system includes a player terminal, such as a personal computer 1200, a smart phone 1300, or a mobile game machine 1400, and a server system 1100 formed from a computer system and connected to the player terminal via a communication line 1. The player terminal and the server system 1100 communicate data required for playing a game with each other.

The communication line 1 serves as a communication path through which data can be exchanged. That is, examples of the communication line 1 include a dedicated line (a dedicated cable) for pier-to-pier connection, a local area network (LAN) using Ethernet (trade name), a telephone network, a cable network, and a communication network, such as the Internet. The communication may be performed wirelessly or wired.

The server system 1100 includes a body 1104 including a plurality of blade servers 1102 and a keyboard 1106 and a display monitor 1108 used for managing the blade servers 1102. Each of the blade servers 1102 includes a central processing unit (CPU), an input/output (I/O) module, an IC memory, and a storage unit (e.g., a hard disk). The server system 1100 functions as a single server computer. The body 1104 includes the blade servers 1102, a power supply module that supplies electrical power to the blade servers 1102, and a communication unit that connects the server system 1100 to the communication line 1.

According to the present embodiment, the server system 1100 natively supports a common gateway interface (CGI) program implementation language. Thus, the server system 1100 provides a variety of functions, such as registration of a game player, authentication of a registered game player (known as a login process), a baseball game, and a communication process between game players (e.g., chat), using the CGI functions.

The server system 1100 may be realized using a single server computer. Alternatively, a stationary home game machine may serve as the server system 1100.

Each of the personal computer 1200, the smart phone 1300, and the mobile game machine 1400 serves as a computer that can execute a game screen display program. The game screen display program displays a variety of screens in accordance with display information received from the server system 1100 and transmits, to the server system 1100, request information in accordance with an input operation. If the display information generated by the server system 1100 has a dedicated data format, the game screen display program is formed from a dedicated client program. In contrast, if the display information has a data format for interactively controlling images and sound using HTML or Adobe Flash ("Adobe" is a trade name), the game screen display program can be generated using a program working on a general-purpose Web browser.

In order to play a baseball game according to the present embodiment, a game player 2 needs to purchase objects (trading cards 3) having designs corresponding to a baseball player and a manager in advance. A predetermined number of objects (the trading cards 3) are sold in the form of a package. A user cannot recognize the designs of the objects (the trading cards 3) in the package from the outside.

The objects (the trading cards 3) include a manager object (a manager card 3*a*) and baseball player objects (baseball player cards 3*b*) including a pitcher, a catcher, and a fielder. Each of the objects has unique identification information and an object ID assigned thereto. According to the present embodiment, an object number is printed as the object ID. However, a string of characters may be used for the object ID. Alternatively, a bar code or a QR code may be used for the object ID.

In addition, in order to reflect real baseball league stages, a different set of the objects (the trading cards 3) is supplied for each sales period (e.g., first series, second series, . . . ). That is, the latest series (e.g., a second series) is created so that the objects (the trading cards 3) correspond to the baseball players of the real baseball league at that time. In some cases, an object (a trading card 3) corresponding to the same baseball player or a manager is included in a plurality of series (e.g., the first series to the second series). At that time, the illustration, pose, or layout of an object (a trading card 3) can be changed on a series-by-series basis although the object represents the same baseball player or manager. That is, models (types) of the object (the trading card 3) corresponding to the same baseball player or a manager differ in accordance with the series. Note that the same unique card number is still assigned to the different objects (the different trading cards 3) corresponding to the same baseball player or a manager even when the series or the model of the objects are different.

The game player 2 registers an acquired object (the trading card 3) using a player terminal so that a baseball player indicated by the object (the trading card 3) can be used in games. Thereafter, the game player 2 creates his/her own team using the registered baseball players and enjoys playing a baseball game in which his/her team plays against another team.

Configuration of Player Terminal

Figure 2:
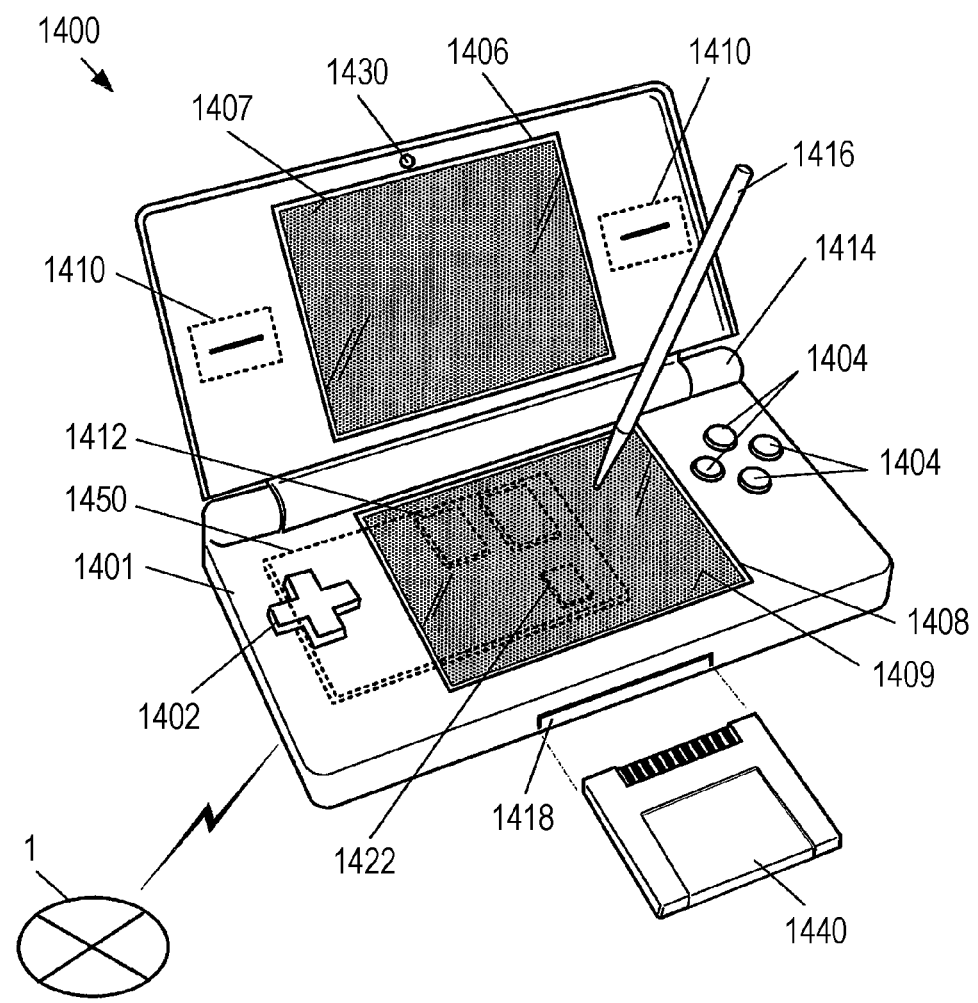
FIG. 2 is an external view of a mobile game machine representing an exemplary player terminal according to the embodiment.

An exemplary configuration of the mobile game machine 1400, which is a typical player terminal, is described next. FIG. 2 is an external view of the mobile game machine 1400, which is an exemplary player terminal according to the present embodiment.

The mobile game machine 1400 has a machine body 1401 that is flippable about a hinge 1414. The machine body 1401 includes a direction input key 1402, push switches 1404, a first liquid crystal display 1406, a second liquid crystal display 1408, a speaker 1410, an image sensor 1430, and a control unit 1450. The first liquid crystal display 1406 and the second liquid crystal display 1408 include touch panels 1407 and 1409 disposed thereon, respectively. By touching the touch panels 1407 and 1409 using, for example, a stylus pen 1416, information regarding any point in the display screen can be input.

The machine body 1401 further includes a memory card reader 1418 that can read and write data from and to a memory card 1440. The memory card 1440 serves as a computer-readable information storage medium. The memory card 1440 stores a program and a variety of setting data items required for the control unit 1450 of the mobile game machine 1400 to perform a variety of computing processes regarding a gameplay. In addition, the machine body 1401 includes an internal battery, a power button, and volume control button (none are shown).

The touch panels 1407 and 1409 cover almost the entirety of display screens of the first liquid crystal display 1406 and the second liquid crystal display 1408 without obstructing the display. When a game player touches the touch panel 1407 or 1409 using the stylus pen 1416 (or a finger), the touch panel 1407 or 1409 can output, to the control unit 1450, the coordinate information regarding the touched position in an orthogonal coordinate system where the upper left corner is the origin.

The image sensor 1430 is an image pickup element formed from a CCD (Charge Coupled Device) image sensor or a CMOS (Complementary Metal Oxide Semiconductor) image sensor. If the object (the trading card 3) has an object ID (a card ID) in the form of a bar code or a QR code, the image sensor 1430 is used for capturing the image of the bar code or the QR code.

The control unit 1450 corresponds to a control board of the game machine. The control unit 1450 includes a variety of microprocessors, such as a central processing unit (CPU) and a graphics processing unit (GPU), and a digital signal processor (DSP), an application specific integrated circuit (ASIC), and a variety of IC memories, such as a video RAM (VRAM), a random access memory (RAM), and a read only memory (ROM).

The control unit 1450 further includes a wireless communication module 1412, a driver circuit for driving the first liquid crystal display 1406 and the second liquid crystal display 1408, a driver circuit for driving the touch panel 1407 and the touch panel 1409, a circuit for receiving signals from the direction input key 1402 and the push switches 1404, an amplifier circuit for outputting an audio signal to the speaker 1410, and a so-called interface (I/F) circuit, such as a signal input/output circuit for the memory card reader 1418. These components of the control unit 1450 are electrically connected to one another via a bus circuit. Thus, data can be read or written, and signals can be exchanged.

The control unit 1450 reads the program and data stored in the memory card 1440 using a memory card reader 1418 and temporarily stores the programs and data in an internal IC memory. Thereafter, the control unit 1450 executes the readout program and performs computation. In this way, the control unit 1450 controls the units of the mobile game machine 1400 in accordance with input operation performed on the direction input key 1402, the push switches 1404, or the touch panels 1407 and 1409.

Note that according to the present embodiment, the mobile game machine 1400 reads the necessary program and various setting data items from the memory card 1440. However, the main program and data loaded into the control unit 1450 may be prestored in an IC memory. Alternatively, the mobile game machine 1400 may connect itself to the communication line 1, such as the Internet, a local area network (LAN), or a wide area network (WAN), wirelessly or wired via the wireless communication module 1412. Thereafter, the mobile game machine 1400 may download the main program and data from an external apparatus.

Outline of Game

Figure 3:
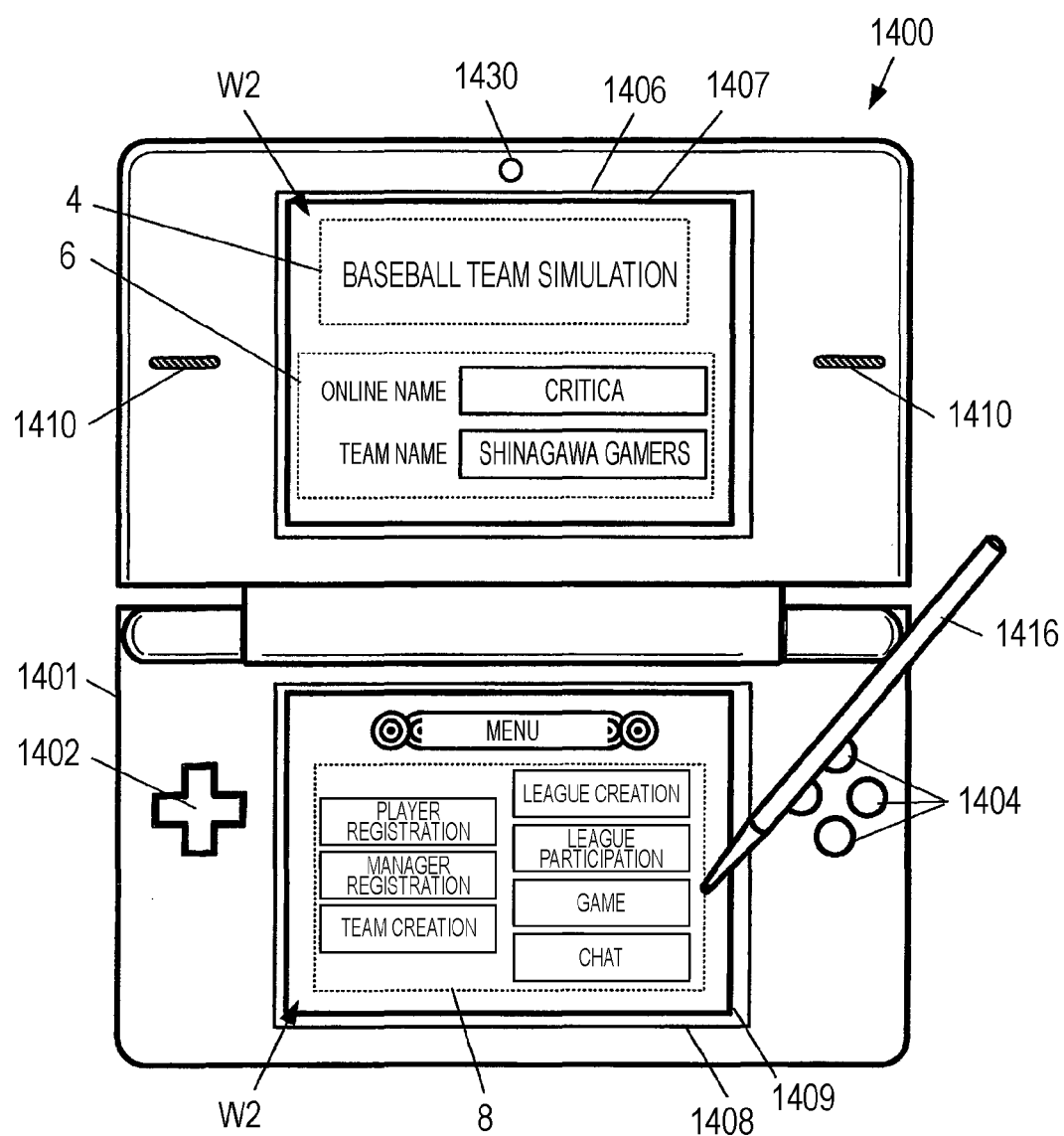
FIG. 3 illustrates an exemplary menu screen of the player terminal.

A baseball game according to the present embodiment is briefly described with reference to FIGS. 3 to 8. First, a game player starts the mobile game machine 1400, which is a player terminal, and instructs the mobile game machine 1400 to execute a game screen display program. Subsequently, the game player connects the mobile game machine 1400 to the server system 1100 via the communication line 1 and performs a predetermined login procedure. As shown in FIG. 3, a menu screen W2 is then displayed.

According to the present embodiment, the mobile game machine 1400 has a dual display. The first liquid crystal display 1406 displays a title display section 4 and an account display section 6. The second liquid crystal display 1408 displays a menu selection icon display section 8 including a plurality of menu selection icons. The game player selects a desired menu selection icon by touching the icon using the stylus pen 1416 or by operating the direction input key 1402 and the push switches 1404.

In order to start the baseball game according to the present embodiment, the game player needs to register the use right of the acquired object (the trading card 3) so that the object can be used in the game. As used herein, registration of a baseball player object (a player card 3b) is referred to as "player registration". Registration of a manager object (a manager card 3a) is referred to as "manager registration".

When an icon "Player Registration" in the menu selection icon display section 8 is selected, request information corresponding to the selecting operation, that is, a request for registration of use of the object (the card) is sent from the mobile game machine 1400 to the server system 1100. Upon receiving the request information, the server system 1100 sends back display information for displaying a player screen on the mobile game machine 1400. Similarly, if some operation is performed on the mobile game machine 1400, request information corresponding to the operation is sent to the server system 1100. Upon receiving the request information, the server system 1100 performs a game management process corresponding to the request information and sends back new display information. In this way, such an operation is repeatedly performed.

Figure 4:
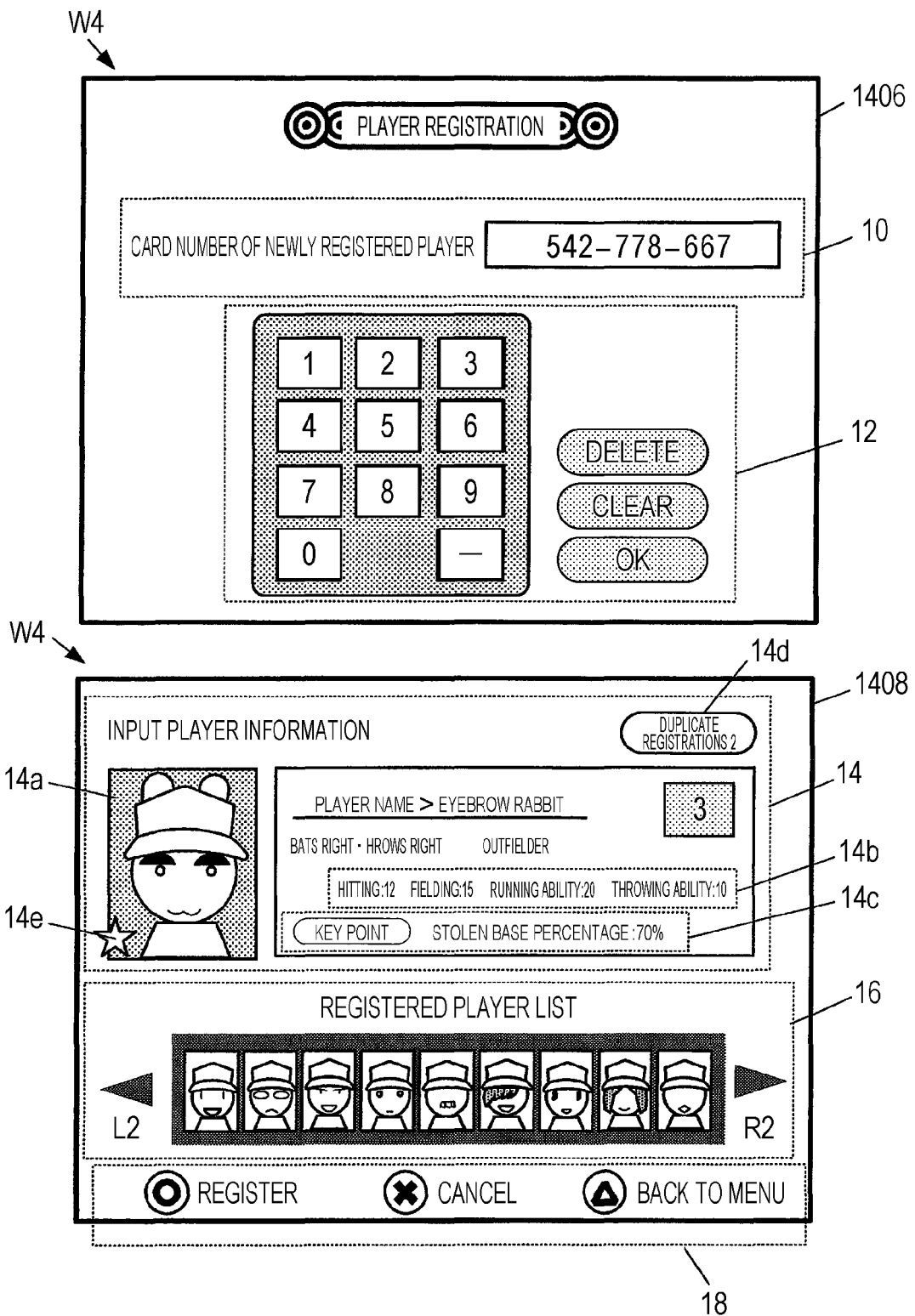
FIG. 4 illustrates an exemplary player registration screen.

FIG. 4 illustrates an example of a player registration screen W4 of the game according to the present embodiment. The upper section of FIG. 4 indicates an upper screen. The lower section of FIG. 4 indicates a lower screen. This also applies to the other drawings. In the player registration screen W4, the following is displayed: an object (card) number entry field 10 used for inputting the object (card) number of an object to be registered, a software keyboard 12 used for inputting the object (card) number, a baseball player information display section 14 used for displaying a description and a parameter (skill) value for the baseball player corresponding to the input object (card) number, and a registered player list 16 used for displaying the icons of the registered baseball players, and an operation guide display 18.

If the game player uses the software keyboard 12 and inputs, into the object (card) number entry field 10, the object (card) number of the object (the trading card 3) that the game player wants to register, the baseball player information associated with the object (card) is returned from the server system 1100. This information is displayed in the baseball player information display section 14. The game player verifies the displayed information in the baseball player information display section 14. If the game player wants to register the baseball player, the game player performs a predetermined registration operation by following the operation guide display 18. After the game player has registered the desired object (the trading card 3) and performed an operation for going back to the menu in order to display the menu screen again, the menu screen W2 is displayed again.

For example, the following data items are displayed in the baseball player information display section 14: a baseball player icon 14a, a uniform number, the name of the player, a fielding position, information as to whether the player bats right-handed or left-handed and throws right-handed or left-handed, an ability parameter value 14b, the description for the player 14c, the number of duplicate registrations 14d, and a bonus gaining mode mark 14e.

According to the present embodiment, the objects (the trading cards 3) corresponding to the same baseball player can be duplicately registered. If a newly registered object (a trading card 3) is the same as an already registered object (the trading card 3) corresponding to the same baseball player, that is, if the baseball players are the same and the series are the same, the two objects (the trading cards 3) are automatically duplicately registered. That is, the same baseball player is not registered as two players, but the new object (the trading card 3) is automatically registered together with the already registered player. The number of duplicate registrations 14d indicates how many objects (the trading cards 3) corresponding to the same baseball player are registered. Note that even when the objects (the trading cards 3) corresponding to the same player are registered, the objects (the trading cards 3) are registered as different players if the series are different (e.g., first and second series) and/or if the designs of the objects (the trading cards 3) are different. This exception is to keep the values of objects (the trading cards 3) in one's collection the same regardless of the series and designs. However, the exception is not limited thereto.

When the objects (the trading cards 3) are duplicately registered, the baseball player corresponding to the objects (the trading card 3) is granted a bonus. The type of bonus is appropriately selectable in accordance with the type of game. The bonus gaining mode mark 14e indicates that a bonus is granted to the baseball player. Note that in a baseball game according to the present embodiment, a bonus is granted so that a game parameter is increased. However, a bonus is not limited thereto. For example, in the case of a role-playing game (RPG), a bonus may be appropriately granted so that an item is given, funds are increased, or hit points are recovered. Thus, the game player can have an advantage over another game player.

In addition, in order to register a manager, the game player selects "Manager Registration" in the menu selection icon display section 8 of the menu screen W2. Thus, a manager object (a manager card 3a) is registered as in the baseball player registration. In this way, the object can become a manager of the team. If an object (a card) having the same type as that of the newly registered object (card) has been registered, the object is double registered as in the baseball player registration.

After baseball player registration and manager registration are completed, the game player creates his/her own team by selecting a starting lineup, backup members, and relief pitchers. In order to create a team, the game player selects "Team Creation" in the menu selection icon display section 8 of the menu screen W2.

Figure 5:
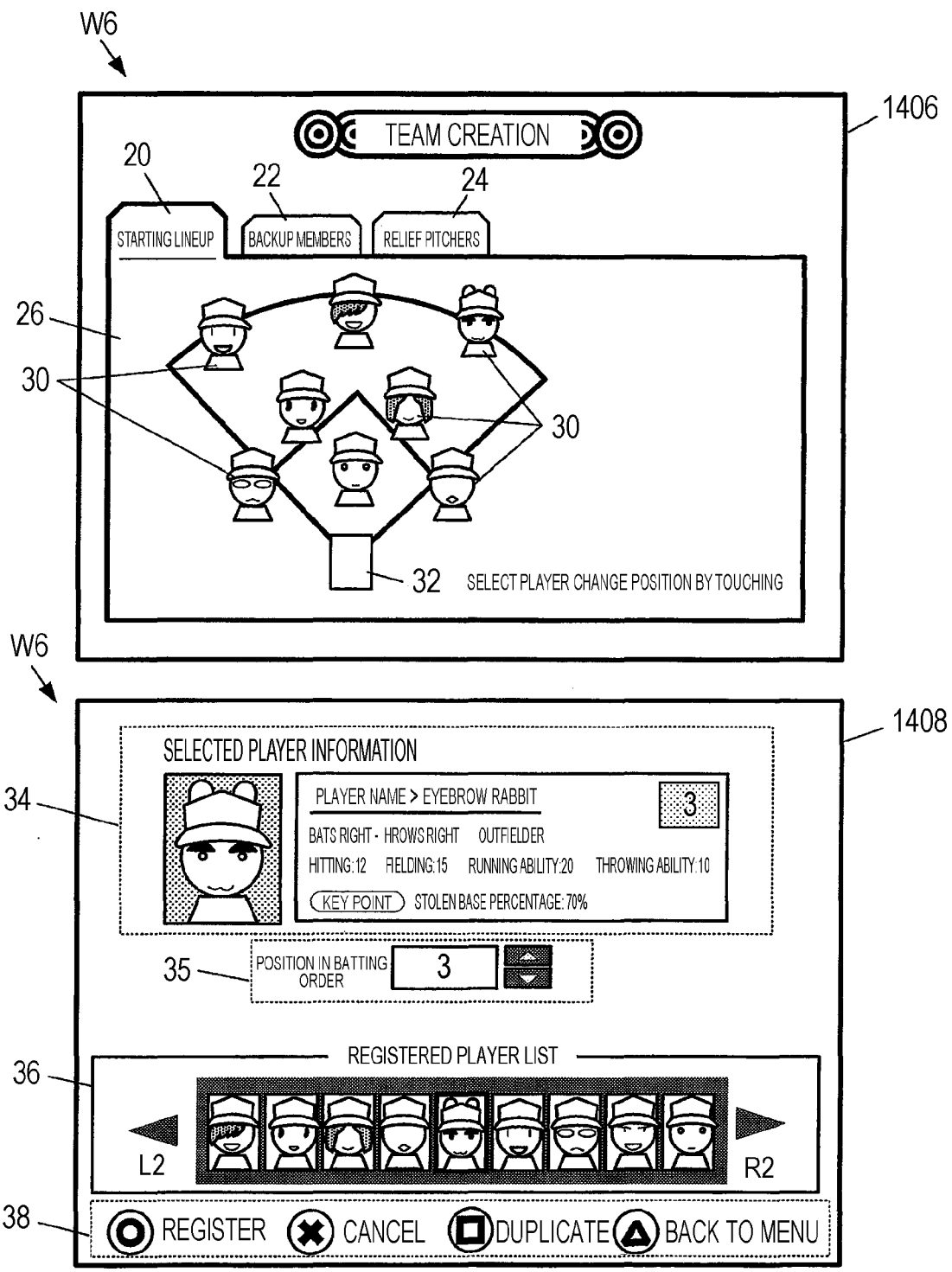
FIG. 5 illustrates an exemplary displayed team creation screen.

When "Team Creation" is selected, the mobile game machine 1400 displays, for example, a team creation screen W6 shown in FIG. 5. The team creation screen W6 includes a starting lineup assignment tag 20 used for switching to a starting lineup assignment screen, a backup member assignment tag 22 used for switching to a backup member assignment screen, and a relief pitcher assignment tag 24 used for switching to a relief pitcher assignment screen. The game player selects desired one of the assignment tags.

If the game player selects the starting lineup assignment tag 20, a starting lineup setting display section 26 is displayed. The starting lineup setting display section 26 displays a schematic bird's-eye view of a field. In addition, player icons 30 of the currently registered baseball players are displayed on the field at their positions. If a player has not yet been assigned to a position, a blank icon 32 is displayed at that position.

In order to select a position in the field, a player icon 30 or a blank icon 32 displayed in the starting lineup setting display section 26 is touched by the stylus pen 1416 or is selected by using the direction input key 1402 and the push switches 1404. If any one of the icons in the starting lineup setting display section 26 is selected, the position of the icon is to be set. The information regarding the player assigned to the position is displayed in a player information display section 34.

If the game player wants to unregister a baseball player for the position to be set, the game player performs a predetermined "Unregister" operation while following an operation guide display 38. If the game player wants to register a new baseball player for the position to be set, the game player selects and touches a baseball player icon of the baseball player in a registered player list 36. Alternatively, the game player may drag and drop the baseball player icon in the registered player list 36 onto an icon at a desired position. The position in the batting order shown in the player information display section 34 can be set using a batting order position setting entry 35.

Note that if the same baseball player separately registered because of different series of objects (the trading cards 3) has already been registered for one of the positions, the baseball player cannot be registered for any other position. That is, two of the same baseball player do not exist.

In contrast, according to the present embodiment, when the starting lineup setting display section 26 is displayed, the game player can intentionally double register the same baseball player separately registered because of different series of objects (the trading cards 3) for one of the positions. More specifically, if the game player drags and drops a player icon in the registered player list 36 onto the player icon 30 of the same player already registered for one of the positions, the original player can be also registered for the drop target position. That is, the player registration of the original player is unregistered. However, according to the present embodiment, the duplicating player, that is, a player having the registration, is granted a bonus, as in the player registration.

In order to perform duplicate registration operation when the starting lineup setting display section 26 is displayed, a button corresponding to a duplicate operation may be operated with the position for which the player has already been registered being selected. Thereafter, the player icon of the same player as the player already registered for the position in the registered player list 36 may be selected.

After the team creation is completed, the game player determines which one of the leagues the created team participates in. The game player can create a league to which the team can join or select one from among leagues that other game players have already created.

Figure 6:
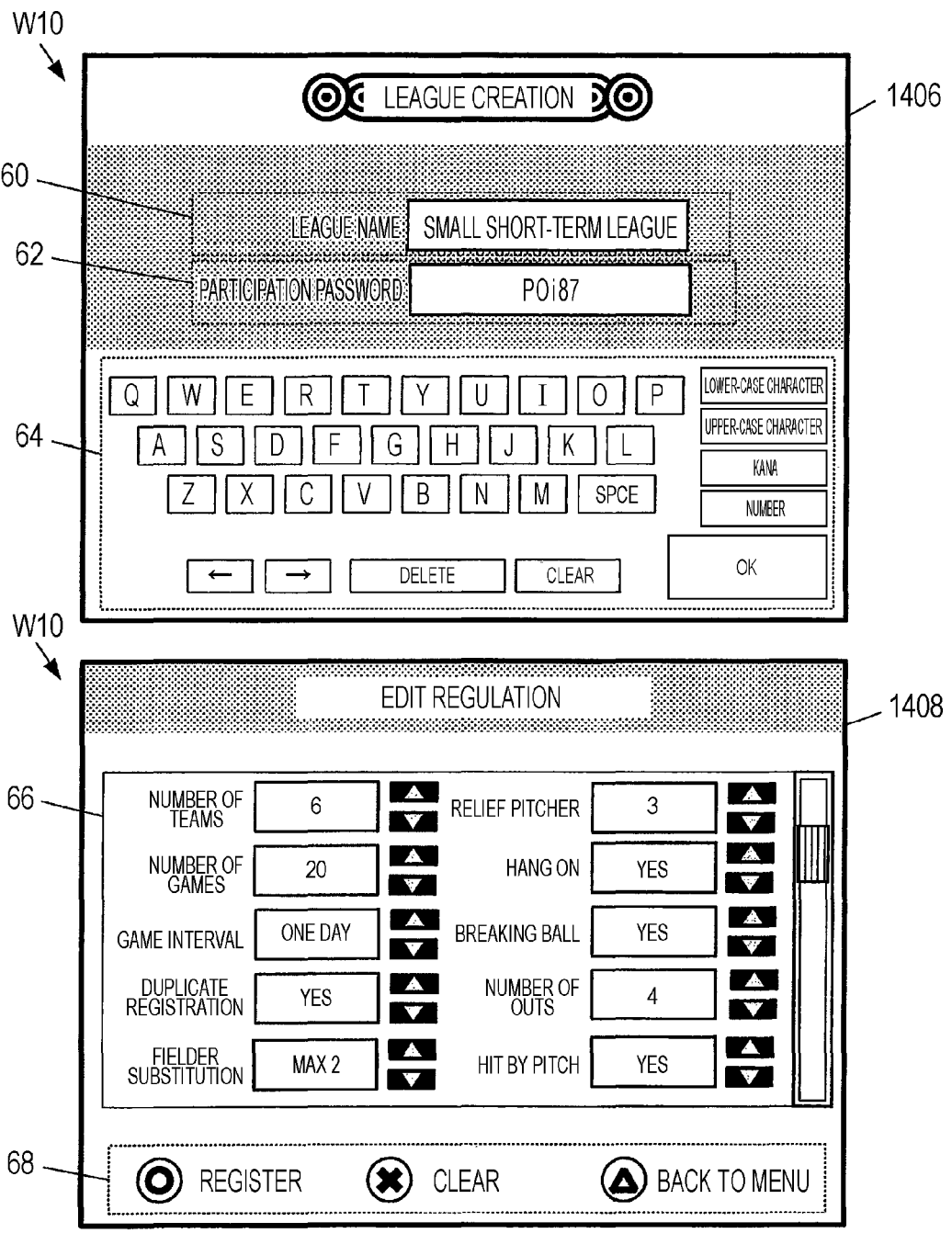
FIG. 6 illustrates an exemplary displayed league creation screen.

If the game player selects "League Creation" in the menu selection icon display section 8 of the menu screen W2, the mobile game machine 1400 displays, for example, a league creation screen W10 shown in FIG. 6. The league creation screen W10 includes a league ID setting field 60 used for setting the name of a league, a participation password setting field 62 required for participating in the league, a software keyboard 64 used for inputting the league name and the password character string (including a number), a regulation setting section 66, and an operation guide display 68.

In the regulation setting section 66, a plurality of combinations of a regulation item of the league and the setting item for the regulation item are displayed in the form of a pull-down menu. In the regulation setting section 66, the game player can freely set the name of the league, the participation password, and a variety of information for the regulation items. According to the present embodiment, the regulation items include an item for setting whether "Duplicate Registration" is allowed or not. The "Duplicate Registration" determines permission for duplication in the league period.

When the league name, the participation password, and a variety of the regulations are set and if a predetermined registration operation is performed while following the operation guide display 68, a new league is registered. Note that the game player may widely distribute the league name and the participation password by telling the name and password to his/her close friends. That is, the game can be enjoyed among close friends through the league.

Figure 7:
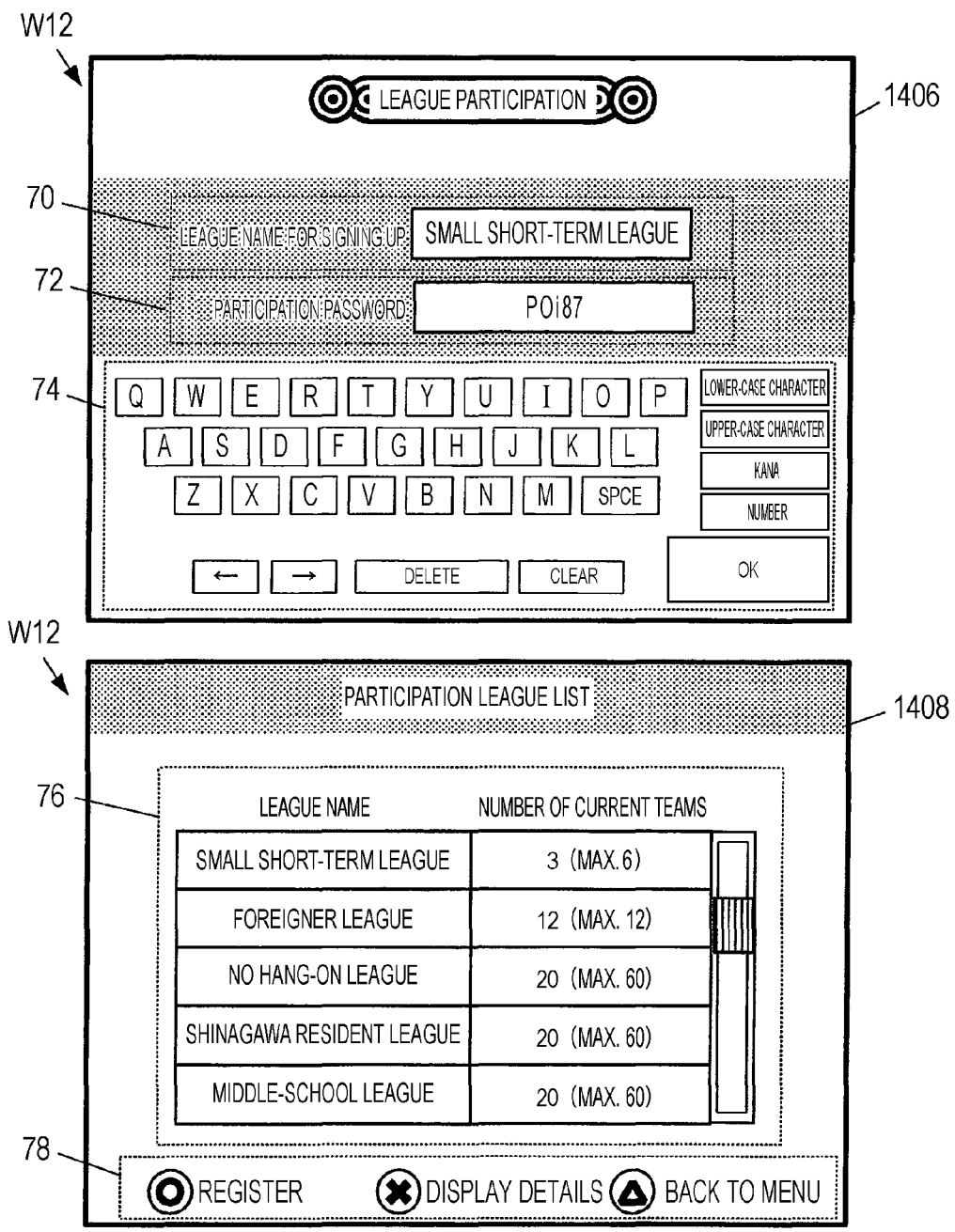
FIG. 7 illustrates an exemplary displayed league participation setting screen.
Figure 8:
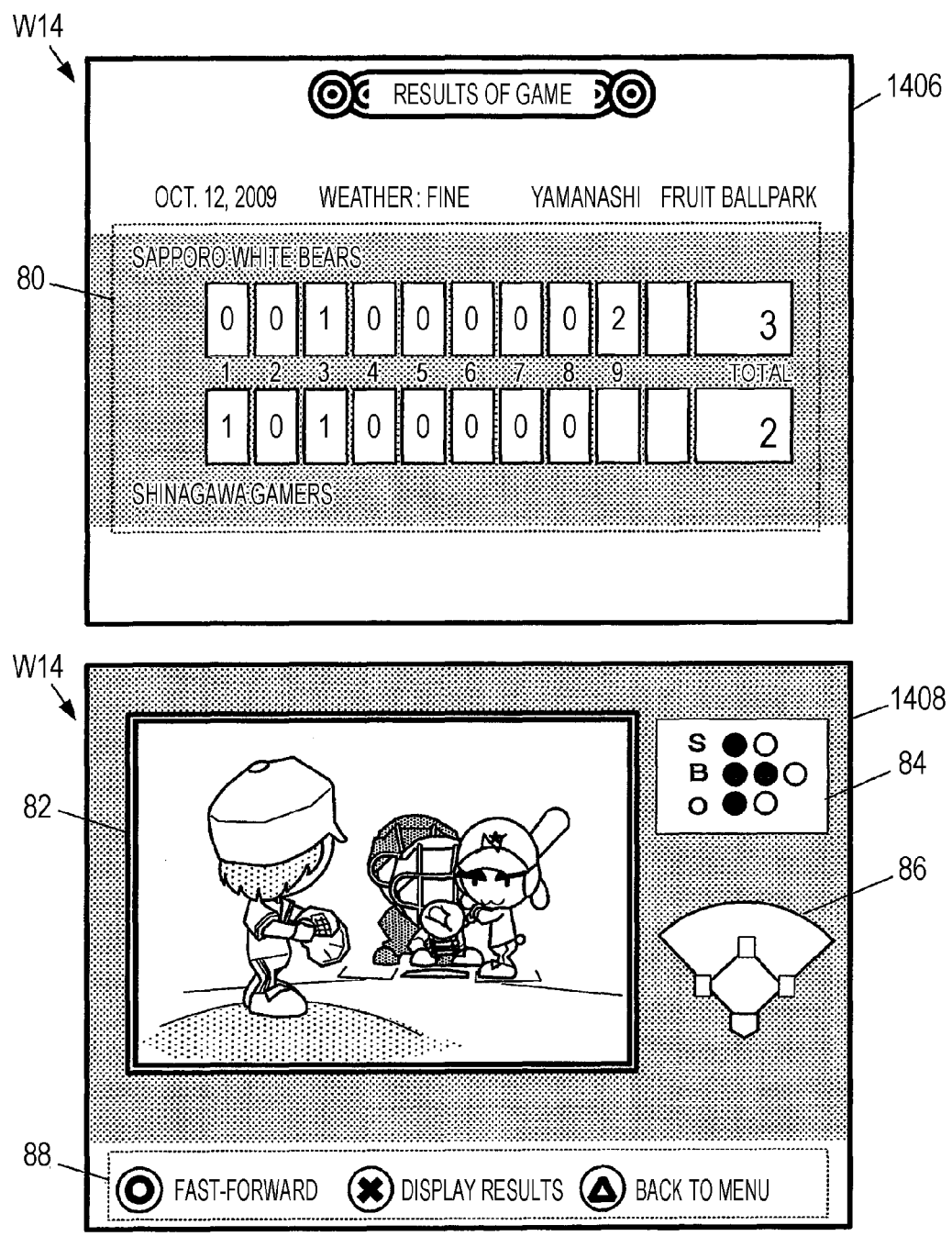
FIG. 8 illustrates an exemplary displayed game simulation screen.

If "League Participation" in the menu selection icon display section 8 of the menu screen W2 is selected, the mobile game machine 1400 displays, for example, a league participation setting screen W12 shown in FIG. 7. The league participation setting screen W12 includes a league ID input field 70 used for inputting the league ID that the game player wants to participate in, a password input field 72 for inputting the password required for the participation, a software keyboard 74 used for inputting character strings (including a number) of the league ID and the password, a league list display 76 for displaying information regarding the registered leagues, and an operation guide display 78.

The game player selects the name of a league (the league ID according to the present embodiment) that the game player wants to participate in by, for example, touching the name of the league displayed in the league list display 76 or inputting the name of the league using the software keyboard 74. Thereafter, the game player inputs the preacquired password for participating in the league using the software keyboard 74 and performs a predetermined registration operation while following the operation guide display 78. In this way, the team of the game player is registered in the league having the input league name.

After team creation and registration of a league that the team participates in are completed, the game player can cause his/her own team to play against a team of another game player.

If "Play" in the menu selection icon display section 8 of the menu screen W2 is selected, the server system 1100 performs a simulation process of a game in which the game player's team plays against a team of another game player in the same league (automatic control of a game). The simulation results are transmitted to the mobile game machine 1400 as needed. The mobile game machine 1400 displays, for example, a game simulation screen W14 shown in FIG. 8.

The game simulation screen W14 includes a scoreboard 80, a gameplay screen display section 82, a count display section 84, an on base status display section 86, and an operation guide display 88.

The gameplay screen display section 82 displays an image indicating the gameplay. This gameplay image is generated by the server system 1100 that simulates the progress of the game. Generation of display information for the gameplay and processing for displaying the display information on the mobile game machine 1400 can be performed as in gameplay screen display of a widely used CGI game.

The game player watches and enjoys the game in the game simulation screen W14 in which his/her own team plays against a team of a friend participating in the same league.

Description of Functional Blocks

Figure 9:
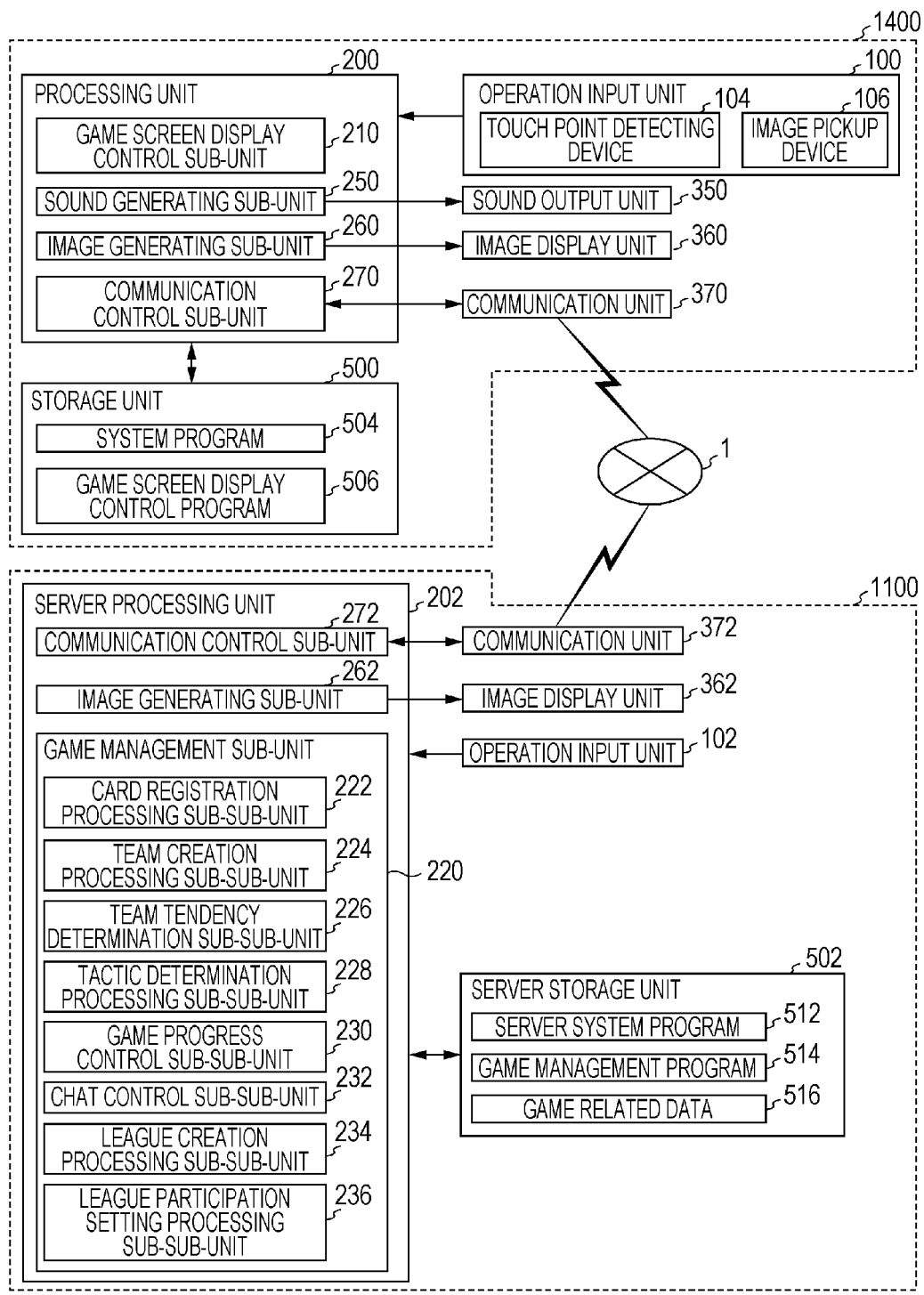
FIG. 9 is an exemplary functional block diagram of the mobile game machine functioning as a player terminal and a server system according to the embodiment.

An exemplary functional structure according to the present embodiment is described next. FIG. 9 is a functional block diagram of the mobile game machine 1400 functioning as a player terminal and the server system 1100 according to the present embodiment.

The mobile game machine 1400 includes an operation input unit 100, a processing unit 200, and a sound output unit 350, an image display unit 360, a communication unit 370, and a storage unit 500.

The operation input unit 100 outputs, to the processing unit 200, an operation input signal in accordance with a variety of operations performed by a game player. For example, the operation input unit 100 includes push switches, a joystick, a touch pad, a trackball, and one of a multi-axis detecting acceleration sensor having at least two detection axes, a plurality of single-axis detecting acceleration sensors having different detecting directions, a multi-directional detection inclination sensor having at least two detection directions, and a plurality of unidirectional detection inclination sensor units having different detecting directions. The direction input key 1402, the push switches 1404, and a three-axis acceleration sensor 1422 shown in FIG. 2 correspond to these components.

The operation input unit 100 further includes a touch point detecting device 104 and an image pickup device 106. The touch point detecting device 104 is formed from a device capable of detecting a touched point in the display screen area. The touch panels 1407 and 1409 shown in FIG. 2 correspond to the touch point detecting device 104. The image pickup device 106 is a device for capturing image information. For example, the image pickup device 106 is formed from a CCD image sensor or a CMOS image sensor. The image sensor 1430 shown in FIG. 2 corresponds to the image pickup device 106.

The processing unit 200 is formed from electronic components, such as a microprocessor (e.g., a CPU or a GPU), an application specific integrated circuit (ASIC), and an IC memory. The processing unit 200 performs data input and output control among the functional units including the operation input unit 100 and the storage unit 500. In addition, the processing unit 200 performs a variety of computing operations in accordance with the operation input signals received from the operation input unit 100. Thus, the processing unit 200 controls the operation performed by the mobile game machine 1400. The control unit 1450 shown in FIG. 2 corresponds to the processing unit 200. According to the present embodiment, the processing unit 200 includes a game screen display control sub-unit 210, a sound generating sub-unit 250, and an image generating sub-unit 260, and a communication control sub-unit 270.

The game screen display control sub-unit 210 receives display information from the server system 1100 and displays a variety of game screens, such as the menu screen W2, the player registration screen W4, the team creation screen W6, the league creation screen W10, the league participation setting screen W12, and the game simulation screen W14. Thereafter, the game screen display control sub-unit 210 sends, to the server system 1100, request information in accordance with an operation performed by the game player on the operation input unit 100 for each of the game screens. More specifically, such processing is realized by using a Web browser based technique for actively controlling screen display using HTML, Java (trade name), and CSS (cascading style sheets) or an active plug-in, such as Adobe (trade name) Flash. However, another technique may be used.

The sound generating sub-unit 250 includes, for example, a digital signal processor (DSP), a processor such as a sound synthesis IC, or a sound-file reproducible audio codec. The sound generating sub-unit 250 generates sound signals of sound effects for a game, back-ground music (BGM), and sound for a variety of operations in accordance with the results of processing performed by the game screen display control sub-unit 210. Thereafter, the sound generating sub-unit 250 outputs the sound signals to the sound output unit 350.

The sound output unit 350 is formed from a unit for outputting, for example, sound of the sound effects and the BGM in accordance with the sound signals input from the sound generating sub-unit 250. The speaker 1410 shown in FIG. 2 corresponds to the sound output unit 350.

The image generating sub-unit 260 includes, for example, a processor, such as a GPU or a DSP, a video signal IC, a program such as video codec, or a frame rendering IC memory, such as a frame buffer. The image generating sub-unit 260 generates one game screen per frame period (e.g., 1/60 second) in accordance with the result of processing performed by the game screen display control sub-unit 210 and outputs the generated game screen to the image display unit 360.

The image display unit 360 displays a variety of game screens in accordance with the image signals input from the image generating sub-unit 260. For example, the image display unit 360 is formed from an image display apparatus, such as a flat panel display, a cathode ray tube (CRT), a projector, or a head-mounted display. According to the present embodiment, the first liquid crystal display 1406 and the second liquid crystal display 1408 shown in FIG. 2 correspond to the image display unit 360.

The communication control sub-unit 270 performs data processing for data communication. The communication control sub-unit 270 exchanges data with an external apparatus via the communication unit 370.

The communication unit 370 is connected to the communication line 1 and performs a communication process. For example, the communication unit 370 is formed from a wireless communication device, a modem, a terminal adaptor (TA), or a cable jack of a communication cable and control circuit. The wireless communication module 1412 shown in FIG. 2 corresponds to the communication unit 370.

The storage unit 500 stores a system program causing the processing unit 200 to perform a variety of functions for overall control of the mobile game machine 1400 and a program and a variety of data items required for game play. In addition, the storage unit 500 is used as a work area of the processing unit 200. The results of computation performed by the processing unit 200 in accordance with execution of the variety of programs and input data received from the operation input unit 100 are temporarily stored in the storage unit 500. This function is realized by, for example, an IC memory, such as a RAM or a ROM, a magnetic disk, such as a hard disk, or an optical disk, such as a CD-ROM or a DVD. The IC memory and the memory card 1440 mounted in the control unit 1450 shown in FIG. 2 correspond to the storage unit 500.

According to the present embodiment, the storage unit 500 stores a system program 504 and a game screen display control program 506. The system program 504 provides a basic input and output function of the mobile game machine 1400 serving as a computer. The game screen display control program 506 is an application program that is read and executed by the processing unit 200 in order to realize the function of the game screen display control sub-unit 210. However, the game screen display control program 506 may be included in the system program 504.

According to the present embodiment, the server system 1100 includes an operation input unit 102, a server processing unit 202, an image display unit 362, a communication unit 372, and a server storage unit 502.

The operation input unit 102 is a unit used for inputting a variety of operations in order to manage a server. The operation input unit 102 has a similar configuration to that of the operation input unit 100 of the mobile game machine 1400. The keyboard 1106 shown in FIG. 1 corresponds to the operation input unit 102.

The server processing unit 202 is formed from electronic components, such as a microprocessor (e.g., a CPU or a GPU), an ASIC, and an IC memory. The server processing unit 202 performs data input and output control among the functional units including the operation input unit 102 and the server storage unit 502. In addition, the server processing unit 202 performs a variety of computing operations in accordance with the operation input signals received from the operation input unit 102. Thus, the server processing unit 202 controls the operation performed by the server system 1100. According to the present embodiment, the server processing unit 202 includes a game management sub-unit 220, an image generating sub-unit 262, and a communication control sub-unit 272.

The game management sub-unit 220 generates display information for a variety of game screens to be displayed on a terminal player, manages information regarding game players participating in the baseball simulation game, manages the team setting information, and performs a simulation process. More specifically, the game management sub-unit 220 includes a card registration processing sub-sub-unit 222, a team creation processing sub-sub-unit 224, a team tendency determination sub-sub-unit 226, a tactic determination processing sub-sub-unit 228, a game progress control sub-sub-unit 230, a league creation processing sub-sub-unit 234, and a league participation setting processing sub-sub-unit 236.

The card registration processing sub-sub-unit 222 performs processing regarding registration of the right of use for an object (a trading card 3—a manager card 3a and a player card 3b). Thus, the game player can use a character corresponding to the object (the trading card 3) in the game. For example, the card registration processing sub-sub-unit 222 generates display information regarding the player registration screen W4 (refer to FIG. 4), verifies the object (card) number, determines whether the registration of the right of use is to be granted or not, and makes a list of baseball players corresponding to the newly registered objects (cards).

The team creation processing sub-sub-unit 224 generates display information for the team creation screen W6 (refer to FIG. 5) to be displayed on a terminal player and creates a team for the game player in accordance with an input operation performed on the team creation screen W6 displayed on the player terminal. That is, the team creation processing sub-sub-unit 224 performs a process for creating a starting lineup, a process for listing backup members, and a process for listing relief pitchers.

The team tendency determination sub-sub-unit 226 determines the team tendency in terms of predetermined tactic determination elements. According to the present embodiment, the team tendency determination sub-sub-unit 226 computes a "basic offensive tactic tendency parameter" and a "basic defensive tactic tendency parameter" that indicate the offensive tactics tendency and defensive tactics tendency for the team using a personal tactic tendency parameter 530 (refer to FIG. 13) for each of the baseball players that satisfy predetermined member conditions (for the starting lineup).

The tactic determination processing sub-sub-unit 228 is one of the functional units that realize automatic control of game play. The tactic determination processing sub-sub-unit 228 determines the tactics for offensive and defensive on the basis of the tendency for the team tactic determination elements. More specifically, the tactic determination processing sub-sub-unit 228 determines the offensive and defensive tactics on the basis of the tendency for the team tactic determination factors (a "basic offensive tactic tendency parameter" and a "basic defensive tactic tendency parameter"), the tendency determined for main characters of the team (according to the present embodiment, a pitcher, a batter, and a manager, i.e., characters that have a great influence on selection of a tactics on each scene), and the progress of the game play.

More specifically, the personal tactic tendency parameter 530 of a baseball player who currently has influence on tactics selection (according to the present embodiment, a pitcher or a batter) is added to the basic offensive tactic tendency parameter or the basic defensive tactic tendency parameter. Thus, an "intermediate offensive tactic tendency parameter" or an "intermediate defensive tactic tendency parameter" is computed. In addition, the personal tactic tendency parameter 530 for the manager is added to the intermediate offensive tactic tendency parameter or the intermediate defensive tactic tendency parameter. In this way, a tactic tendency parameter (a "final offensive tactic tendency parameter" or a "final defensive tactic tendency parameter") used when the tactic is finally selected is computed. The tactic tendency parameters are included in game related data 516.

The game progress control sub-sub-unit 230 is one of the functional units that realize automatic control of game play. The game progress control sub-sub-unit 230 mainly performs the simulation process of a baseball game. That is, the game progress control sub-sub-unit 230 AI-controls the baseball players of the team owned by the game player and baseball players of the other team and determines the actions of the baseball players. In this way, the game progress control sub-sub-unit 230 simulates the baseball game. At that time, the game progress control sub-sub-unit 230 generates display information for the simulated game play to be displayed on the player terminal.

The chat control sub-sub-unit 232 performs processing so that a chat function is provided to the game players in order to communicate with each another.

The league creation processing sub-sub-unit 234 performs processing for creation of a framework of a parent population used for selecting an opponent team on the basis of an input operation performed by the game player. More specifically, the league creation processing sub-sub-unit 234 performs a process for setting an ID, such as a league name, a condition for participating in the parent population (including a password), and regulation applied to the opponent team selected from the parent population. Still more specifically, the league creation processing sub-sub-unit 234 generates display information regarding the league creation screen W10 and stores league setting information generated in accordance with operation inputs to the league creation screen W10 in the server storage unit 502. Note that if the game is a tournament game, not a league game, the parent population is set to tournament.

The league participation setting processing sub-sub-unit 236 performs a procedure for allowing the team created by the game player to participate in the parent population created by the league creation processing sub-sub-unit 234. More specifically, the league participation setting processing sub-sub-unit 236 generates display information regarding the league participation setting screen W12 (refer to FIG. 7) to be displayed on the player terminal. Thereafter, the league participation setting processing sub-sub-unit 236 performs a participation registration process on the basis of input operation performed on the league participation setting screen W12.

The image generating sub-unit 262 generates an image regarding maintenance of the server system 1100 and outputs the image to the image display unit 362. When the image generating sub-unit 262 sends a still image or a moving image serving as display information of the game play, the image generating sub-unit 262 may generate such a maintenance image.

The image display unit 362 displays a variety of images for system management on the basis of image signals input from the image generating sub-unit 262. For example, the image display unit 362 is formed from an image display apparatus, such as a flat panel display, a cathode ray tube (CRT), a projector, or a head-mounted display. The display monitor 1108 shown in FIG. 1 corresponds to the image display unit 362.

The communication control sub-unit 272 performs data processing for data communication. The communication control sub-unit 272 exchanges data with an external apparatus via the communication unit 372.

The communication unit 372 is connected to the communication line 1. The communication unit 372 performs a communication process. For example, the communication unit 372 is formed from a wireless communication device, a modem, a terminal adaptor (TA), or a cable jack of a communication cable and control circuit.

The server storage unit 502 stores a system program causing the server processing unit 202 to perform a variety of functions for overall control of the server system 1100 and a program and a variety of data items required for managing a game play. In addition, the server storage unit 502 is used as a work area of the server processing unit 202. The results of computation performed by the server processing unit 202 in accordance with execution of the variety of programs are temporarily stored the server storage unit 502. This function is realized by, for example, an IC memory, such as a RAM or a ROM, a magnetic disk, such as a hard disk, or an optical disk, such as a CD-ROM or a DVD. In FIG. 1, an information storage medium, such as an IC memory and a hard disk, mounted in the blade servers 1102 corresponds to the server storage unit 502.

According to the present embodiment, the server storage unit 502 stores a server system program 512, a game management program 514, and the game related data 516.

The server system program 512 is a system program that is read and executed by the server processing unit 202. Thus, the server system 1100 can have a required basic input and output function. The game management program 514 is also read and executed by the server processing unit 202. Thus, the function of the game management sub-unit 220 can be realized.

Figure 10:
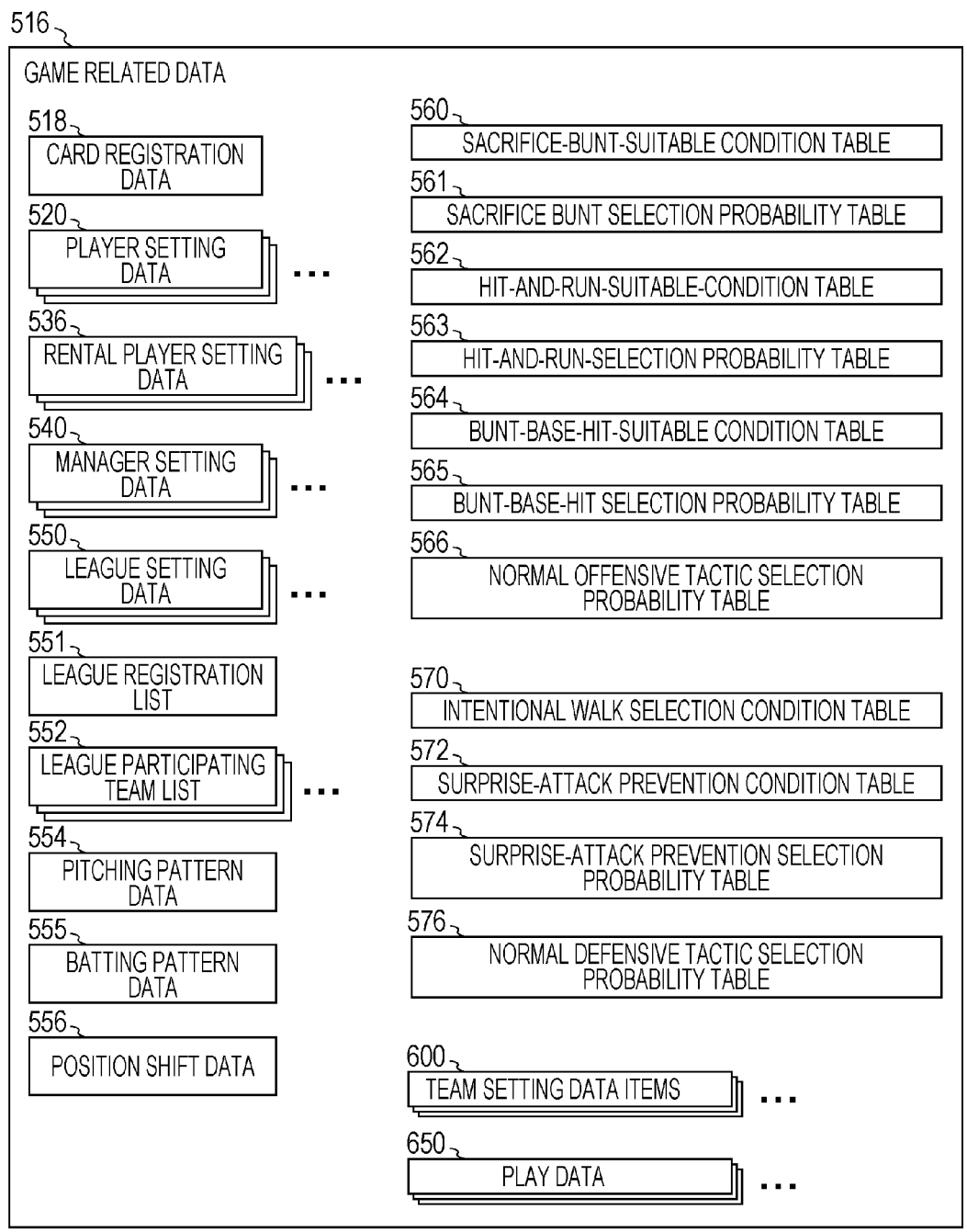
FIG. 10 illustrates an exemplary data structure of game related data.

FIG. 10 illustrates an example of the game related data 516. The game related data 516 includes information regarding card registration and initial setting for characters appearing in a game. Examples of such data include card registration data 518, player setting data 520 for a plurality of baseball players, rental player setting data 536 for a plurality of rental baseball players, and manager setting data 540 for a plurality of managers.

The game related data 516 further includes information regarding a league. Examples of such data include league setting data 550, a league registration list 551, and league participating team list 552.

The game related data 516 further includes information used for determining a particular action of a baseball player in accordance with a variety of offensive and defensive tactics. Examples of such data include pitching pattern data 554, batting pattern data 555, and position shift data 556.

The game related data 516 further includes information used for selecting an offense tactic of an offense team when simulation of a game play is performed. Examples of such data include a sacrifice-bunt-suitable condition table 560, a sacrifice bunt selection probability table 561, a hit-and-run-suitable-condition table 562, a hit-and-run-selection probability table 563, a bunt-base-hit-suitable condition table 564, a bunt-base-hit selection probability table 565, and a normal offensive tactic selection probability table 566.

The game related data 516 further includes information used for selecting a defense tactic of a defense team when simulation of a game play is performed. Examples of such data include an intentional walk selection condition table 570, a surprise-attack prevention condition table 572, a surprise-attack prevention selection probability table 574, and a normal defensive tactic selection probability table 576.

The game related data 516 further includes a plurality of team setting data items 600 that include information regarding a team and that are set by the game player and play data 650 including information generated and updated as needed when the game play progresses. Still furthermore, the game related data 516 includes a variety of information items required for managing and controlling the game as needed. Examples of such data include a timer, a counter, a flag, and an IP address of the mobile game machine 1400 that is logged in.

Such data items are described in more detail below.

The card registration data 518 includes a variety of information items regarding the commercially available objects (the trading cards 3). As shown in FIG. 11, examples of such information items include an object (card) number 518*a* assigned to each of the objects (the trading cards 3), a player ID 518*b* which is identification information regarding the player corresponding to the object (card) number 518*a* (a manager ID in the case of a manager), a series ID 518*c* that includes identification information regarding a sale series, and an in-use flag 518*d*. The in-use flag 518*d* of "1" indicates that the object (the card) has already been used for player registration or manager registration, while the in-use flag 518*d* of "0" indicates that the object (the card) has not yet been used.

The player setting data 520 defines whether the baseball player is a fielder, a catcher, or a pitcher. The player setting data 520 is prepared for each of the baseball players appearing in the baseball game according to the present embodiment.

Figure 12:
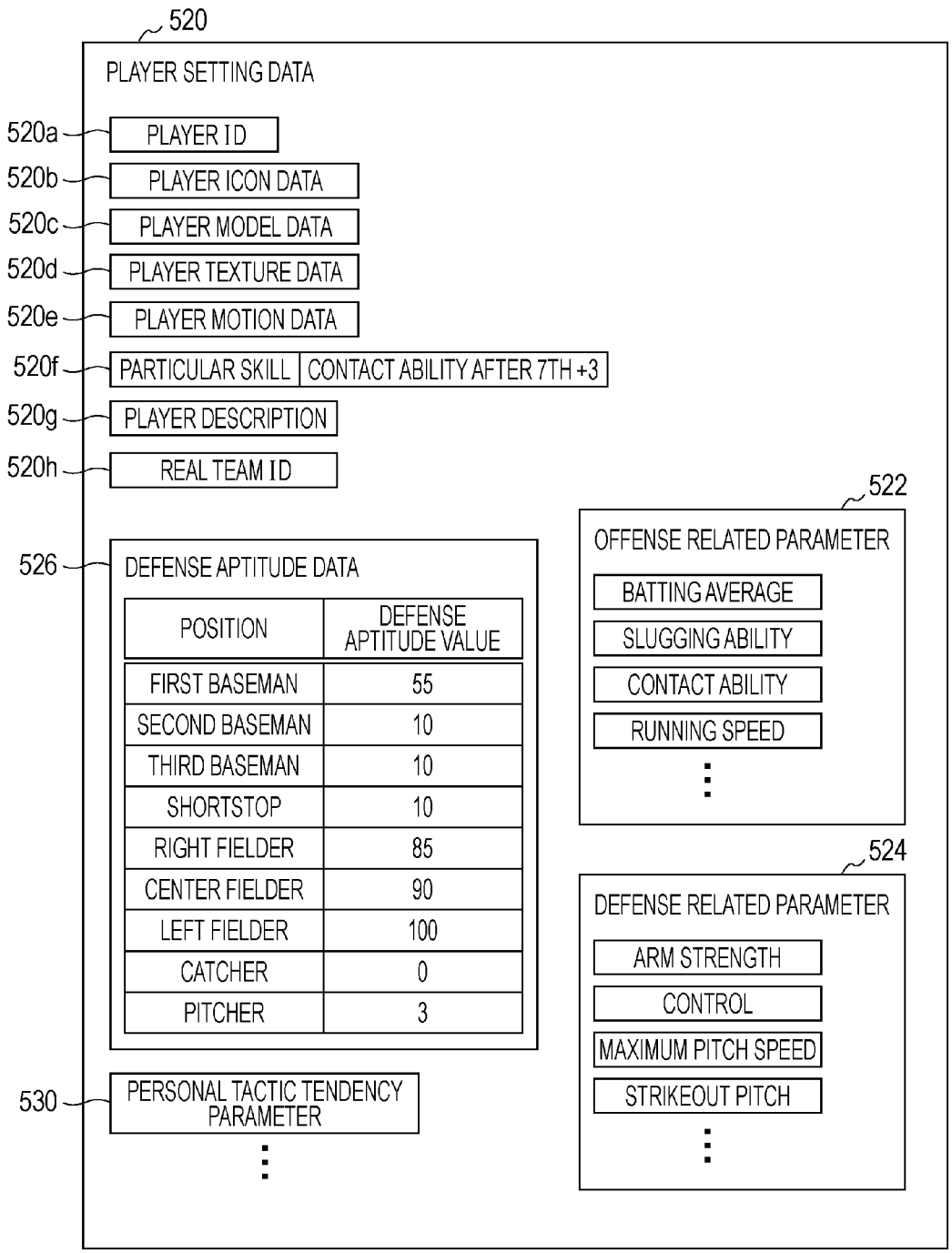
FIG. 12 illustrates an exemplary data structure of player setting data.

For example, as shown in FIG. 12, the player setting data 520 includes a player ID 520a that contains identification information, such as the name of the player, player icon data 520b used for displaying the player icon 30 on, for example, the team creation screen W6 (refer to FIG. 5), player model data 520c used for displaying a player playing a baseball in the game play screen display section 82 (refer to FIG. 8), player texture data 520d, and player motion data 520e.

The player setting data 520 further includes a particular skill 520f, a player description 520g, and a real team ID 520h.

The particular skill 520f is information that defines a particular trigger condition and the process applied to the player when the particular trigger condition is satisfied. The trigger conditions are defined as a variety of parameter values indicating the game status (e.g., the current inning, outs, the batting order, balls and strikes, and on-base status). The applied process is defined as, for example, a value added to or subtracted from the skill parameter value.

The player description 520g contains text information to be displayed in the baseball player information display sections 14 and 34 of the player registration screen W4 and the team creation screen W6.

The real team ID 520h contains information for identifying the team of a real baseball league in which the baseball player participates.

The player setting data 520 further includes the information regarding the ability and aptitude of the player and the player's characteristic actions. Examples of such information include an offense related parameter 522, a defense related parameter value 524, defense aptitude data 526, and a personal tactic tendency parameter 530.

The offense related parameter 522 defines the abilities of the player in the case of offense, such as the hitting and running abilities. For example, the following parameters are set: batting average, slugging ability, bat-ball contact ability, and running speed.

The defense related parameter value 524 defines the abilities of the player in the case of defense, such as pitching and fielding. For example, the following parameters are set: arm strength, control, maximum pitch speed, and pay off pitch.

The defense aptitude data 526 indicates which position the player has an aptitude for. A defense aptitude value is set for each of the positions (0 (zero aptitude) to 100 (the highest aptitude)).

Figure 13:
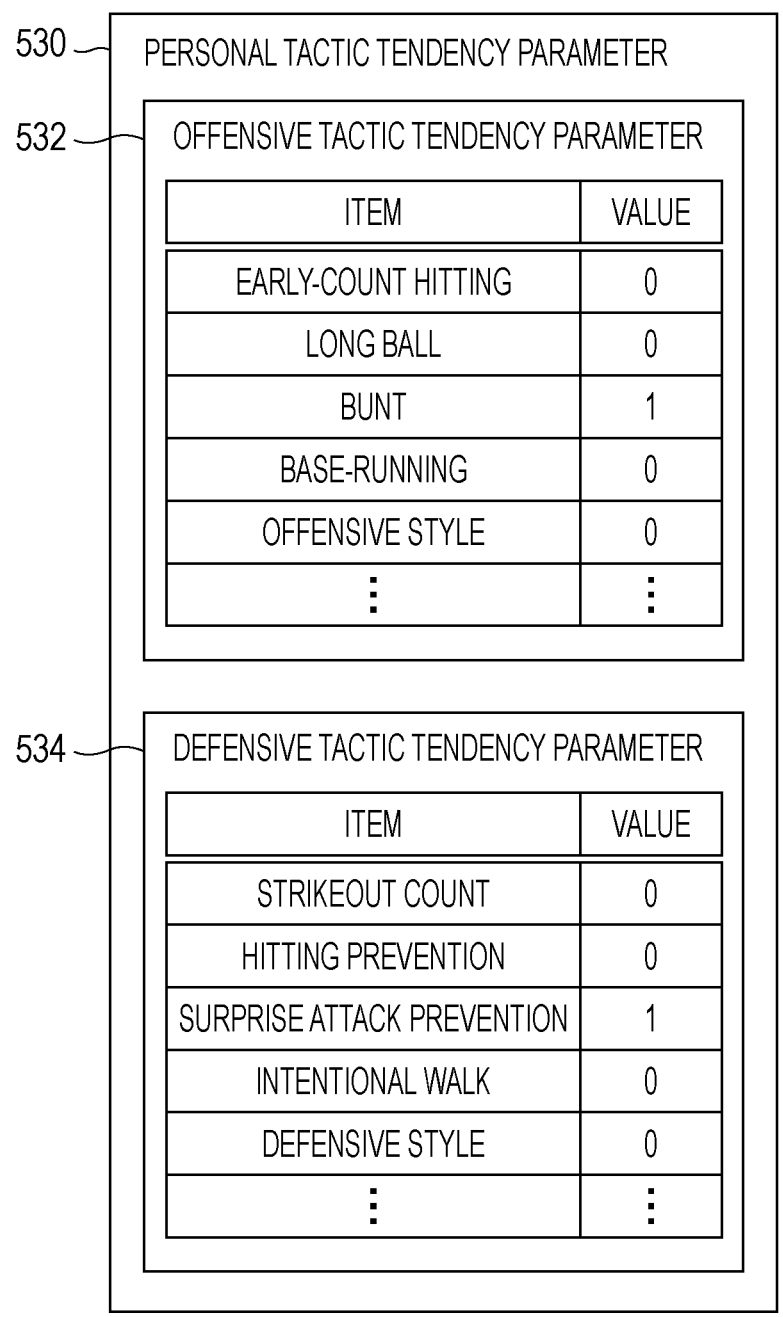
FIG. 13 illustrates an exemplary data structure of a personal tactic tendency parameter.

The personal tactic tendency parameter 530 contains the personal preferences indicating which actions tend to be selected by the player in offense and defense actions, such as batting and running in a game play. For example, as shown in FIG. 13, the personal tactic tendency parameter 530 contains an offensive tactic tendency parameter 532 and a defensive tactic tendency parameter 534.

The offensive tactic tendency parameter 532 contains the following parameters and the values thereof:

(1) "early-count hitting": With an increase in the value thereof, the player is more aggressive (attempts to swing the bat) early in the count.

(2) "Long-ball hitting": With an increase in the value thereof, the player more prefers hitting a long ball.

(3) "Bunt": With an increase in the value thereof, the player has a higher bunt success rate.

(4) "Base-running": With an increase in the value thereof, the player more aggressively steals a base.

(5) "Offense Style": With an increase in the value thereof, the player more prefers an aggressive play and, in addition, the player more prefers an aggressive play as the time elapses from the early inning to the middle inning to the late inning. Such a parameter can be appropriately created as needed in accordance with a game.

The defensive tactic tendency parameter 534 contains the following parameters and the values thereof:

(1) "strikeout count": With an increase in the value thereof, the player more prefers to strike out a batter in the count.

(2) "long ball hitting prevention": With an increase in the value thereof, the player is more cautious about a batter hitting a long ball.

(3) "surprise attack prevention": With an increase in the value thereof, the player is more cautious about a surprise attack, such as bunting for a base hit, hit-and-run, and a squeeze play.

(4) "intentional walk": With an increase in the value thereof, the player more employs an intentional walk tactic.

(5) "defense Style": With an increase in the value thereof, the player more carefully plays and, in addition, the player more carefully plays as the time elapses from the early inning to the middle inning to the late inning.

Such an item of the parameter can be appropriately created as needed in accordance with a game.

Note that according to the present embodiment, the offensive tactic tendency parameter 532 and the defensive tactic tendency parameter 534 generally have a value of "0" which indicates a middle value. However, the value is set between −2 and +2 for a fielder, a pitcher, or a catcher who has high ability so that, for example, he has won the Golden Glove Award or has earned the Triple Crown. In addition, the sum of the parameter values for the starting lineups is set so as to be between −5 and +5. In this way, the plus values and the minus values are appropriately used in order to obtain such limitation. However, the set values are not limited thereto. For example, appropriate values may be assigned to the parameters for all of the players.

The rental player setting data 536 includes player setting data for a player automatically borrowed if the number of the objects (cards) acquired by the game player is less than the starting lineups. The structure of the data can be similar to that of the player setting data 520. However, the player ID assigned to the rental player is unique to the rental player. That is, even when one of the players corresponding to the objects (the trading cards 3) is the same as the rental player, the player IDs differs from each other. Thus, the rental player is considered as a different character. In addition, in order to keep the motivation of a buyer of an object (a trading card 3), the rental player is inferior to the regular player in terms of the various parameters of the player setting data 520.

The manager setting data 540 is similar to the player setting data 520 for a player. The manager setting data 540 contains a variety of setting data items for a manager. The manager setting data 540 is prepared for each of the managers appearing in the game.

Figure 14:
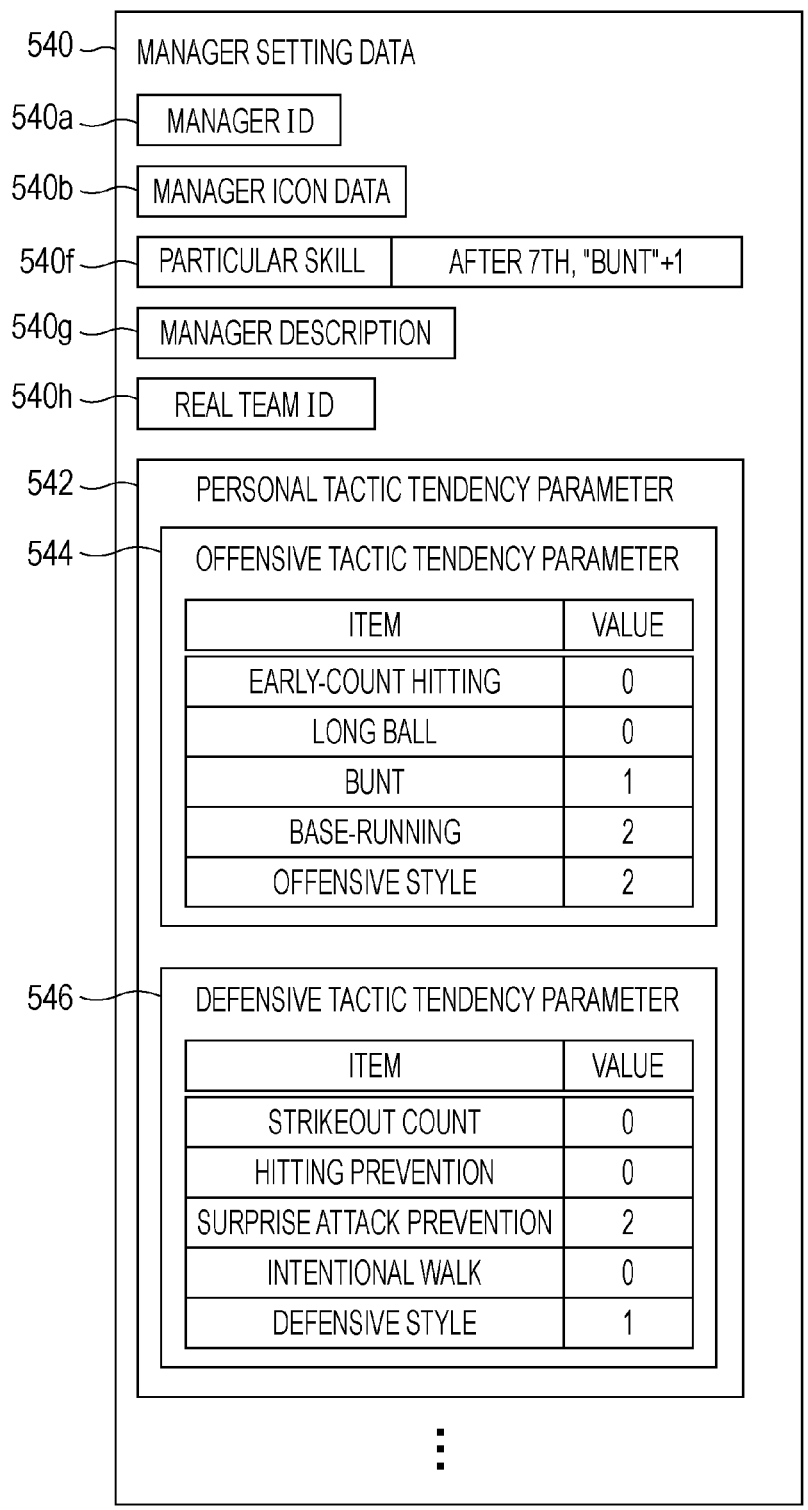
FIG. 14 illustrates an exemplary data structure of manager setting data.

More specifically, for example, as shown in FIG. 14, the manager setting data 540 includes a manager ID 540a that contains identification information, such as the name of the manager, manager icon data 540b that is displayed on, for example, the screen used for the object (the card) of the manager, a particular skill 540f, a manager description 540g, a real team ID 540h, and a personal tactic tendency parameter 542. Like the personal tactic tendency parameter of the player setting data 520, the personal tactic tendency parameter 542 includes an offense tactic tendency parameter 544 and a defense tactic tendency parameter 546.

The league setting data 550 includes the setting information for the league that the game player has created. The league setting data 550 is prepared for each of the created leagues. According to the present embodiment, for example, as shown in FIG. 15, the league setting data 550 includes a league ID 550a that contains identification information, such as the name of the league, a participation password 550b, and regulation setting data 550c. The regulation setting data 550c contains a setting value for each of regulation items.

The league registration list 551 is a list of all leagues created by the game players. The league registration list 551 contains the league ID and the associated participation password.

The league participating team list 552 serves as a data set containing information regarding the teams currently participating in each of the leagues. The league participating team list 552 is prepared for each of the leagues. For example, as shown in FIG. 16, each of the league participating team lists 552 includes a corresponding league ID 552a containing the corresponding league ID, a participating team ID 552b, and team performance 552c associated with the participating team ID 552b.

The pitching pattern data 554 provides basic information for determining the sequence of pitches (the stuff) for an at-bat. A pitching pattern is prepared for each of defensive tactics.

Figure 17:
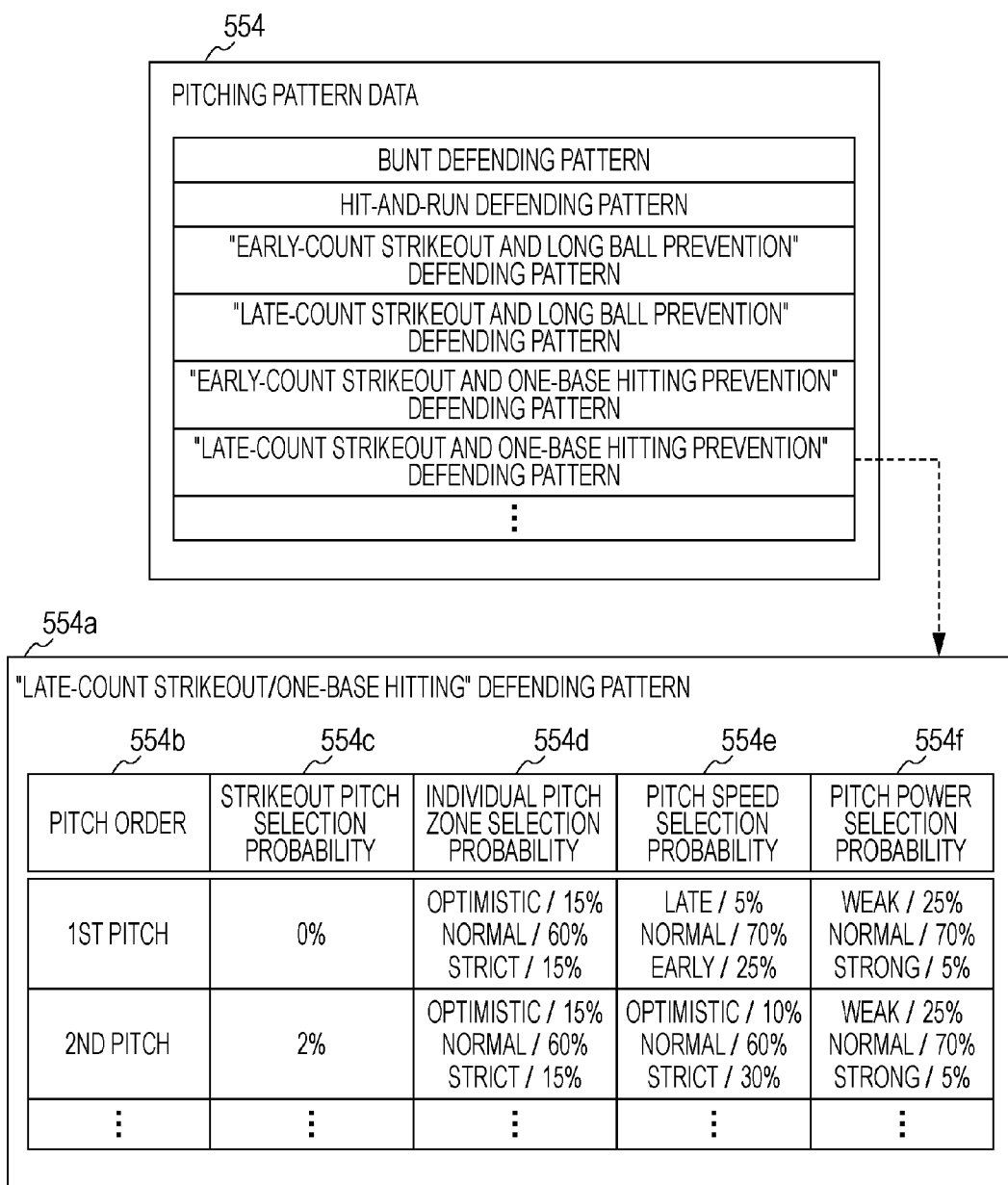
FIG. 17 illustrates an exemplary data structure of pitching pattern data.

For example, as shown in FIG. 17, the following patterns are prepared: a bunt defense pattern, a hit-and-run defense pattern, an "early-count hitting/long-ball hitting" defense pattern, .... A pitching pattern 554a contains a strikeout pitch selection probability 554c, an individual pitch zone selection probability 554d, a pitch speed selection probability 554e, and a pitch power selection probability 554f for each of pitches 554b. The employed pitch type is determined by lottery using these probabilities.

The batting pattern data 555 provides basic information for determining how batting is to be made for an at-bat. A batting pattern is prepared for each of offensive tactics.

Figure 18:
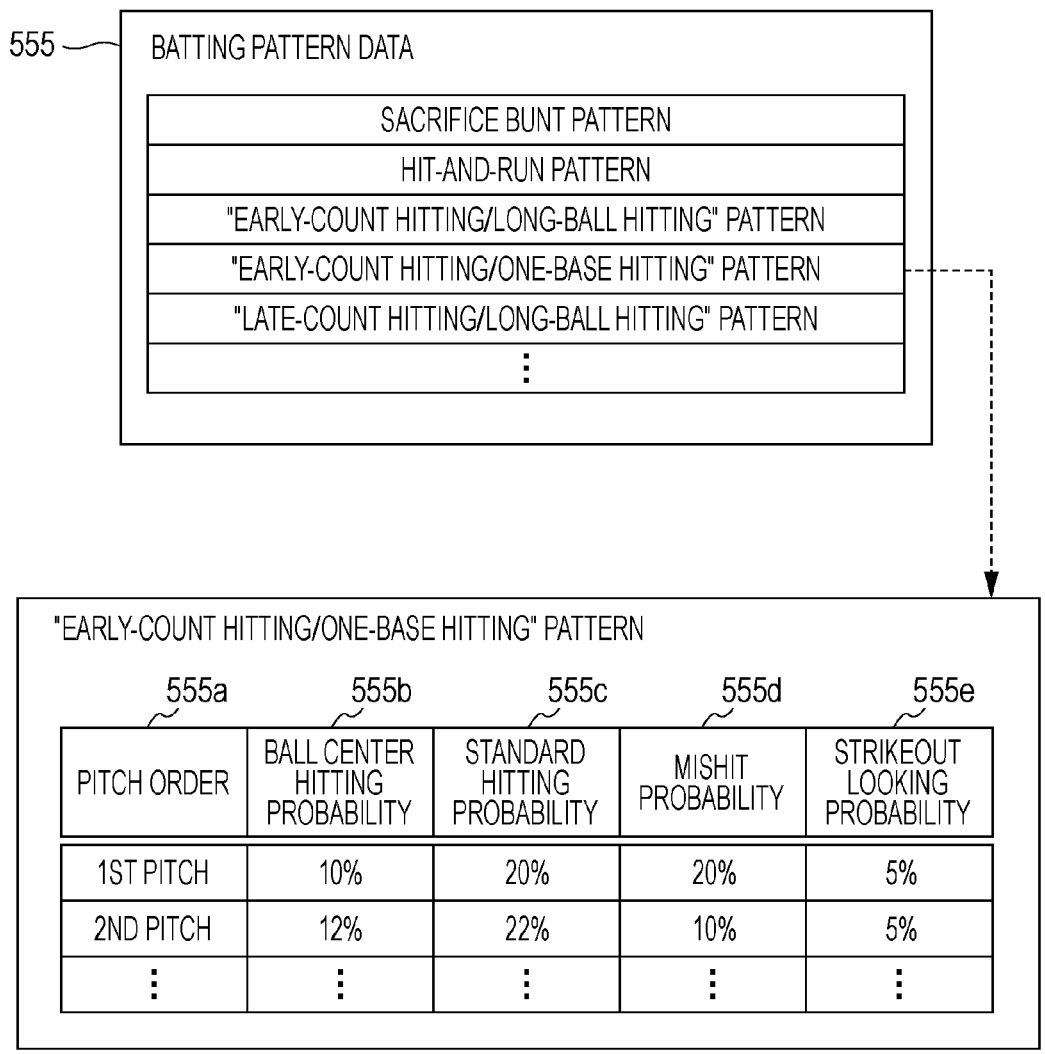
FIG. 18 illustrates an exemplary data structure of batting pattern data.

For example, as shown in FIG. 18, the following patterns are prepared: a sacrifice bunt pattern, a hit-and-run pattern, an "early-count hitting/long-ball hitting" pattern, .... One of the patterns contains a ball center hitting probability 555b, a standard hitting probability 555c, a mishit probability 555d, and a strikeout looking probability 555e for each of pitch orders 555a. The employed batting type is determined by lottery using these probabilities.

However, the setting of the batting pattern is not limited thereto. For example, the batting pattern may contain the probabilities for the following items: swing/no swing, the location of a swing (high and inside, middle and inside, low and inside, high and outside, middle and outside, low and outside, and right down the middle), and swing timing (accurate, late, and early).

The position shift data 556 is used for determining the positions in the field in accordance with the type of defensive tactic. The position shift data 556 includes a relative position with respect to the normal position for each of the defensive tactics.

The sacrifice-bunt-suitable condition table 560 defines a condition for selecting the offensive tactic "Sacrifice Bunt". For example, as shown in FIG. 19, the sacrifice-bunt-suitable condition table 560 contains a suitable condition 560b including the offense related parameters 522 of the batter (e.g., the "bat-ball contact ability" and the "running speed") as factors for each of on-base statuses 560a.

The sacrifice bunt selection probability table 561 defines the probability of a sacrifice bunt being actually selected when it is determined that the offensive tactic "Sacrifice Bunt" is suitable. For example, as shown in FIG. 20, the selection probability is determined on the basis of a relationship between a value 561a of "bunt" of a final offensive tactic tendency parameter and a score difference 561b from the view point of the offensive team and is stored.

The hit-and-run-suitable-condition table 562 defines a condition for selecting the offensive tactic "hit-and-run". The data structure is similar to that of the sacrifice-bunt-suitable condition table 560. That is, the parameters for an offense team serving as the factors of the suitable condition 560b can be replaced with, for example, the "bat-ball contact ability" of a batter and the "running speed" of a runner.

The hit-and-run-selection probability table 563 defines a probability of the offensive tactics "hit-and-run" being actually selected when it is determined that the tactics is suitable. The data structure can be generated by replacing the value of "Bunt" in the sacrifice bunt selection probability table 561 with the value of "Base-Running" of the final offensive tactic tendency parameter.

The bunt-base-hit-suitable condition table 564 defines a condition for selecting the offensive tactic "bunt base hit". According to the present embodiment, this tactic is selected if the "contact ability" and the "running speed" of the batter are higher than predetermined reference values. Alternatively, the probability of satisfying the suitable condition may be defined on the basis of the correlation between the "contact ability" and the "running speed".

The bunt-base-hit selection probability table 565 defines the probability of bunting for a base hit being actually selected when it is determined that bunting for a base hit is suitable. Like the sacrifice bunt selection probability table 561, the bunt-base-hit selection probability table 565 contains selection probabilities in the form of a matrix of the value of "bunt" of the final offensive tactic tendency parameter and the value of a score difference from the view point of the offense team.

The normal offensive tactic selection probability table 566 defines the probability of a hitting tactic being selected. According to the present embodiment, one of the four tactics: "early-count hitting and long ball hitting", "late-count hitting and long ball hitting", "early-count hitting and one-base hitting", and "late-count hitting and one-base hitting" can be selected. As shown in FIG. 21, the normal offensive tactic selection probability table 566 contains the selection probability of each of the four tactics on the basis of the correlation between a value 566a of "long ball hitting" of the final offensive tactic tendency parameter and a value 566b of the "early-count hitting".

The intentional walk selection condition table 570 defines the probability of the defensive tactic "intentional walk" being selected. According to the present embodiment, as shown in FIG. 22, the intentional walk selection condition table 570 contains the selection probability of the tactic on the basis of the correlation between a value 570a of "intentional walk" of the final defensive tactic tendency parameter and a sum 570b of the "the contact ability" and the "slugging ability".

The surprise-attack prevention condition table 572 defines a condition for selecting the defensive tactic "surprise attack prevention", that is, the tactic for preventing bunting for a base hit or a hit-and-run. For example, as shown in FIG. 23, the surprise-attack prevention condition table 572 contains a suitable condition 572b including the contact ability and the running speed of a batter as factors for each of the conditions of on-base statuses 572a.

The surprise-attack prevention selection probability table 574 defines the probability of the tactic "surprise attack prevention" being actually selected when it is determined that the surprise attack prevention is suitable. For example, as shown in FIG. 24, the surprise-attack prevention selection probability table 574 contains the selection probability of the tactic on the basis of the correlation between a "surprise-attack prevention" value 574a of the final defensive tactic tendency parameter and a score difference 574b from the view point of the defensive team.

The normal defensive tactic selection probability table 576 defines the probability of a pitching tactic being selected. According to the present embodiment, one of the four tactics: "early-count strikeout and long ball prevention", "late-count strikeout and long ball prevention", "early-count strikeout and one-base hitting prevention", and "late-count strikeout and one-base hitting prevention" can be selected. For example, as shown in FIG. 25, the normal defensive tactic selection probability table 576 contains the selection probability of each of the above-described four defensive tactics on the basis of the correlation between a value 576a of "long ball prevention" of the final defensive tactic tendency parameter and a value 576b of the "strikeout count" of the final defensive tactic tendency parameter.

Figure 26:
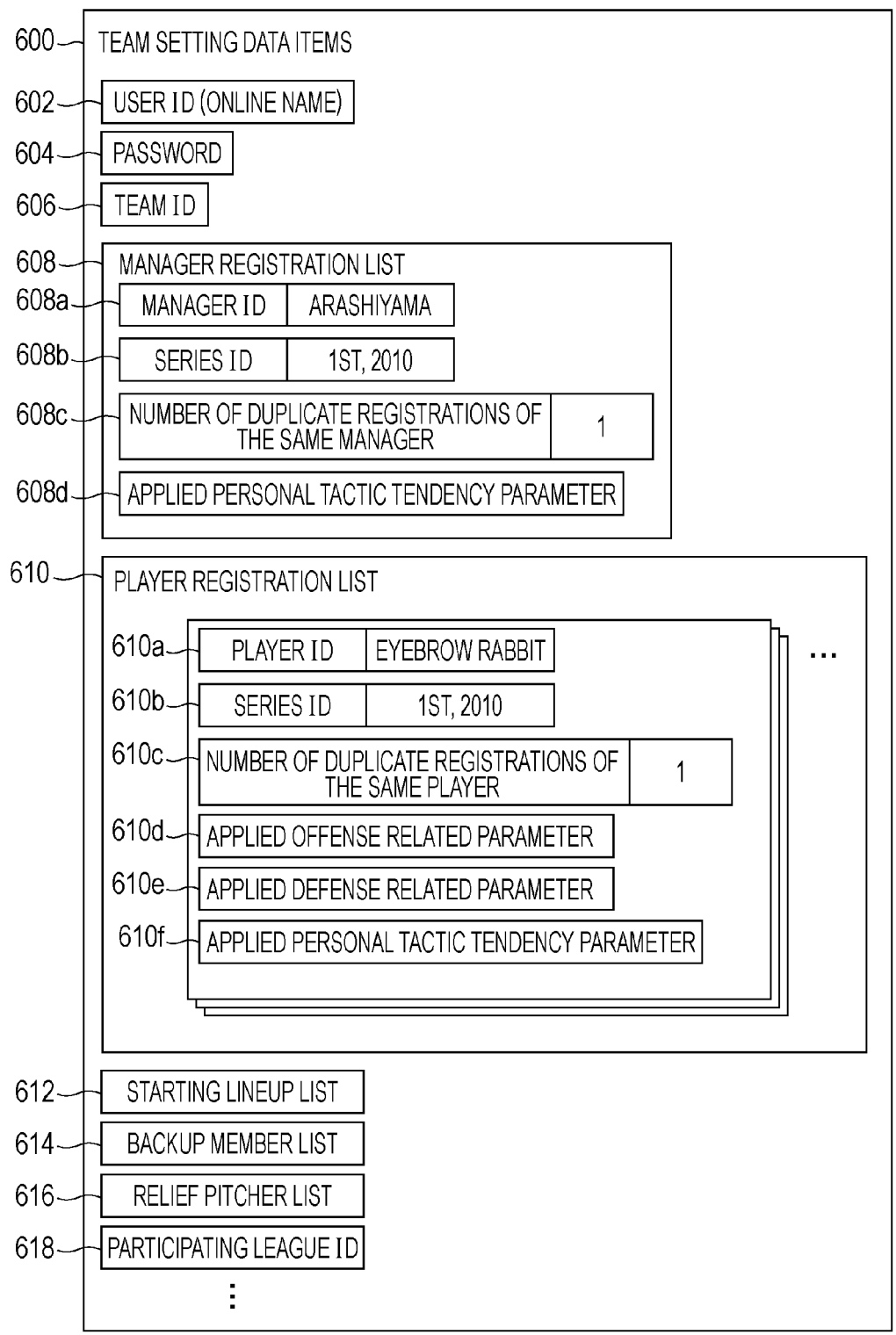
FIG. 26 illustrates an exemplary data structure of team setting data.

The team setting data item 600 is prepared for each of the game players. The team setting data items 600 includes information regarding the team created by the game player. For example, as shown in FIG. 26, the team setting data item 600 contains a player ID 602, a password 604, a team ID 606, a manager registration list 608, a player registration list 610, a starting lineup list 612, a backup member list 614, a relief pitcher list 616, and a participating league ID 618.

The manager registration list 608 contains information regarding a manager that the game player has already registered. For example, as the information indicating which manager object (manager card 3a) of the objects (the trading cards 3) is registered, a manager ID 608a corresponding to the object (the card) and a series ID 608b are contained. In addition, the number of duplicate registrations 608c of the same manager indicating the number of duplicated registration of the same object (the same card) and an applied personal tactic tendency parameter 608d are contained.

When a manager is newly registered, the personal tactic tendency parameter 542 of the manager setting data 540 is copied into the applied personal tactic tendency parameter 608d. In addition, in order to grant bonus associated with duplicated registration of the same card, a predetermined parameter value other than "0" is added to the parameter value. That is, the tactic tendency of the manager becomes more prominent.

The player registration list 610 contains a plurality of data sets each containing information regarding a player corresponding to the object (the card) that the game player has already registered. Each of the data sets contains a player ID 610a and a series ID 610b as information indicating which baseball player object (player card 3b) of the objects (trading cards 3) has been registered. In addition, the data set includes the number of duplicate registrations of the same player 610c, an applied offense related parameter 610d, an applied defense related parameter 610e, and an applied personal tactic tendency parameter 610f.

The series ID 610b represents identification information regarding sales series of the object (the trading card 3) associated with the registered player. When the player is newly registered, the series ID 518c of the object (card) registration data 518 (refer to FIG. 11) is copied into the series ID 610b. The number of duplicate registrations of the same player 610c indicates the number of registrations of the same object (card). When the player is newly registered, the number of duplicate registrations of the same player 610c is set to "1". Each time a card of the same type is registered, the value "1" is added.

The applied offense related parameter 610d and the applied defense related parameter 610e contain various parameter values related to the defense and offense abilities and applied to the player when a simulation process of a game is performed. When the player is newly registered, the offense related parameter 522 and the defense related parameter 524 of the player setting data 520 (refer to FIG. 12) are directly copied into the applied offense related parameter 610d and the applied defense related parameter 610e, respectively. If the same object (the same card) is registered a plurality of times, a predetermined value is added, as the bonus, to the applied offense related parameter 610d and the applied defense related parameter 610e each time.

The applied personal tactic tendency parameter 610f contains various parameter values related to the offensive tendency and defensive tendency. When the player is newly registered, the value of the personal tactic tendency parameter 530 of the player setting data 520 associated with the player is copied into the applied personal tactic tendency parameter 610f. Thereafter, the value of the applied personal tactic tendency parameter 610f is updated when a bonus regarding the team ability is granted and is applied during a simulation process of a game. According to the present embodiment, the tactic tendency parameter of the team is determined on the basis of the applied personal tactic tendency parameter 610f of each of the players in the created team. Therefore, changing the applied personal tactic tendency parameter 610f means changing some of the parameters of the team.

The starting lineup list 612 contains information regarding, for example, the positions and batting order of the registered players in the starting lineup. For example, as shown in FIG. 27, the starting lineup list 612 contains the position 612a and a player ID 612b and a batting order 612c assigned to each of the positions.

The backup member list 614 contains information regarding the players registered as backups and setting information indicating how the backup is used. The relief pitcher list 616 contains the player ID of a player registered as a relief pitcher and information indicating how the relief pitcher is used (e.g., a middle reliever or a closer). The participating league ID 618 contains the league ID in which the team currently participates.

The play data 650 is created for each of games. The play data 650 contains information regarding the game status and various information items used for controlling the game. For example, as shown in FIG. 28, the play data 650 includes opposing team information 652 that contains the team IDs of two opposing teams in a game, inning information 654 that contains the current inning and the top/bottom of the inning, player parameter data 656 that contains a variety of parameters of each of the players played in the game in correspondence to the player ID, a substituted player list 658 that contains the player IDs of the players who were substituted among the backup players and the relief pitchers, a basic offensive tendency parameter 660, a basic defensive tendency parameter 662, a intermediate offensive tendency parameter 664, a intermediate defensive tendency parameter 666, a final offensive tendency parameter 668, and a final defensive tendency parameter 670.

Description of Operation

An exemplary operation performed by the server system 1100 is described next. Note that in this operation, an already registered game player has logged in using the mobile game machine 1400.

Figure 29:
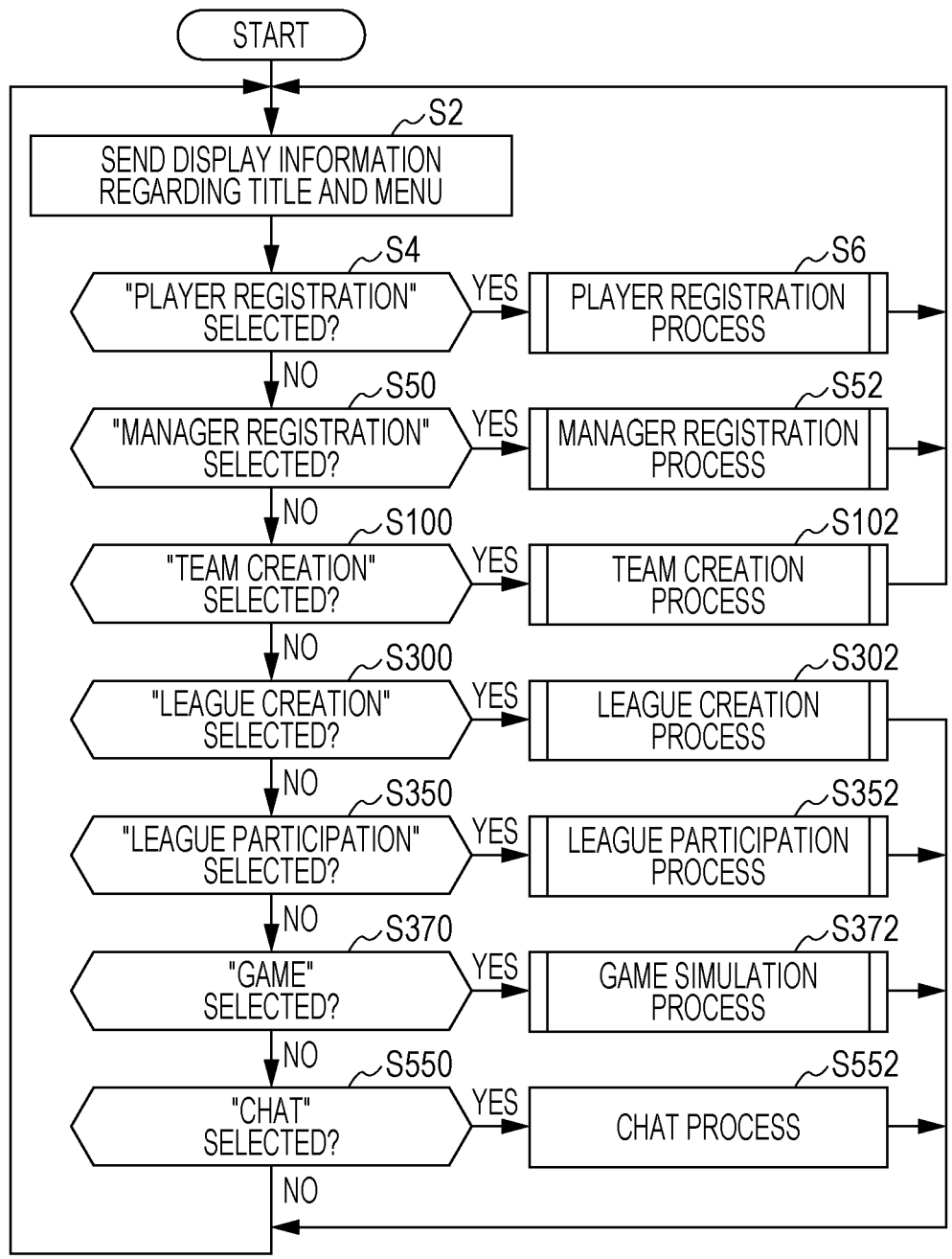
FIG. 29 is a flowchart of a main process performed by the server system.

FIG. 29 is a flowchart of a main process performed by the server system 1100 according to the present embodiment. The server processing unit 202 of the server system 1100 sends, to the mobile game machine 1400, display information used for displaying the menu screen W2 (step S2). If, for example, a program of the mobile game machine 1400 for displaying an image is a Web browser, the display information is in the form of HyperText Markup Language (HTML). When some input operation is performed on the mobile game machine 1400, request information in accordance with the input operation is sent to the server system 1100.

If the received request information indicates that "Player Registration" is selected using the mobile game machine 1400 in order to register fielders and pitchers (YES in step S4), the server processing unit 202 performs a player registration process (step S6).

Figure 30:
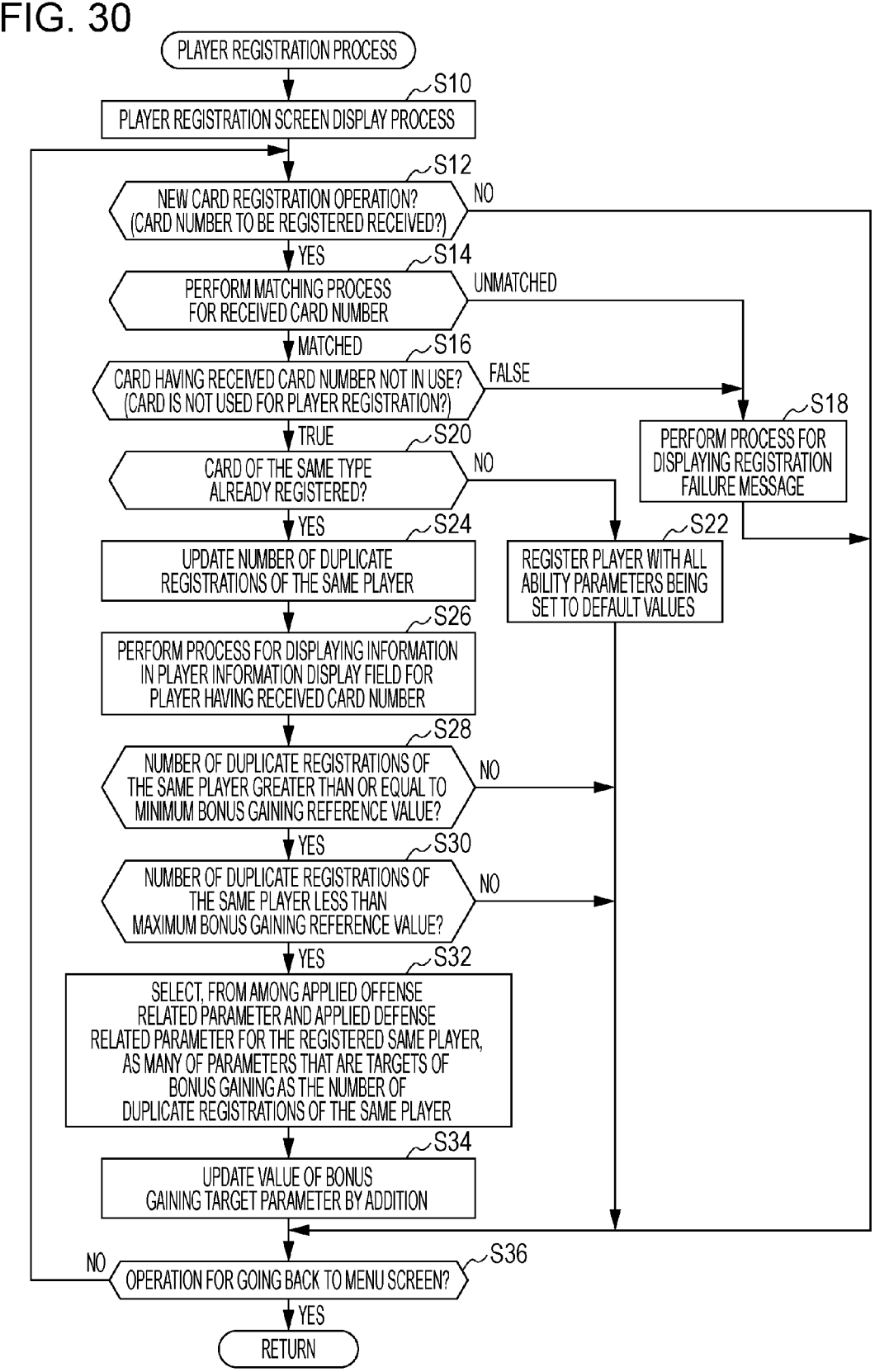
FIG. 30 is a flowchart of a player registration process.

FIG. 30 is a flowchart of the player registration process according to the present embodiment. In this process, the server processing unit 202 sends, to the mobile game machine 1400, information for displaying the player registration screen W4 (refer to FIG. 4). More specifically, the server processing unit 202 sends, to the mobile game machine 1400, display information for displaying the object (card) number entry field 10 and the software keyboard 12 for inputting the card number, a Java (trade name) program, and a CGI source used for displaying the registered player list 16 that has been registered by the game player (step S10).

If the game player inputs the number into the object (card) number entry field 10 on the mobile game machine 1400, the object (card) number input using the software keyboard 12 is sent to the server system 1100 together with request information that requests for use right registration of the object (the card).

If the request information received from the mobile game machine 1400 indicates requests for use right registration of a new object (a new card) (YES in step S12), the server processing unit 202 compares the number received together with the request information with the card registration data 518 (refer to FIG. 11) (step S14).

If the received object (card) number is not the same as any one of the object (card) numbers registered as certified objects (cards) ("UNMATCHED" in step S14), the server processing unit 202 sends, to the mobile game machine 1400, a message indicating that the object (card) number input into the player registration screen W4 of the mobile game machine 1400 cannot be registered (step S18).

However, if the received object (card) number is the same as any one of the object (card) numbers registered as certified objects (cards) ("MATCHED" in step S14), the server processing unit 202 further determines whether the object (the trading card 3) corresponding to the received object (card) number is not in use, that is, whether the object (the trading card 3) corresponding to the received object (card) number is not being used for player registration (step S16).

If the object (the trading card 3) corresponding to the received object (card) number is not being used ("TRUE" in step S16), the server processing unit 202 references the player registration list 610 of the team setting data items 600 for the game player and determines whether the object (the card) of the same type has already been registered (step S20, refer to FIG. 21).

More specifically, the server processing unit 202 references the object (card) registration data 518. If a pair consisting of the player ID 518b and the series ID 518c associated with the received object (card) number 518a is the same as any one of registered pairs consisting of the player ID 610a and the series ID 610b in the player registration list 610 (refer to FIG. 26), the server processing unit 202 determines that the object (card) of the same type has already been registered. Otherwise, the server processing unit 202 determines that the object (card) of the same type has not yet been registered. Note that even when, in this step, a rental player has been registered in the player registration list 610 and the player corresponding to the new object (the trading card 3) currently registered is the same as the rental player, it is recognized that the new card differs from the card of the rental player, since the rental player has a rental-player specific player ID.

If the object (the card) has not yet been registered (NO in step S20), the server processing unit 202 registers the player corresponding to the received object (card) number (step S22).

That is, the server processing unit 202 registers, as a new player ID 610a, the player ID 518b of the received object (card) number in the player registration list 610. Thereafter, the server processing unit 202 stores the copy of the series ID 610b in the series ID 518c and sets the number of duplicate registrations of the same player 610c to "1". In addition, the applied offense related parameter 610d and the applied defense related parameter 610e contain the direct copies of the initial setting values of the offense related parameter 522 and the defense related parameter 524 of the player setting data 520 (refer to FIG. 12), respectively. Furthermore, the applied personal tactic tendency parameter 610f contains the copy of the initial setting value of the personal tactic tendency parameter 530.

If the object (the card) of the same type has already been registered (YES in step S20), the server processing unit 202 adds "1" (the value "1" is for the currently registered object) to the number of duplicate registrations of the same player 610c for the player who is registered in the player registration list 610 and who corresponds to the object (card) of the same type. In this way, the number of duplicate registrations of the same player 610c is updated (step S24).

Subsequently, the server processing unit 202 sends display information to be displayed in the baseball player information display section 14 for the character corresponding to the object (card) number received through the player registration screen W4 of the mobile game machine 1400 (step S26). Note that the display information includes information for displaying the number of duplicate registrations 14d (refer to FIG. 4). The display information further includes information for displaying the bonus gaining mode mark 14e if the number of duplicate registrations of the same player is plural.

Subsequently, if the updated number 610c of duplicated registrations of the same player corresponding to the received object (card) number is greater than or equal to a minimum bonus gaining reference value (i.e., the duplicated registration number condition, a value between 2 to 4) (YES in step S28) and less than a maximum bonus gaining reference value (a value between 5 to 10) (YES in step S30), the server processing unit 202 randomly selects, from among the applied offense related parameter 610d and the applied defense related parameter 610e in the player registration list 610 of the team setting data items 600, as many of parameters that are targets of bonus gaining as the number of the computed number of duplicate registrations of the same player 610c (step S32). Alternatively, instead of randomly selecting the parameters that are targets of bonus gaining, the server processing unit 202 may select the parameters having relatively higher values so that the characteristic of the player becomes more prominent.

Subsequently, the values of the selected parameters that are the targets of bonus gaining are updated by addition (step S34). More specifically, for example, each of the values is updated as follows:

(initial setting value×(number of duplicate registrations of the same player×0.01+1.0))

The amount of the increase can be appropriately determined in accordance with the setting range of the parameter value so that the player does not have excessively high ability after the bonus is granted.

However, if the maximum bonus gaining reference value is reached although the number of duplicate registrations of the same player 610c is plural (NO in step S30), the bonus is not granted in consideration of balancing the abilities of the players.

Upon receiving, from the mobile game machine 1400, a request corresponding to an operation for going back to the menu screen (YES in step S36), the server processing unit 202 completes the player registration process.

After the player registration process is completed, the processing returns to the flowchart shown in FIG. 29. If, from request information, it is determined that "Manager Registration" is selected (YES in step S50), the server processing unit 202 performs a manager registration process (step S52).

The manager registration process is basically similar to the player registration process except that the character corresponding to a character (a card) is a manager. However, unlike a player, a manager does not have the offense related parameter and the defense related parameter. Accordingly, in steps corresponding to steps S32 to S34 of the player registration process, a predetermined value is added to the parameter values of the items of the applied personal tactic tendency parameter 608d having non-zero setting values.

If the received request information indicates an operation for selecting "Team Creation" (YES in step S100), the server processing unit 202 performs a team creation process (step S102).

Figure 31:
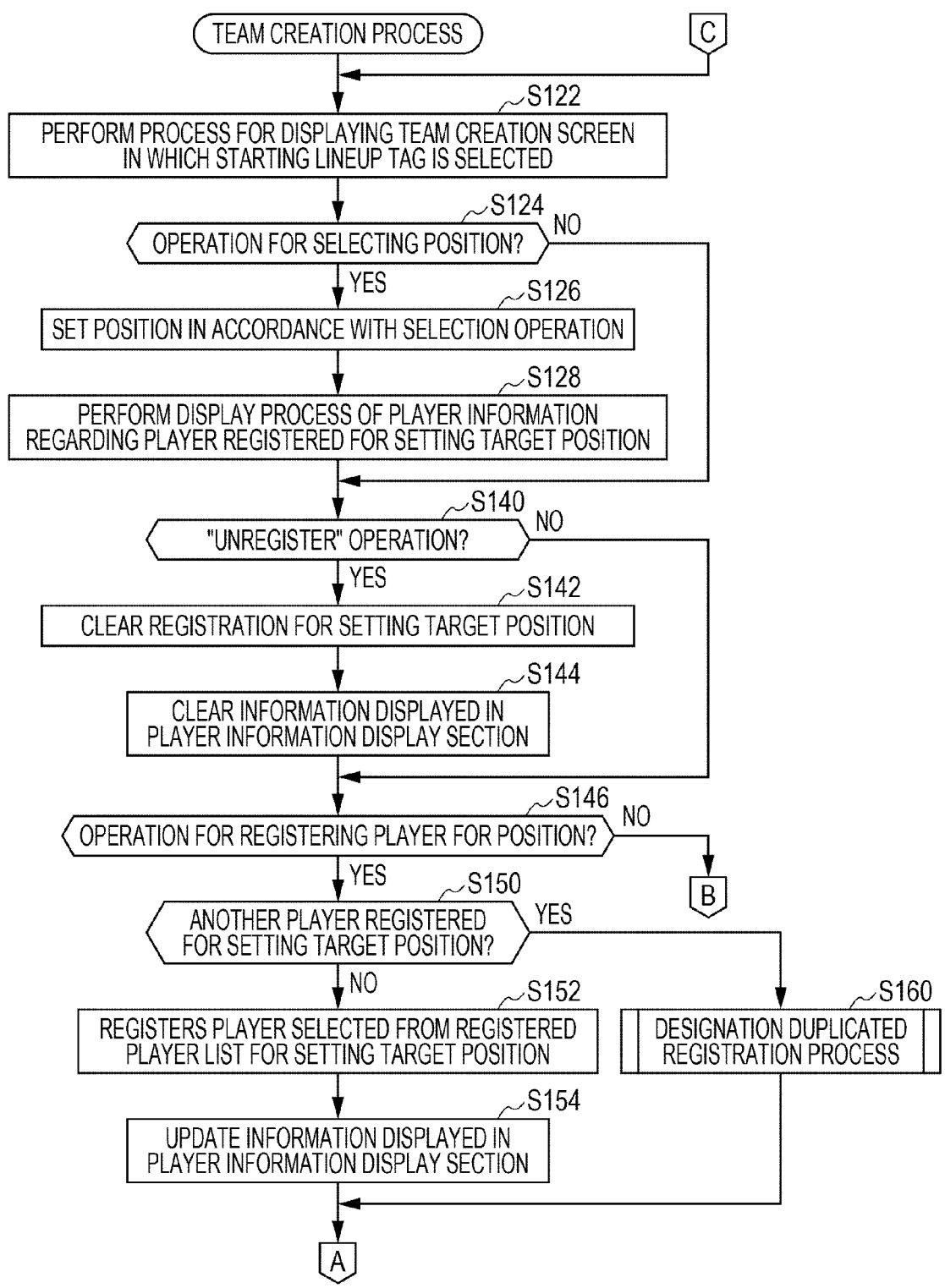
FIG. 31 is a flowchart illustrating the procedure of a team creation process.
Figure 32:
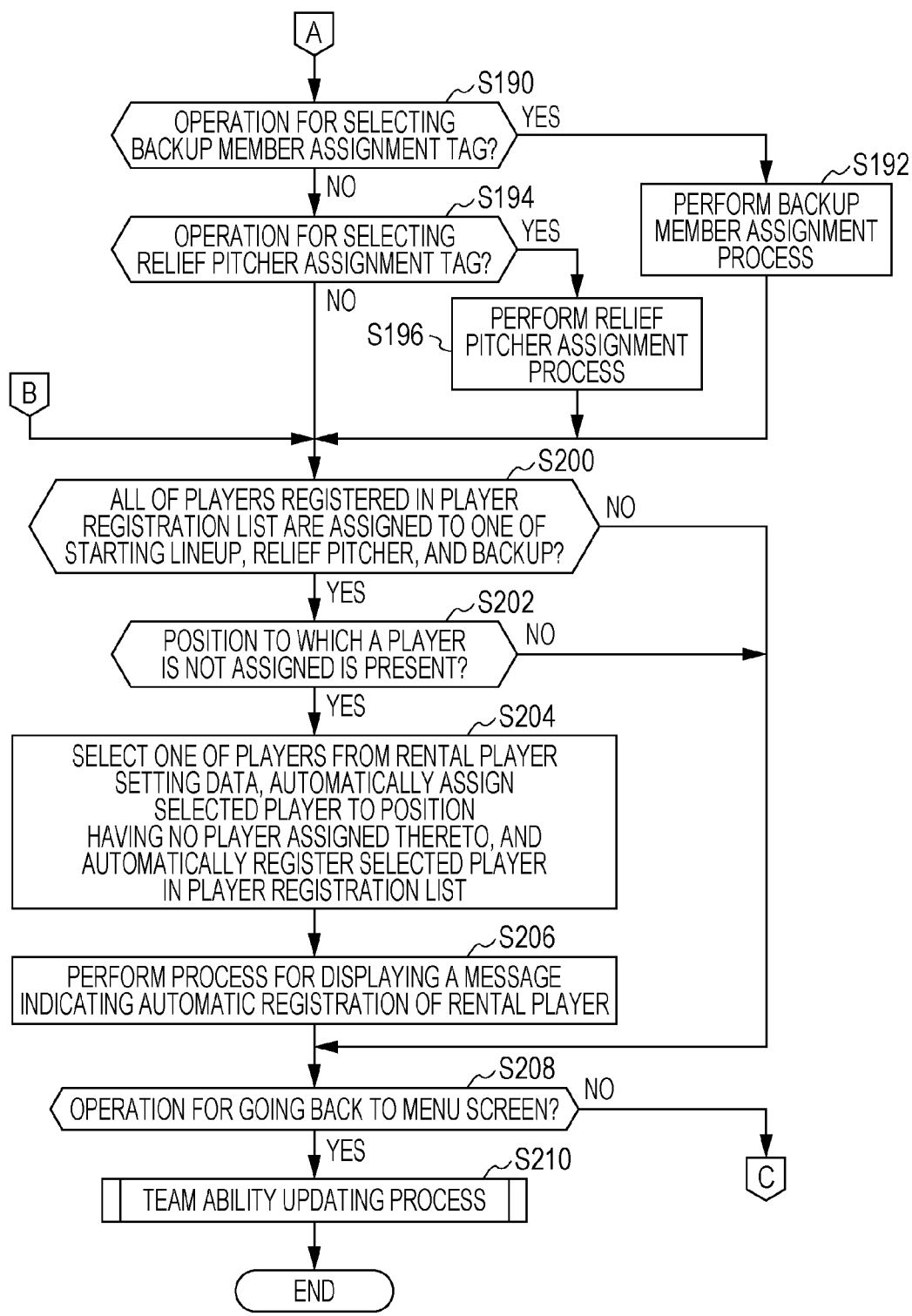
FIG. 32 is a continuation of the flowchart of FIG. 31.

FIGS. 31 and 32 are flowcharts illustrating the procedure of the team creation process.

The server processing unit 202 performs a process for displaying the team creation screen W6 in which a starting lineup tag is selected (refer to FIG. 5) (step S122). That is, the server processing unit 202 sends display information for displaying the starting lineup setting display section 26 and display information for displaying the registered player list 36 on the mobile game machine 1400.

In the mobile game machine 1400, the player icon data 520b of the player setting data 520 (refer to FIG. 12) indicated by the player ID 612b or the player icon data of the rental player setting data 536 is displayed at each of the fielding positions in the starting lineup setting display section 26 to which one of the player IDs 612b in the starting lineup list 612 (refer to FIG. 27) of the team setting data items 600 is assigned. In contrast, the blank icon 32 is displayed at a position to which no player is assigned. In addition, the player icons of the players registered in the player registration list 610 of the team setting data items 600 are displayed in the registered player list 36 at predetermined positions.

When the game player operates the mobile game machine 1400 and selects a fielding position in the starting lineup setting display section 26 for a player or select an icon displayed in the registered player list 36 in order to assign the player to the fielding position or selects "Unregister" in order to unregister the position setting, the request information in accordance with the input operation is sent to the server system 1100.

If the request information received by the server system 1100 indicates the operation for selecting a position (YES in step S124), the server processing unit 202 temporarily stores the identification information regarding the selected position in the server storage unit 502 and considers the fielding position as a setting target position (step S126). Thereafter, the server processing unit 202 performs a display process of the player information display section 34 (step S128). Thus, the server processing unit 202 sends, to the mobile game machine 1400, information required for displaying information related to the player assigned to the current setting target position on the player information display section 34.

However, if the received request information indicates the "Unregister" operation of a position (YES in step S140), the server processing unit 202 clears data stored in the starting lineup list 612 (refer to FIG. 27) in association with the current target position (e.g., the player ID 612b). Thus, the server processing unit 202 unregisters the player (step S142). Thereafter, the server processing unit 202 deletes and clears the information displayed in the player information display section 34 (step S144).

If the received request information indicates the position for the player, that is, if one of the player icons in the registered player list 36 is selected with the setting target position being selected or one of the player icons in the registered player list 36 is dragged and dropped into the setting target position (YES in step S146), the server processing unit 202 determines whether another player has been registered for the setting target position or the position into which the player icon was dragged and dropped (step S150).

If no player has been registered for the position (NO in step S150), the server processing unit 202 registers the player corresponding to the icon selected from the registered player list 36 or a player indicated by the dragged and dropped icon for the position (step S152). Subsequently, the server processing unit 202 sends information for updating information displayed in the player information display section 34 to information including the player indicated by the selected icon (step S154). However, if some player has already been registered for the target position (YES in step S150), the server processing unit 202 performs a designation duplicated registration process (step S160).

Figure 33:
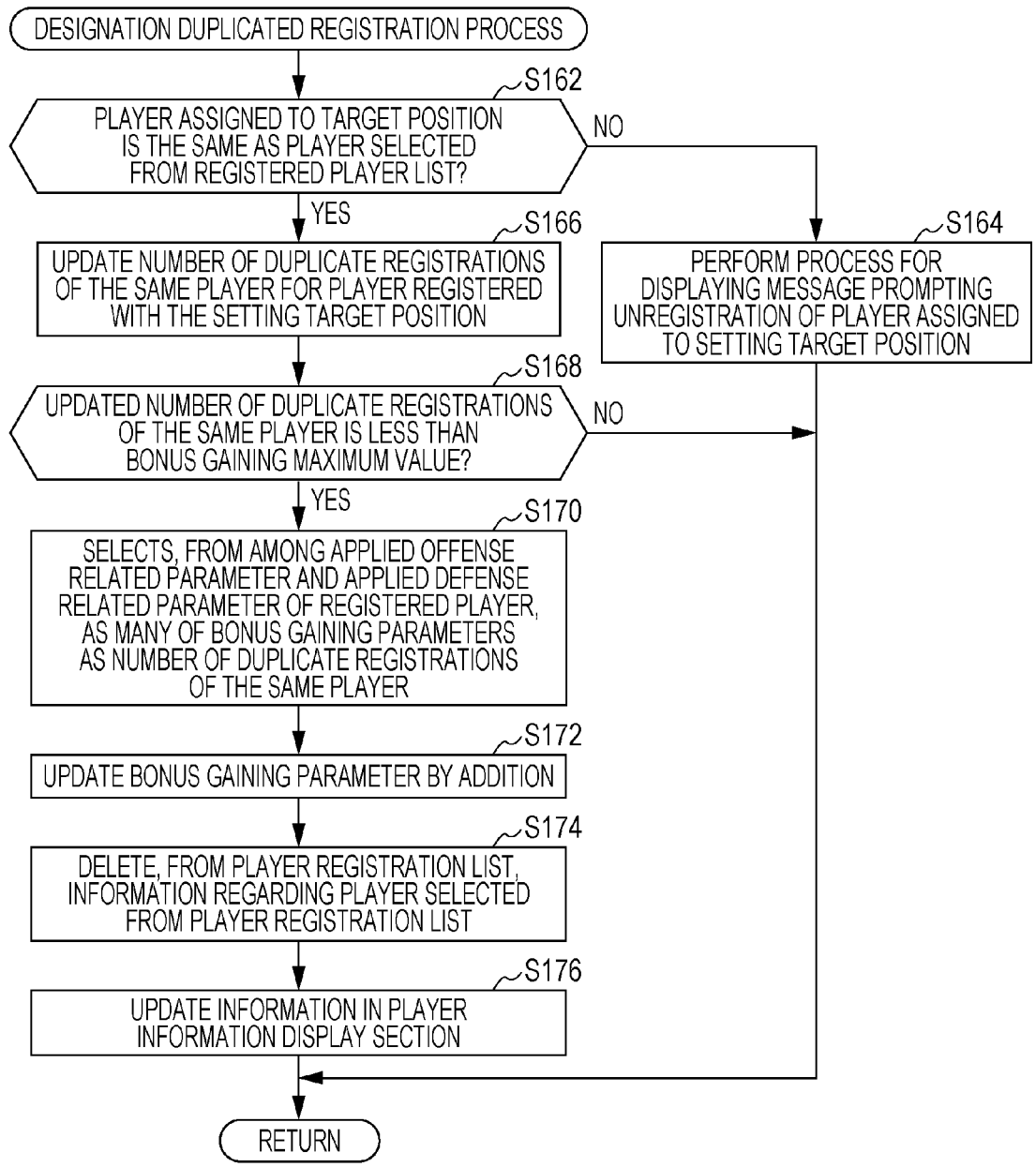
FIG. 33 is a flowchart of a designation duplicated registration process.

FIG. 33 is a flowchart of the designation duplicated registration process according to the present embodiment. In the designation duplicated registration process, the server processing unit 202 determines whether the player assigned to the target position is the same as the player indicated by the icon selected from the registered player list 36 or the dragged and dropped icon (step S162). In this case, a difference between the seasons of the objects (the trading cards 3) corresponding to the players is not taken into account.

If the determination is NO, that is, if registration of a player of a different type (a different person) is attempted for the position with which the player is registered (NO in step S162), the server processing unit 202 performs a process for displaying, on the mobile game machine 1400, a message prompting "unregistration" of the player assigned to the setting target position (step S164). However, if the determination is YES, that is, if duplicate registration of a player who is the same as the registered player is attempted (YES in step S162), the server processing unit 202 increases, by one, the number of duplicate registrations of the same player 610c for the player registered with the setting target position or the player registered with the position at which drag-and-drop operation was performed (step S166).

Subsequently, if the updated number of duplicate registrations of the same player 610c does not reach a predetermined bonus gaining maximum value (YES in step S168), the server processing unit 202 randomly selects, from among the applied offense related parameter 610d and the applied defense related parameter 610e of the player, as many of parameters that are targets of bonus gaining as the updated number of duplicate registrations of the same player 610c (step S170). Thereafter, the server processing unit 202 updates each of the bonus gaining parameters by adding a predetermined value to the bonus gaining parameter (step S172). Thereafter, the server processing unit 202 deletes, from the player registration list 610, the information regarding the player to be duplicately registered (step S174). Subsequently, the server processing unit 202 sends information used for updating the information displayed in the player information display section 34 (step S176), and the designation duplicated registration process is completed.

Note that in this duplicate registration, objects (cards) that correspond to the same player and that have different designs are put into one registration. Accordingly, if the bonus value to be added in step S172 is greater than that in the duplicated registration during the player registration process (step S32 shown in FIG. 30), the game becomes more enjoyable. Furthermore, if different values are added under a predetermined condition, for example, in the case in which a predetermined number of the series of the object (the card) duplicately registered in the designation duplicated registration process are sequentially arranged in the series ID history in the player registration list 610 (e.g., three consecutive series from the first to the third series), the game becomes much more enjoyable.

However, if the updated number of duplicate registrations of the same player 610c has reached the bonus gaining maximum value (NO in step S168), the processing in steps S170 to S176 is skipped, and the designation duplicated registration process is completed.

Referring back to the flowchart shown in FIG. 32, if the request information received by the server system 1100 indicates the operation for selecting the backup member assignment tag 22 (YES in step S190), the server processing unit 202 performs a backup member assignment process (step S192). In the backup member assignment process, for example, a backup member registration field and the registered player list 36 are displayed together. The backup members are determined by dragging and dropping the icon of the player displayed in the registered player list 36 into the backup member registration field.

However, if the request information received by the server system 1100 indicates the operation for selecting the relief pitcher assignment tag 24 (YES in step S194), the server processing unit 202 performs a relief pitcher assignment process (step S196). In the relief pitcher assignment process, for example, a relief pitcher assignment field and the registered player list 36 are displayed together. The relief pitchers are selected by dragging and dropping the icon of the player displayed in the registered player list 36 into the relief pitcher assignment field.

Subsequently, the server processing unit 202 determines whether all of the players registered in the player registration list 610 are assigned to one of the starting lineup, relief pitcher, and backup (YES in step S200) and a position to which a player is not assigned is present (step S202). That is, the number of the registered players is sufficient for playing a game.

If a position to which a player is not assigned is present (YES in step S202), the server processing unit 202 randomly selects one of the players from the rental player setting data 536 and automatically assigns the selected player to the position. In addition, the server processing unit 202 automatically registers the selected player in the player registration list 610 (step S204). Thereafter, the server processing unit 202 performs a process for displaying a message indicating the automatic registration on the mobile game machine 1400 (step S206). However, if a position to which a player is not assigned is not present (NO in step S202), the processing in steps S204 and S206 is skipped.

In this way, the team is created. Thereafter, the game player performs an operation for going back to the menu screen W2 in order to complete creating the team. If the request information received by the server system 1100 indicates the operation for going back to the menu screen W2 (YES in step S208), the server processing unit 202 performs a team parameter updating process (step S210).

Figure 34:
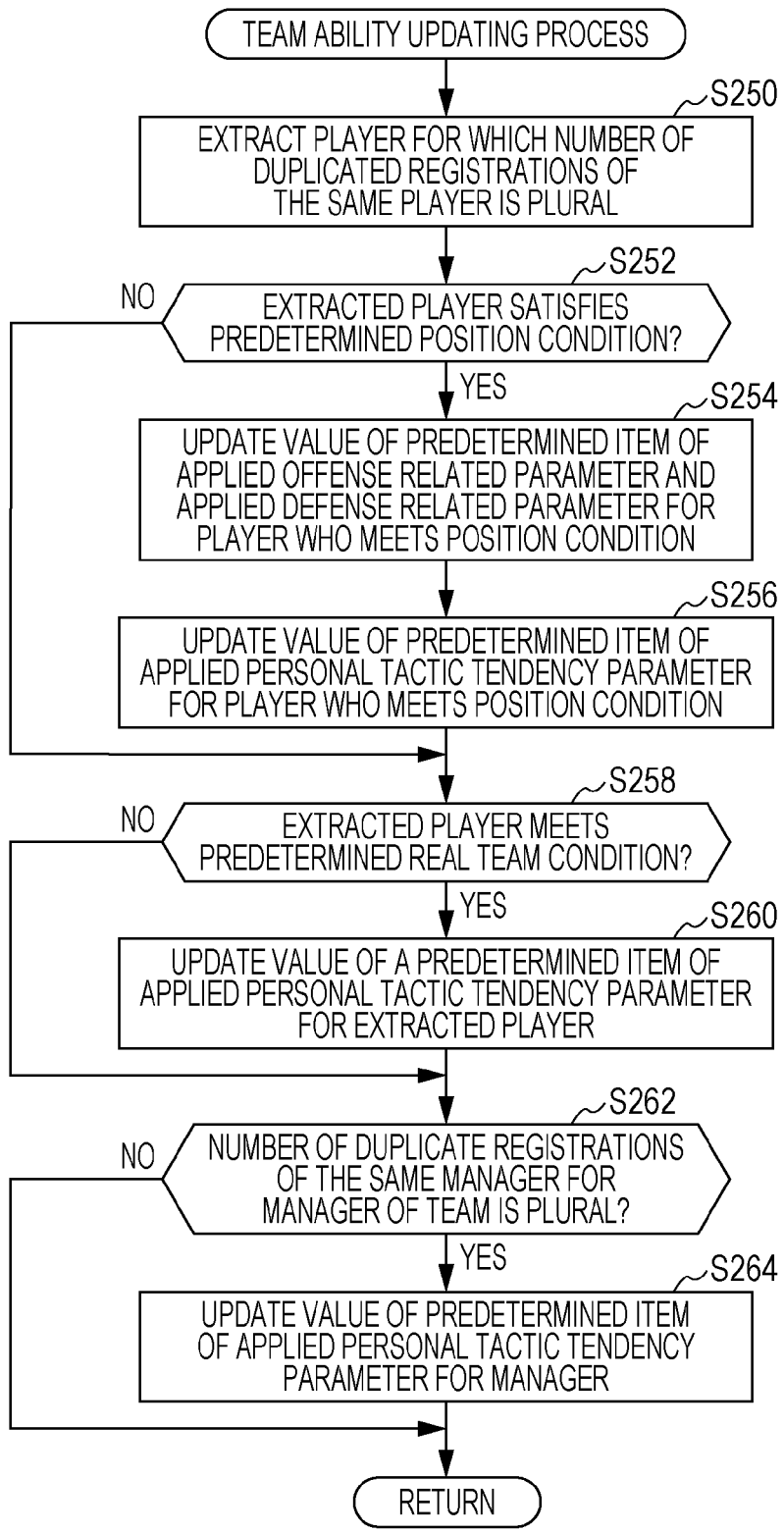
FIG. 34 is a flowchart of the procedure of a team parameter updating process.

FIG. 34 is a flowchart of the procedure of the team parameter updating process according to the present embodiment. In the team parameter updating process, a team parameter is automatically updated in accordance with a combination of duplicately registered players so that a bonus is granted.

In the team parameter updating process, the server processing unit 202 extracts, from the player registration list 610, a player for which the number of duplicate registrations of the same player 610c is plural first (step S250).

Subsequently, the server processing unit 202 determines whether the extracted player satisfies a predetermined position condition (step S252). As used herein, the term "position condition" refers to a combination of positions of the duplicately registered player. According to the present embodiment, "Pitcher and Catcher (battery)" is used. However, the condition can be appropriately changed (e.g., "Right and Center and Left").

If the extracted player satisfies the position condition (YES in step S252), the server processing unit 202 updates the value of a predetermined item of the applied offense related parameter 610d and the applied defense related parameter 610e so that the value is increased by a predetermined value (step S254).

In addition, the server processing unit 202 updates the value of a predetermined item of the applied personal tactic tendency parameter 610f so that the value is increased by a predetermined value (step S256).

Since the applied personal tactic tendency parameter 610f is a factor that has an impact on determination of a team tactic, a change in the applied personal tactic tendency parameter 610f causes a change in the team parameter. Note that depending on the type of game (e.g., in the case in which the team has a parameter applied to the entire team, such as a team moving speed, in team creation in a role-playing game (RPG)), such a parameter can be changed in step S256.

However, if the extracted player does not satisfy the position condition (No in step S252), the processing in step S254 to S256 is skipped.

Subsequently, the server processing unit 202 determines whether the extracted player satisfies a predetermined real team condition (step S258). As used herein, the term "real team condition" refers to a condition indicating a combination of real teams in the baseball league in which the extracted player participates. According to the present embodiment, the "same team" is used. However, the condition may be appropriately changed in accordance with the background setting of the game world. For example, a "team of a rival country" or a "team that participates in a league in the same country".

If the extracted player satisfies the predetermined real team condition (YES in step S258), the server processing unit 202 updates the value of a predetermined item of the applied personal tactic tendency parameter 610*f* so that the value is increased by a predetermined value (step S260).

Subsequently, if the number of duplicate registrations 608*c* of the same manager for the manager of the team is plural (YES in step S262), the server processing unit 202 updates the value of a predetermined item of the applied personal tactic tendency parameter 608*d* for the manager (step S264). Thereafter, the team parameter updating process is completed. However, if the number of duplicate registrations 608*c* of the same manager for the manager of the team is singular (NO in step S262), the processing in step S262 is skipped and the team parameter updating process is completed.

After the team parameter updating process is completed, the server processing unit 202 completes the team creation process and the processing returns to the flowchart shown in FIG. 29.

If the received request information indicates "League Creation" in the menu screen W2 (YES in step S300), the server processing unit 202 performs a league creation process (step S302).

Figure 35:
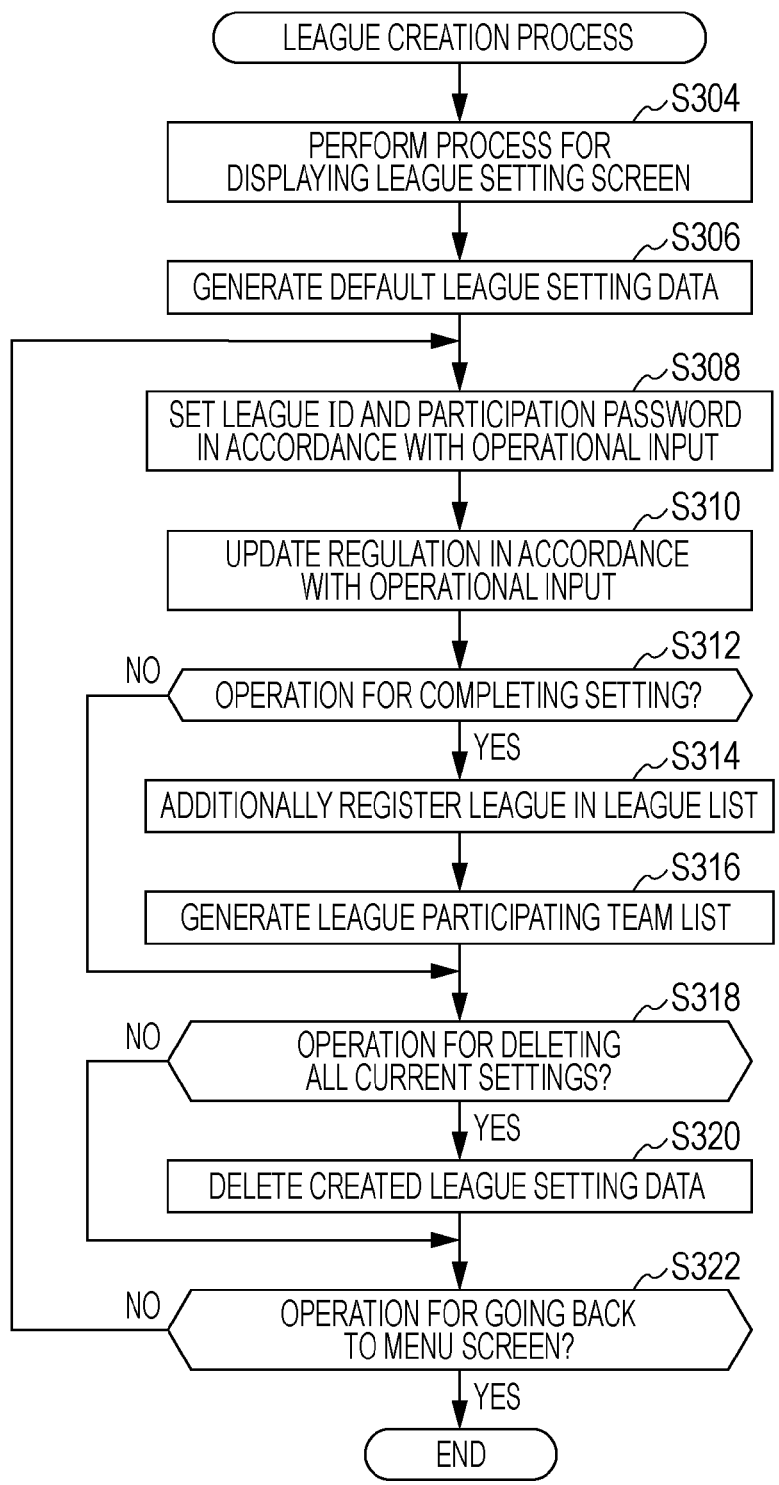
FIG. 35 is a flowchart of the procedure of a league creation process.

FIG. 35 is a flowchart of the procedure of the league creation process. The server processing unit 202 performs a process for displaying a league setting screen first. Subsequently, the server processing unit 202 sends, to the mobile game machine 1400, display information for displaying the league creation screen W10 (refer to FIG. 6) (step S304). Thereafter, the server processing unit 202 generates new league setting data 550 (refer to FIG. 15) (step S306). At that time, all items of the regulation setting data 550*c* are set to default values.

If an input operation is performed on the league creation screen W10 of the mobile game machine 1400, request information including information input to the league ID setting field 60, the participation password setting field 62, and the regulation setting section 66 is sent to the server system 1100.

Upon receiving the request information including information input to the league ID setting field 60 and the participation password setting field 62, the server processing unit 202 sets the league ID 550*a* and the participation password 550*b* in the previously generated league setting data 550 (step S308).

In addition, upon receiving the request information including information input to the regulation setting section 66, the server processing unit 202 updates the setting of the items of the regulation setting data 550*c* in the previously generated league setting data 550 (step S310).

Subsequently, if the received request information indicates an operation for completing the setting (YES in step S312), the server processing unit 202 additionally registers the league ID and the password of the newly created league in the league registration list 551 (step S314). Thereafter, the server processing unit 202 generates a new league participating team list 552 for the league (refer to FIG. 16) (step S316).

If the received request information indicates the "All CLEAR" operation for deleting all the current settings (YES in step S318), the server processing unit 202 deletes the newly created league setting data 550 (step S320).

However, if the received request information indicates an operation for going back to the menu screen (YES in step S322), the server processing unit 202 completes the league creation process.

Referring back to the flowchart shown in FIG. 29, if it is determined from the request information that "League Participation" is selected (YES in step S350), the server processing unit 202 performs the league participation process (step S352).

The league participation process is performed in order for the game player to make registration and participate in an already created league.

More specifically, the server processing unit 202 sends, to the mobile game machine 1400, display information for displaying the league participation setting screen W12 (refer to FIG. 7). The mobile game machine 1400 displays the software keyboard 74 so that the game player can input data into the league ID input field 70 and the password input field 72. Request information set in accordance with the input data is sent to the server system 1100. If the received request information includes the league ID and the participation password, the server processing unit 202 compares these data with the league setting data 550. If matched registration is found, the server processing unit 202 sets the participating league ID 618 of the team setting data items 600 to the matched league ID 550*a*. In addition, the server processing unit 202 registers the information regarding the team of the game player in the league participating team list 552. Thus, the league participating team list 552 is updated, and the participation registration is made. However, if the received request information indicates an operation for going back to the menu screen, the server processing unit 202 completes the league participation process.

If the received request information indicates an operation for selecting "Game" (YES in step S370), the server processing unit 202 performs a game simulation process (step S372).

Figure 36:
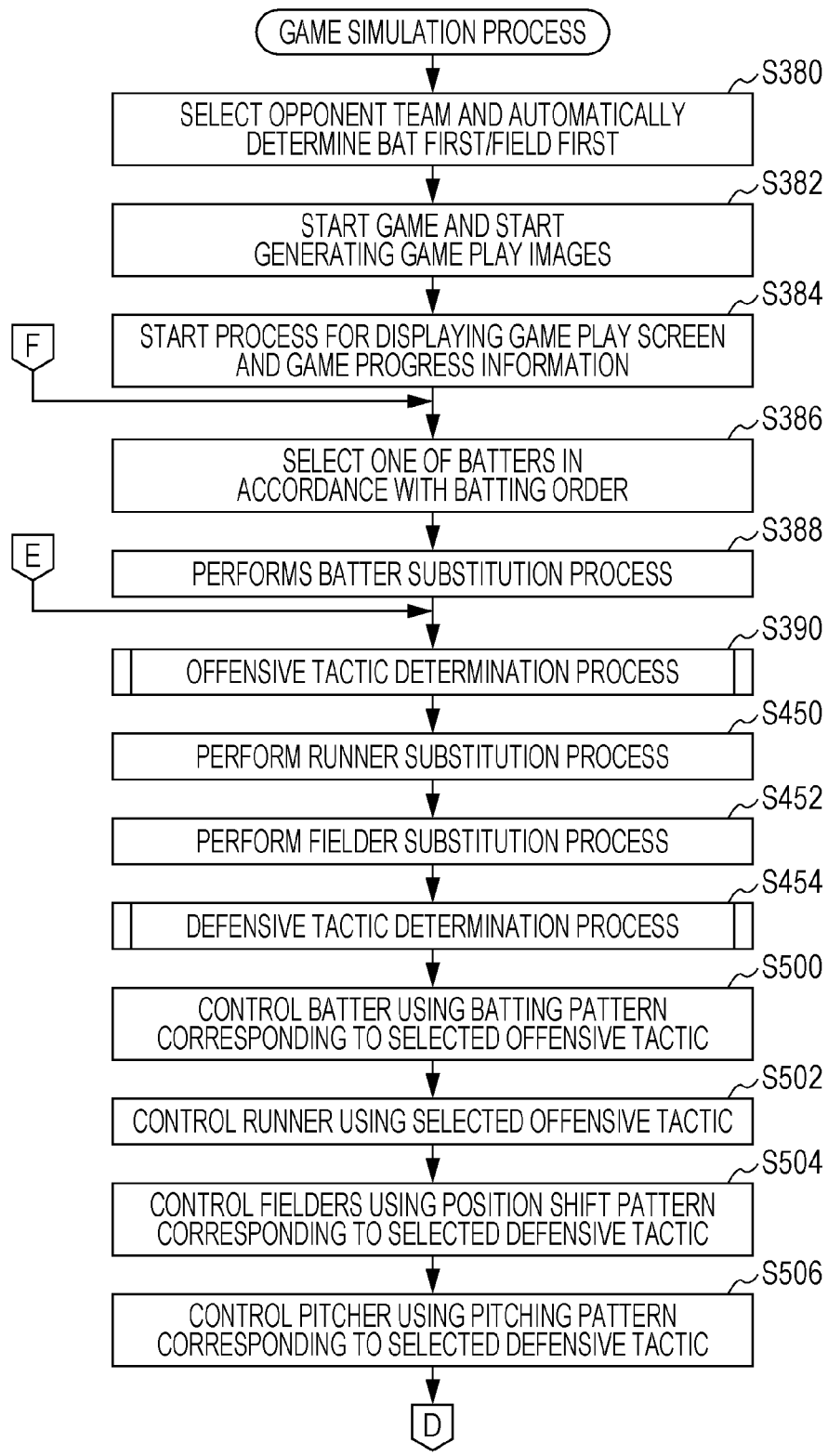
FIG. 36 is a flowchart of the procedure of a game simulation process.
Figure 37:
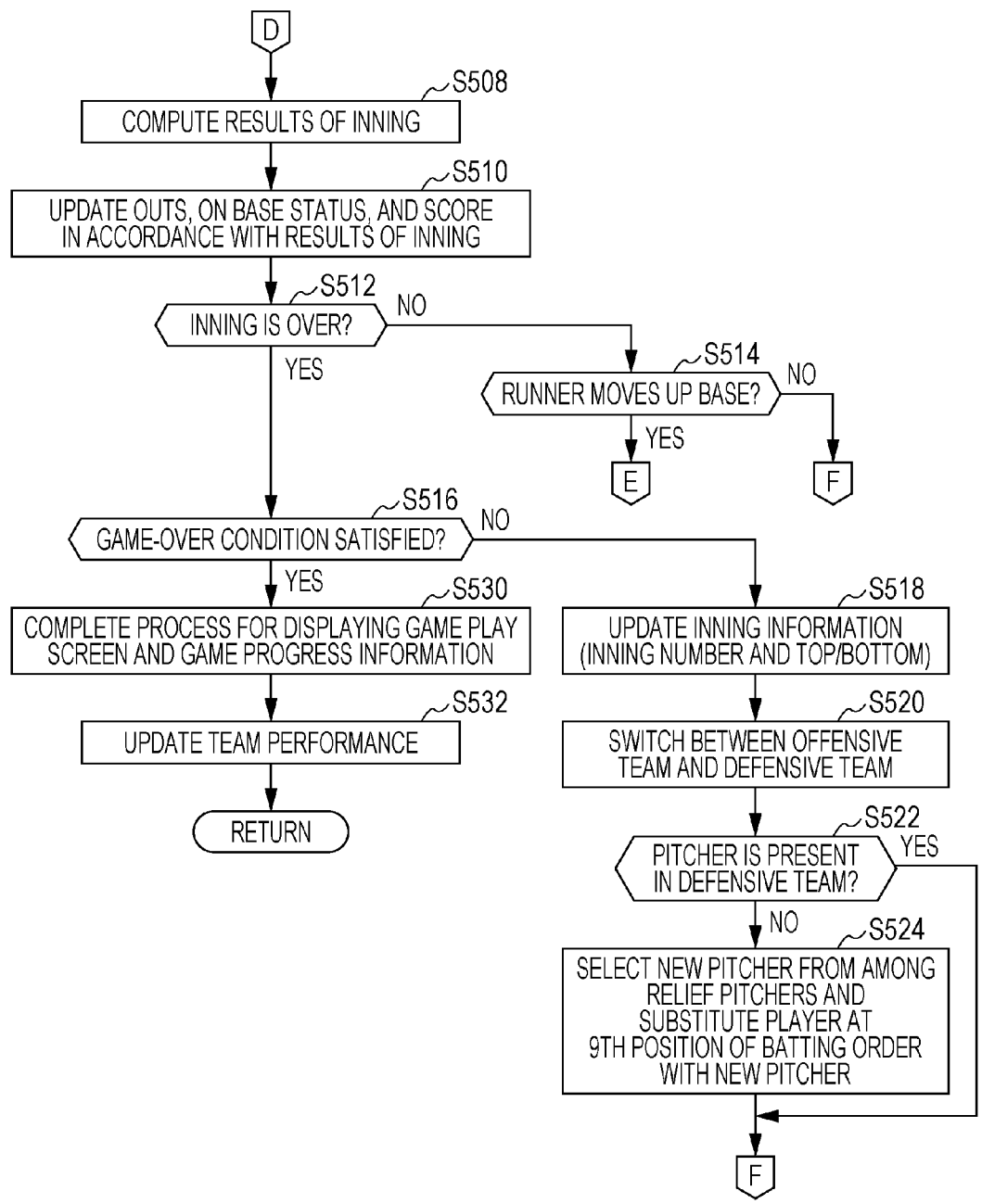
FIG. 37 is a continuation of the flowchart of FIG. 36.

FIGS. 36 and 37 are flowcharts illustrating the procedure of the game simulation process. In the game simulation process, the server processing unit 202 generates the play data 650 in the server storage unit 502 first. Thereafter, the server processing unit 202 references the participating league ID 618 of the team setting data items 600 and randomly selects, from the league participating team list 552 for the league in which the game player currently participates, an opponent team that plays against the game player's team. At that time, bat first/field first is automatically determined (step S380). The team IDs and the bat first/field first information regarding the two opposing teams are stored in the opposing team information 652 of the play data 650.

Subsequently, the server processing unit 202 starts the game and starts generating game play images (step S382). Information indicating the current inning and top/bottom of the inning is stored in the play data 650 as the inning information 654.

After the game is started, the server processing unit 202 starts sending, to the mobile game machine 1400, display information for displaying the game play images and game progress information (e.g., the count, on-base status, and scores) (step S384). Accordingly, the mobile game machine 1400 displays the game simulation screen W14 (refer to FIG. 8). Thus, the game progress is displayed in the gameplay screen display section 82. The display of the scoreboard 80, the count display section 84, and the on base status display section 86 is started.

In addition, after the game is started, the server processing unit 202 selects one of the batters in accordance with the batting order of the offensive team (step S386) and performs a batter substitution process (step S388). The batter substitution process is one of the artificial intelligence (AI) processes. The server processing unit 202 determines whether sending up to pinch-hit is appropriate. At appropriate timing, the server processing unit 202 selects, as a pinch hitter, one of the players registered as a backup.

Subsequently, the server processing unit 202 performs an offensive tactic determination process (step S390).

Figure 38:
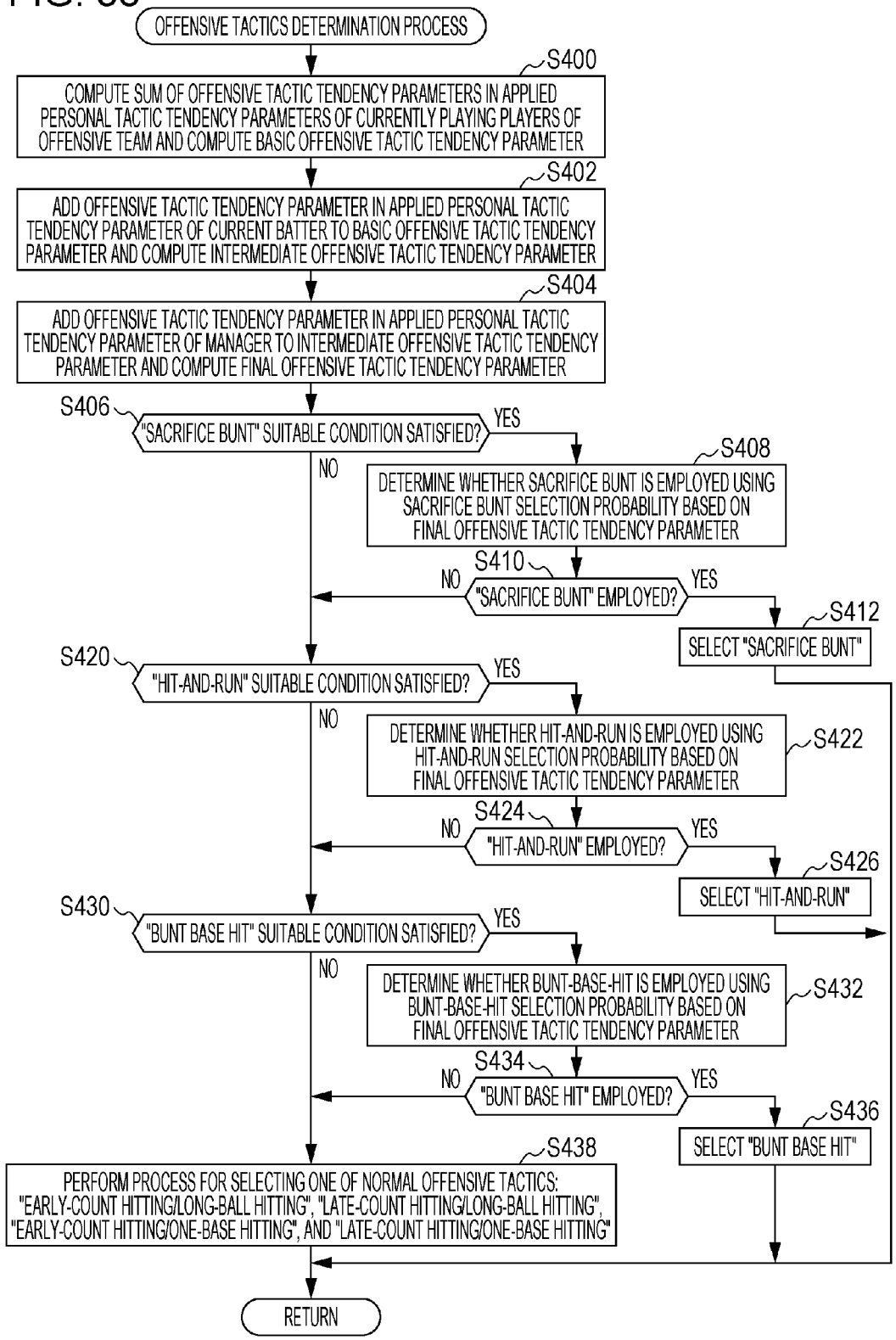
FIG. 38 is a flowchart of the procedure of an offensive tactic determination process.

FIG. 38 is a flowchart of the procedure of the offensive tactic determination process.

In the offensive tactic determination process, the server processing unit 202 references the player registration list 610 first and computes the sum of the values of the parameters for each of the items of the offensive tactic tendency parameter in the applied personal tactic tendency parameters 610f of the currently playing players in the offensive team (the players in the starting lineup at the game start time, and the players after substitution if substitution has been performed). The server processing unit 202 uses the sum as the basic offensive tendency parameter 660 of the offensive team (step S400). That is, the server processing unit 202 determines the selection tendency of a basic offensive tactic of the team on the basis of the applied personal tactic tendency parameters 610f of the players who satisfy a predetermined member condition. Thus, the server processing unit 202 changes the offensive strength of the team. While the determination has been made with reference to the currently playing players, the value of the basic offensive tendency parameter 660 may be determined on the basis of a member condition including all of the players registered with the current game (including the backups and relief pitchers).

Subsequently, the server processing unit 202 adds the offensive tactic tendency parameter in the applied personal tactic tendency parameter 610f for the player serving as the current batter (a main character having a strong impact on offense) to the basic offensive tendency parameter 660 again for each of the items. Thus, the server processing unit 202 computes the intermediate offensive tendency parameter 664 (step S402). Furthermore, the server processing unit 202 adds the offensive tactic tendency parameter in the applied personal tactic tendency parameter 608d for the manager which is one of the main characters according to the present embodiment to the intermediate offensive tendency parameter 664 for each of the items. Thus, the server processing unit 202 determines the final offensive tendency parameter 668 at bat (step S404).

Subsequently, the server processing unit 202 determines whether a "sacrifice bunt" suitable condition is satisfied (step S406). The server processing unit 202 references the sacrifice-bunt-suitable condition table 560 (refer to FIG. 19). If the sacrifice bunt suitable condition 560b determined for each of the on-base statuses 560a is satisfied (YES in step S406), the server processing unit 202 references the sacrifice bunt selection probability table 561 (refer to FIG. 20) and further determines whether a sacrifice bunt is employed in accordance with the selection probability defined in the final offensive tendency parameter 668 (step S408). If the "sacrifice bunt" tactic is employed (YES in step S410), the server processing unit 202 sets the offensive tactic for the current batting to "sacrifice bunt" (step S412). Thereafter, the offensive tactic determination process is completed.

However, if the sacrifice bunt suitable condition 560b is not satisfied (NO in step S406) or if a sacrifice bunt tactic is not employed (NO in step S410), the server processing unit 202 further determines whether an "hit-and-run" suitable condition is satisfied (step S420).

The server processing unit 202 references the hit-and-run-suitable-condition table 562. If the hit-and-run suitable condition is satisfied (YES in step S420), the server processing unit 202 further references the hit-and-run-selection probability table 563 and determines whether a hit-and-run tactic is employed in accordance with the selection probability defined in the final offensive tendency parameter 668 (step S422). If the "hit-and-run" tactic is employed (YES in step S424), the server processing unit 202 sets the offensive tactic for the current batting to "hit-and-run" (step S426). Thereafter, the offensive tactic determination process is completed.

However, if the hit-and-run suitable condition is not satisfied (NO in step S420) or if a hit-and-run tactic is not employed (NO in step S424), the server processing unit 202 further determines whether a "bunt base hit" suitable condition is satisfied (step S430).

The server processing unit 202 references the bunt-base-hit-suitable condition table 564. If the bunt-base-hit suitable condition is satisfied (YES in step S430), the server processing unit 202 further references the bunt-base-hit selection probability table 565 and determines whether a bunt-base-hit tactic is employed in accordance with the selection probability defined in the final offensive tendency parameter 668 (step S432). If the "bunt-base-hit" tactic is employed (YES in step S434), the server processing unit 202 sets the offensive tactic for the current batting to "bunt base hit" (step S436). Thereafter, the offensive tactic determination process is completed.

However, if none of the sacrifice bunt suitable condition, the hit-and-run suitable condition, and the bunt-base-hit suitable condition is satisfied, the server processing unit 202 selects the offensive tactic using normal hitting (step S438).

More specifically, the server processing unit 202 selects one of the tactics in accordance with the selection probabilities of "early-count hitting/long ball hitting", "late-count hitting/long ball hitting", "early-count hitting/one base hitting", and "late-count hitting/one base hitting" defined in the normal offensive tactic selection probability table 566 (refer to FIG. 21). Thereafter, the offensive tactic determination process is completed.

Referring back to the flowchart shown in FIG. 36, the server processing unit 202 performs a runner substitution process next (step S450).

In the runner substitution process, it is determined whether a pinch runner is used. For example, the server processing unit 202 determines whether a pinch runner suitable condition is satisfied first. The term "pinch runner suitable condition" refers to a condition indicating that use of a pinch runner is suitable in the current game status. For example, the case in which a runner is on a base and the offensive team is behind or the offensive team is ahead by a few runs corresponds to that condition. Thus, such a condition is the same as the pinch runner employment condition that is well known in actual baseball games.

If the pinch runner suitable condition is satisfied, the server processing unit 202 references the player parameter data 656 in the play data 650 and determines whether, among the current runners, the runner having a running speed lower than a predetermined reference value is present. If such a runner is present, the server processing unit 202 performs a pinch runner employment determination process. In the pinch runner employment determination process, the probability of a pinch runner being employed is low in an inning before a 7th inning. The setting is made so that as the inning progresses from the 7th, the probability of a pinch runner being employed becomes higher. If a pinch runner is used, the server processing unit 202 substitutes the runner having a running speed lower than the reference value with one of the registered backup members.

Subsequently, the server processing unit 202 performs a fielder substitution process (step S452).

In the fielder substitution process, it is determined whether a fielder is substituted with another fielder in order to increase the defensive strength. For example, the server processing unit 202 determines whether a fielder substitution suitable condition, which is one of defensive strength increasing conditions, is satisfied. As used herein, the term "fielder substitution suitable condition" refers to a condition in which a fielder should be substituted. For example, the fielder substitution suitable condition is set to the case in which the inning number is higher than or equal to 7, the defensive team is ahead by 3 runs or less, and the current position in the batting order is between 1 to 3.

If it is determined that the fielder substitution suitable condition is satisfied, the server processing unit 202 references the defense aptitude data 526 of the player setting data 520 for all of the currently playing fielders. Thereafter, the server processing unit 202 determines whether a fielder having a defense aptitude value for the current position less than a predetermined reference value is present.

If a fielder having a defense aptitude value for the current position less than the reference value is present, the server processing unit 202 performs a fielder substitution determination process. In the fielder substitution determination process, when fielder substitution is employed, the setting is made so that the employment probability is low in an inning having a number lower than 7 and becomes higher as the inning number becomes higher from 7. If fielder substitution is employed, the server processing unit 202 substitutes the fielder having a defense aptitude value lower than the reference value with one of the registered backup members.

Subsequently, the server processing unit 202 performs a defensive tactic determination process (step S454).

Figure 39:
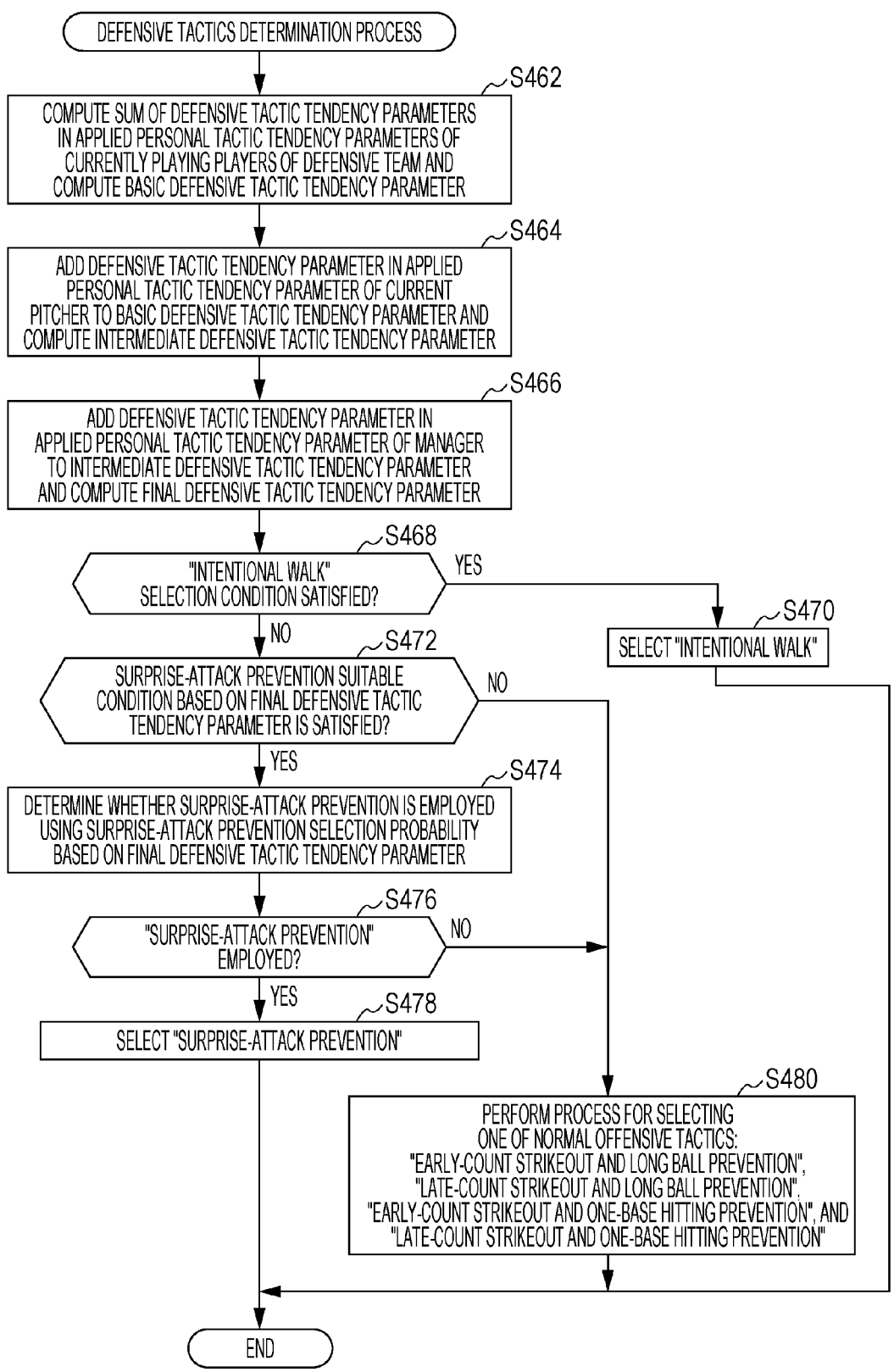
FIG. 39 is a flowchart illustrating the procedure of a defensive tactic determination process.

FIG. 39 is a flowchart illustrating the procedure of the defensive tactic determination process.

In the defensive tactic determination process, the server processing unit 202 computes the sum of the values of the defensive tactic tendency parameters for all of the currently playing players for each item of the defensive tactic tendency parameter in the applied personal tactic tendency parameters 610f. The server processing unit 202 uses the sum as the basic defensive tendency parameter 662 of the defensive team (refer to FIG. 28) (step S462). That is, the server processing unit 202 determines the tendency of the team to select a basic defense tactic on the basis of the applied personal tactic tendency parameters 610f of the players who meet a predetermined member condition and changes the defensive strength of the team.

Subsequently, the server processing unit 202 adds the defensive tactic tendency parameter in the applied personal tactic tendency parameter 610f for the currently playing pitcher (a main character according to the present embodiment) to the basic defensive tendency parameter 662 again for each of the items. Thus, the server processing unit 202 computes the intermediate defensive tendency parameter 666 (step S464). Furthermore, the server processing unit 202 adds the defensive tactic tendency parameter in the applied personal tactic tendency parameter 608d for the manager which is one of the main characters according to the present embodiment to the intermediate defensive tendency parameter 666 for each of the items. Thus, the server processing unit 202 determines the final defensive tendency parameter 670 at bat (step S466).

Subsequently, the server processing unit 202 determines whether an "intentional walk" selection condition is satisfied (step S468). The server processing unit 202 references the intentional walk selection condition table 570 (refer to FIG. 22). If the batting average of the batter meets a predetermined suitable condition with respect to the value 570a of "intentional walk" in the final defensive tendency parameter 670 (YES in step S468), the server processing unit 202 sets the defensive tactic for the current at-bat to "intentional walk" (step S470). Thereafter, the defensive tactic determination process is completed.

However, if the "intentional walk" selection condition is not satisfied (NO in step S468), the server processing unit 202 further determines whether a surprise-attack prevention suitable condition is satisfied on the basis of the final defensive tendency parameter 670 (step S472).

The server processing unit 202 references the surprise-attack prevention condition table 572 (refer to FIG. 23). If the suitable condition 572b based on the on-base status 572a and the offense related parameter, such as the "contact ability" and "running speed", is satisfied (YES in step S472), the server processing unit 202 further references the surprise-attack prevention selection probability table 574 (refer to FIG. 24) and determines whether a "surprise-attack prevention" tactic is employed in accordance with the selection probability defined for the value of "surprise-attack" in the final defensive tendency parameter 670 and the score difference (step S474). That is, in general, a "surprise attack prevention" tactic is employed under such a condition. However, the server processing unit 202 determines whether the "surprise attack prevention" tactic is actually employed or not.

If the "surprise attack prevention" tactic is employed (YES in step S476), the server processing unit 202 sets the defensive tactic for the current at-bat to "surprise attack prevention" (step S478). Thereafter, the defensive tactic determination process is completed.

However, if the surprise-attack prevention condition is not satisfied (NO in step S472) or if the surprise-attack prevention tactic is not employed (NO in step S476), the server processing unit 202 references the normal defensive tactic selection probability table 576 (refer to FIG. 23). Thereafter, the server processing unit 202 selects, on the basis of the value of "long ball prevention" in the final defensive tendency parameter 670 and the value of "strikeout count", one of the following tactics: "early-count strikeout/long ball prevention", "late-count strikeout/long ball prevention", "early-count strikeout/one-base hitting prevention", and "late-count strikeout/one-base hitting prevention" (step S480). Thereafter, the defensive tactic determination process is completed.

Referring back to the flowchart of the game simulation process shown in FIG. 36, the server processing unit references the batting pattern data 555 (refer to FIG. 18) next and controls the batter in accordance with the batting pattern setting corresponding to the previously selected offensive tactic (step S500). More specifically, the server processing unit 202 determines the batting style in accordance with the ball center hitting probability 555b, the standard hitting probability 555c, the mishit probability 555d, and the strikeout looking probability 555e for the current pitch order 555a. Thereafter, the server processing unit 202 controls the batter to play in accordance with the determined batting style.

Subsequently, the server processing unit 202 performs running control in accordance with the previously selected offense tactic (step S502). For example, if "hit-and-run" is selected as an offensive tactic, the server processing unit 202 causes the runner to start immediately after the pitcher releases the ball.

Thereafter, the server processing unit 202 references the position shift data 556 and controls the locations of the fielders in accordance with the position shift pattern corresponding to the previously selected defensive tactic (step S504).

Subsequently, the server processing unit 202 references the pitching pattern data 554 (refer to FIG. 17) and controls the pitching pattern of the pitcher in accordance with the pitching pattern corresponding to the previously selected defensive tactic (step S506). More specifically, the server processing unit 202 determines to which location the pitcher pitches a ball and what kind of pitch the pitcher takes in accordance with the strikeout pitch selection probability 554c, the individual pitch zone selection probability 554d, the pitch speed selection probability 554e, and the pitch power selection probability 554f for the current pitch 554b and controls the action of the pitcher in accordance with the results of determination.

Since the action of the offensive and defensive teams has determined in this way, the server processing unit 202 computes the result of the inning in accordance with the flowchart shown in FIG. 37 (step S508) and updates the game progress information, such as the count, on-base status, and scores (step S510).

That is, like the widely used automatically controlled baseball games, the server processing unit 202 determines, for example, the count for strikes and balls, the type of fly ball, caught/landed on the fly ball, an intentional walk, out/safe for a pickoff attempt, and safe/out for base steal. For example, in order to determine the type of fly ball, a table in which the type of a fly ball and the location of the fly ball are associated with a relationship between the result of the batting determined using the position shift data 556 (i.e., one of "ball center hitting", "standard hitting", and "mishit") and the type of pitch determined using the pitching pattern data 554 may be prestored in the server storage unit 502, and the server processing unit 202 may reference the table. However, another method may be employed.

Subsequently, the server processing unit 202 determines whether the inning is over using the result of the offense and defense result. If the inning is not over (NO in step S512) and the runner moves up a base (YES in step S514), the processing returns to step S390 and the simulation is performed for the next batter.

In contrast, if the inning is not over and the runner does not move up a base (NO in step S514), the processing returns to step S386 and the simulation is performed for the next batter.

However, if the inning is over (YES in step S512), the server processing unit 202 determines whether the game over condition is satisfied. If the game over condition is not satisfied (NO in step S516), the server processing unit 202 updates the inning number and the top/bottom of the inning (step S518) and switches the teams between defense and offense (step S520). Thereafter, the server processing unit 202 determines whether a pitcher is present in the new defensive team. If a pitcher is not present (NO in step S522), the server processing unit 202 selects one of the pitchers registered in the relief pitcher list 616 and substitutes the player at 9th position of the batting order with new pitcher (step S524). Thereafter, the processing returns to step S386.

However, if the game over condition is satisfied (YES in step S516), the server processing unit 202 completes sending, to the mobile game machine 1400, display information for displaying the game play screen and the game progress information (step S530). In addition, the server processing unit 202 updates the team performance of each of the opposing teams (step S532). Thereafter, the game simulation process is completed.

Referring back to the flowchart shown in FIG. 29, if the received request information indicates the operation for selecting a "chat" function (YES in step S550), the server processing unit 202 performs a chat process. Thus, the server processing unit 202 provides a chat function to the mobile game machine 1400 (step S552).

As described above, according to the present embodiment, even when a game player obtains the same type of objects (trading cards 3), the game player can duplicately register the cards. In addition, a bonus is provided to the game player in accordance with the number of duplicate registrations. Therefore, even when a game player owns a plurality of objects (trading cards 3) of the same type, the values of the duplicate objects (cards) are not lost, but the duplicate objects (cards) increase the excitement of the game.

MODIFICATIONS

While the present invention has been described with reference to the first embodiment, the embodiments are not limited thereto. The game content, the components of the system, and the functions of the system can be added, removed, and modified within the spirit and scope of the present invention.

For example, while the above-described embodiment has been described with reference to a baseball game, the present invention is applicable to any team based battle sport game in which objects of the same type can be registered, such as a soccer game, a hockey game, a rugby football game, an American football game, and valley ball game. In addition, it should be noted that the parent population for determining opposing teams is not limited to a league as described in the above embodiment, but the parent population may be a tournament.

While the above embodiment has been described with reference to a technique in which the parameter of the entire team is updated on the basis of the number of duplicate registrations of the object ID of the manager of the game player's team, the parameter of the entire team may be updated on the basis of the number of duplicate registrations of the object ID of a character related to the game player's team, such as a coach or the owner.

While the above embodiment has been described with reference to the parameter of each of the players on the game player's team and the parameter of the entire game player's team as the "ability", the parameter is not limited thereto. For example, the parameter may represent a "physical strength".

While the above embodiment has been described with reference to the game system including the game player and the server system 1100 that performs a process for managing a game, the game system may include a single stationary home game machine or a single stationary business game machine incorporating the server system 1100 and the game player terminal. Alternatively, if the game system according to the present invention is used in a store, such as a gaming arcade, a business game machine may be used as the game player terminal.

While the above embodiment has been described with reference to the technique in which the actions of two opposing teams are automatically controlled, only one of the defensive team and the offensive teams may be computer-controlled and a game player may control the other team.

In addition, while the above embodiment has been described with reference to a trading card as an object, any article having unique identification information attached thereto that the game player can read or that a bar code reader or an IC tag reader can read may be used as the object. For example, a toy, such as a bottle cap or a figure, or stationery may be used as the object. Alternatively, a virtual trading card or a virtual toy that a game player bought in a virtual store on a Web site may be used as the object. In such a case, the game player buys data, and a real card or a real toy is not needed.

Furthermore, while the above embodiment has been described with reference to the object (the trading card 3) having a unique card ID, the unique card ID may be provided to a pair of a player and a series, that is, the model of an object (a card).

What is claimed is:

1. A computer system for managing team members of each of teams in order to play a team based game, comprising:
    storage means for storing object IDs representing IDs uniquely assigned to objects corresponding to the team members;
    receiving means for receiving a request for registering an object ID in response to an input operation performed by a game player on a game player terminal;
    registration managing means for managing registration for use of the object ID and allowing the registration if the object ID received from the receiving means has not yet been registered, and allowing the duplicate registration if the object ID received from the receiving means has already been registered;
    team member managing means for managing the team members of each of the teams by assigning the team member corresponding to the object ID registered by the registration managing means to one of the teams; and
    skill value updating means for performing a skill value updating process for each of the teams in which a skill value for each of the team members and/or a skill value of the entire team is updated on the basis of the number of duplicate registrations of the object ID of each of the team members.

2. The computer system according to claim 1, wherein the skill value updating means includes first means for updating the skill value of the team member if the number of duplicate registrations of the object ID for the member meets a condition regarding the number of duplicate registrations predetermined for the team member.

3. The computer system according to claim 1, further comprising:
    position setting means for assigning a position to each of the team members in accordance with an input operation performed by the game player on the game player terminal;
    wherein the skill value updating means includes second means for updating the skill value for the team member of the team and/or a skill value for the entire team on the basis of the number of duplicate registrations of the object ID for the team member assigned to the position, and wherein the team member meets a predetermined position condition used for determination in skill value updating.

4. The computer system according to claim 3, wherein the game is a baseball game, and wherein the position condition represents a battery, and wherein the second means updates the skill value for the team member and/or the skill value for the entire team on the basis of the number of duplicate registrations of the objects ID for the team members assigned to a pitcher and a catcher.

5. The computer system according to claim 1, wherein a reference skill value is defined for each of a plurality of parameter items for a team member, and wherein the skill value updating means performs the skill value updating process so that a feature of the team member is made more prominent by increasing the skill value of the skill value item having a relatively high skill value.

6. The computer system according to claim 1, wherein an object provided during a series differs from the object provided during another series even for the same team member, and wherein the storage means associates the object IDs for the same team member in different series with one another and stores the object IDs, and wherein the skill updating means includes third means for performing the skill value updating process on the basis of the series of the duplicately registered object ID for each of the team member.

7. The computer system according to claim 1, further comprising:
    team manager managing means; and
    entire team skill value updating means;
    wherein the objects include a manager object, and wherein if the object ID registered by the registration managing means is the object ID of the manager object, the team manager managing means assigns the manager object to a manager of the team, and wherein the entire team skill value updating means updates the skill value of each of the teams on the basis of the number of duplicate registrations of the objects ID for the manager of the team.

8. The computer system according to claim 1, further comprising:
    skill value updating rule setting means for setting whether updating of a skill value by the skill value updating means is allowed as an execution rule of the game.

9. The computer system according to claim 1, further comprising:
    pre-assigned team member managing means; wherein in addition to the team member corresponding to the registered object IDs, the team member managing means manages a pre-assigned team member automatically provided to the team without registration of an object ID of the pre-assigned team member in advance, and wherein if the pre-assigned team member is the same as a team member corresponding to a registered object ID, the pre-assigned team member managing means unregisters the pre-assigned team member from the team members in the team.

10. A non-transitory computer-readable medium storing a computer program product comprising computer-executable instructions that when executed by at least one computer cause the at least one computer to manage team members on each of teams in order to play a team based game, comprising:
    storing an object ID representing an ID uniquely assigned to an object corresponding to each of the team members,
    receiving a request for registering the object ID in response to an input operation performed by a game player on a game player terminal,
    managing the presence/absence of registration for use of the object IDs and allowing the registration if the object ID received from the receiving means has not yet been registered, and allowing the duplicate registration if the object ID received from the receiving means has already been registered,
    managing the team members of each of the teams by assigning at least one of the team members corresponding to the registered object ID registered to one of the teams, and
    performing a skill value updating process for each of the teams in which a skill value for each of the team members and/or a skill value of the entire team is updated on the basis of the number of duplicate registrations of the object ID of the team member.

* * * * *